(12) United States Patent
Beshai

(10) Patent No.: US 12,015,887 B2
(45) Date of Patent: Jun. 18, 2024

(54) EXPANDED SINGLE-HOP CLOS STAR NETWORK FOR A DATACENTER OF UNIVERSAL COVERAGE AND EXABITS-PER-SECOND THROUGHPUT

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 0 days.

(21) Appl. No.: 17/951,087

(22) Filed: Sep. 22, 2022

(65) Prior Publication Data

US 2023/0088539 A1 Mar. 23, 2023

Related U.S. Application Data

(63) Continuation-in-part of application No. 63/247,299, filed on Sep. 22, 2021.

(51) Int. Cl.
*H04Q 11/00* (2006.01)

(52) U.S. Cl.
CPC ..... *H04Q 11/0067* (2013.01); *H04Q 11/0005* (2013.01); *H04Q 2011/0016* (2013.01); *H04Q 2011/0094* (2013.01)

(58) Field of Classification Search
CPC ........................ H04Q 11/0003; H04Q 11/0005
See application file for complete search history.

(56) References Cited

U.S. PATENT DOCUMENTS

| | | | |
|---|---|---|---|
| 7,693,142 B2 | 4/2010 | Beshai | |
| 9,571,421 B1* | 2/2017 | Brar | ........... H04L 49/15 |
| 9,647,792 B2 | 5/2017 | Beshai | |
| 10,003,865 B2 | 6/2018 | Beshai | |
| 2018/0288505 A1* | 10/2018 | Sindhu | ........... H04L 49/113 |
| 2020/0077166 A1* | 3/2020 | Beshai | ........... H04J 14/0284 |

* cited by examiner

*Primary Examiner* — Shi K Li

(57) ABSTRACT

A passive signal transport medium, constructed as an array of spectral-temporal connectors, connects a large number of access nodes to a number of distributors to form a single-hop network of wide coverage and high throughput yet simplified control. Parameterized spectral-temporal connectors define network expansion over networks using conventional signal transport media. A network accommodating 32000 access nodes with a throughput of an Exabits/second is realizable. The distributors may be geographically distributed (the access nodes are naturally geographically distributed). The entire network structure is parameterized. Selecting the number of distributors to equal the number of access nodes, and pairing each access node with a respective distributor to form an integrated node, an expanded fully-meshed network is realized with each pair of integrated nodes having a direct path and numerous single-hop paths. Several routing schemes within the fully-meshed network are considered to enable both global control and distributed control.

19 Claims, 45 Drawing Sheets

EXPANDED SINGLE-HOP CLOS STAR NETWORK FOR A DATACENTER OF UNIVERSAL COVERAGE AND EXABITS-PER-SECOND THROUGHPUT

CROSS-REFERENCE TO RELATED APPLICATIONS

The present application claims priority to provisional application 63/247,299 filed on Sep. 22, 2021, entitled "MESH NETWORK FOR A LARGE-SCALE DATA CENTER", the specification of which is incorporated herein by reference in its entirety.

FIELD OF THE INVENTION

The invention is related to global data-communication networks, data centers, cloud computing, and edge computing. In particular, the invention is concerned with configurations of large-scale data centers.

BACKGROUND

A major challenge in the art of telecommunication-network design is the enablement of graceful network growth while maintaining structural simplicity, ease of control, and high performance. There is a need, therefore, to explore methods and apparatus to meet the challenge.

SUMMARY

In accordance with an aspect, the invention provides a network comprising a plurality of dual passive transposing modules (dual-PTMs) arranged into a number $\Pi$, $\Pi \geq 1$, of constellations, each constellation comprising a number H, $H \geq 1$, of dual-PTMs. A plurality of access nodes connects to the plurality of dual-PTMs with each access node connecting to each of H dual-PTMs of a respective constellation through a respective dual link of $\gamma$ dual channels. A plurality of distributors connects to the plurality of dual-PTMs with each distributor connecting to one dual-PTM from each of the $\Pi$ constellations through a dual link of n dual channels.

Each dual-PTM connects to a first number of exterior links, each exterior link comprising $\gamma$ dual channels, $\gamma>1$, and a second number of interior links, each interior link comprising n dual channels, $n>1$, the first number being n×m, m being a positive integer and the second number being $\gamma \times m$. Each dual-PTM is configured so that each exterior link has an upstream cyclic path to each interior link and each interior link has a downstream cyclic path to each exterior link.

Thus, the network accommodates a number ($\Pi \times n \times m$) of access nodes, each access node having a number ($H \times \gamma \times m$) of parallel single-hop paths to each other access node. The parameters $\{n, m, \gamma, H, \Pi\}$ define the scope of the network and may be selected to construct networks of a variety of configurations. Selecting the parameters so that $n=m=\gamma=H=\Pi=32$, for example, the network accommodates a total of 32768 access nodes each having 32768 parallel single-hop paths to each other access node.

According to a preferred implementation, each dual-PTM comprises a set of $\gamma$ dual passive transposing units (dual-PTUs). Each dual-PTU connects to a respective set of m interior links of the second number of interior links. A dual-PTU comprises an upstream passive transposing unit (u-PTM) and a downstream passive transposing unit (d-PTU).

A u-PTU comprises n upstream temporal clockwise rotators, each cyclically connecting an upstream channel from each of a respective set of m exterior links of the first number of exterior links to an upstream channel within each interior link of the respective set of m interior links.

A d-PTU comprises n downstream temporal counterclockwise rotators, each cyclically connecting a downstream channel within each interior link of the respective set of m interior links to each of a respective set of m exterior links of the first number of exterior links.

Optionally, an implementation, an upstream temporal clockwise rotator is coupled to a time indicator and a timing circuit configured to communicate with respective connecting access nodes, of the plurality of access nodes, to time-align the respective connecting access node to the dual temporal rotator. A connecting access node is one that has an upstream channel connecting to an input port of the upstream temporal clockwise rotator.

Optionally, a downstream temporal counterclockwise rotator is coupled to a time indicator and a timing circuit configured to communicate with respective connecting distributors, of the plurality of distributors, to time-align said the connecting distributors to the dual temporal rotator. A connecting distributor is one that has a downstream channel connecting to an input port of the downstream temporal counterclockwise rotator.

Preferably, each of the n upstream temporal clockwise rotators and the n downstream temporal counterclockwise rotators of a dual-PTM is time aligned to a master time indicator of the dual-PTM.

Using electronic rotators, a buffer is provided at each input port of each upstream temporal clockwise rotator and a buffer is provided at each input port of each downstream temporal counterclockwise rotator.

To establish a single-constellation network, setting the number, $\Pi$, to equal 1, each distributor may be collocated with a respective dual-PTM connecting to the respective dual-PTM through individual n channels.

The dual-PTMs of at least one constellation having multiple dual-PTMs (H>1) maybe geographically distributed.

At least one access node of the plurality of access nodes is equipped with: a respective access controller for scheduling connections within the network; a respective time indicator; and a respective timing circuit for time aligning the at least one access node to respective dual-PTMs.

Each distributor of the plurality of distributors comprises: a respective distributor controller for establishing connections within the network; a respective time indicator; and a respective timing circuit for time aligning each distributor to respective dual-PTMs.

In accordance with another aspect, the invention provides a network comprising a plurality of dual passive transposing modules (dual-PTMs) arranged into a number $\Pi$, $\Pi \geq 1$, of constellations, each constellation comprising a number H, $H \geq 1$, of dual-PTMs. A plurality of access nodes connects to the plurality of dual-PTMs, each access node connecting to one dual-PTM from each of the $\Pi$ constellations through a dual link of $\gamma$ dual channels. A plurality of distributors connects to the plurality of dual-PTMs, each distributor connecting to each of H dual-PTMs of a respective constellation through a respective dual link of n dual channels.

Each dual-PTM connects to a first number of exterior links, each exterior link comprising $\gamma$ dual channels, $\gamma>1$, and a second number of interior links, each interior link comprising n dual channels, $n>1$, the first number being a positive integer multiple, m, of n, and the second number being $\gamma \times m$. Each dual-PTM configured so that each exterior link has an upstream cyclic path to each interior link; and each interior link has a downstream cyclic path to each exterior link.

Thus, the network accommodates a number (H×n×m) of access nodes, each access node having a number (Π×γ×m) of parallel single-hop paths to each other access node.

According to an implementation, the set of γ×m distributors connecting to a constellation and the H dual-PTMs of the constellation are collocated. Thus, the set of γ×m distributors connect to respective dual-PTMs of the constellation directly through individual channels.

In accordance with a further aspect, the invention provides a network comprising a plurality of unidirectional passive transposing modules (uni-PTMs) arranged into a number H, H≥1, of constellations, each constellation comprising H uni-PTMs. A plurality of ingress nodes connects to the plurality of uni-PTMs, each ingress node connecting to a respective constellation through H links, of n channels each, each of the H links connecting to one uni-PTM of the respective constellation. A plurality of egress nodes connects to the plurality of uni-PTMs, each egress node connecting to one uni-PTM from each of the H constellations through a respective link of n channels. Each egress node shares a distributing mechanism (a switching mechanism) with an ingress node to form an integrated node, thus the network comprises a total of (H×n×m) integrated nodes.

Each uni-PTM connects to a number n×m of exterior links, each exterior comprising n channels, n>1, and n×m interior links, each interior link comprising n channels, m being a design parameter referenced as an expansion parameter or a spread parameter. Each uni-PTM is configured so that each exterior link has a cyclic path to each interior link.

Thus, the network accommodates a number (H×n×m) of access nodes, each access node having a direct path to each other access node and a number (H×n×m−2) of parallel single-hop paths to each other access node.

Each uni-PTM comprises a set of n unidirectional passive transposing units (uni-PTUs). Each uni-PTU is coupled to a respective set of m interior links of the second number of interior links and comprises n temporal rotators, each temporal rotator cyclically connecting a channel from each of a respective set of m exterior links of the first number of exterior links to a channel within each interior link of the respective set of m interior links.

Each temporal rotator is coupled to a time indicator and a timing circuit configured to communicate with connecting ingress nodes, of the plurality of ingress nodes, to time-align each of the connecting ingress nodes to a respective temporal rotator. A connecting ingress node to a specific temporal rotator is an ingress node that has a channel connecting to an input port of the specific temporal rotator.

The network further comprises a global controller configured to exchange control signals with each integrated node.

According to a first routing scheme, the integrated nodes of the plurality of integrated nodes are operated as shared nodes so that a specific shared node is configured to switch:
data originating from local data sources coupled to the specific shared node;
data directed to local data sinks coupled to the specific shared node; and
transit data originating from any other shared node and directed to an identified shared node.

According to a second routing scheme, the plurality of integrated nodes is organized into a set of gateway nodes and a set of shared nodes.

Each gateway node of the set of gateway nodes is configured so that a gateway node switches: data originating from external data sources coupled to the gateway node; and data directed to external data sinks coupled to the gateway node.

Each shared node of the set of shared nodes is configured so that a shared node switches:
data originating from local data sources coupled to the shared node;
data directed to local data sinks coupled to the shared node; and
transit data originating from any other integrated node of said plurality of integrated nodes.

According to a third routing scheme, the plurality of integrated nodes is organized into a set of shared nodes and a set of transit nodes.

Each shared node is configured so that a specific shared node switches:
data originating from local data sources coupled to the specific shared node;
data directed to local data sinks coupled to the specific shared node; and
transit data originating from any other shared node and directed to an identified shared node.

Each transit node is configured to switch only transit data originating from any shared node and directed to any other shared node.

BRIEF DESCRIPTION OF THE DRAWINGS

Features and implementations will be further described with reference to the accompanying exemplary drawings, in which:

FIG. 14 illustrates signal segments at input ports of the four temporal rotators of FIG. 13, signal segments at output ports of the four temporal rotators, and signal segments at input ports of the spectral multiplexers;

REFERENCE NUMERALS

Figure 1:
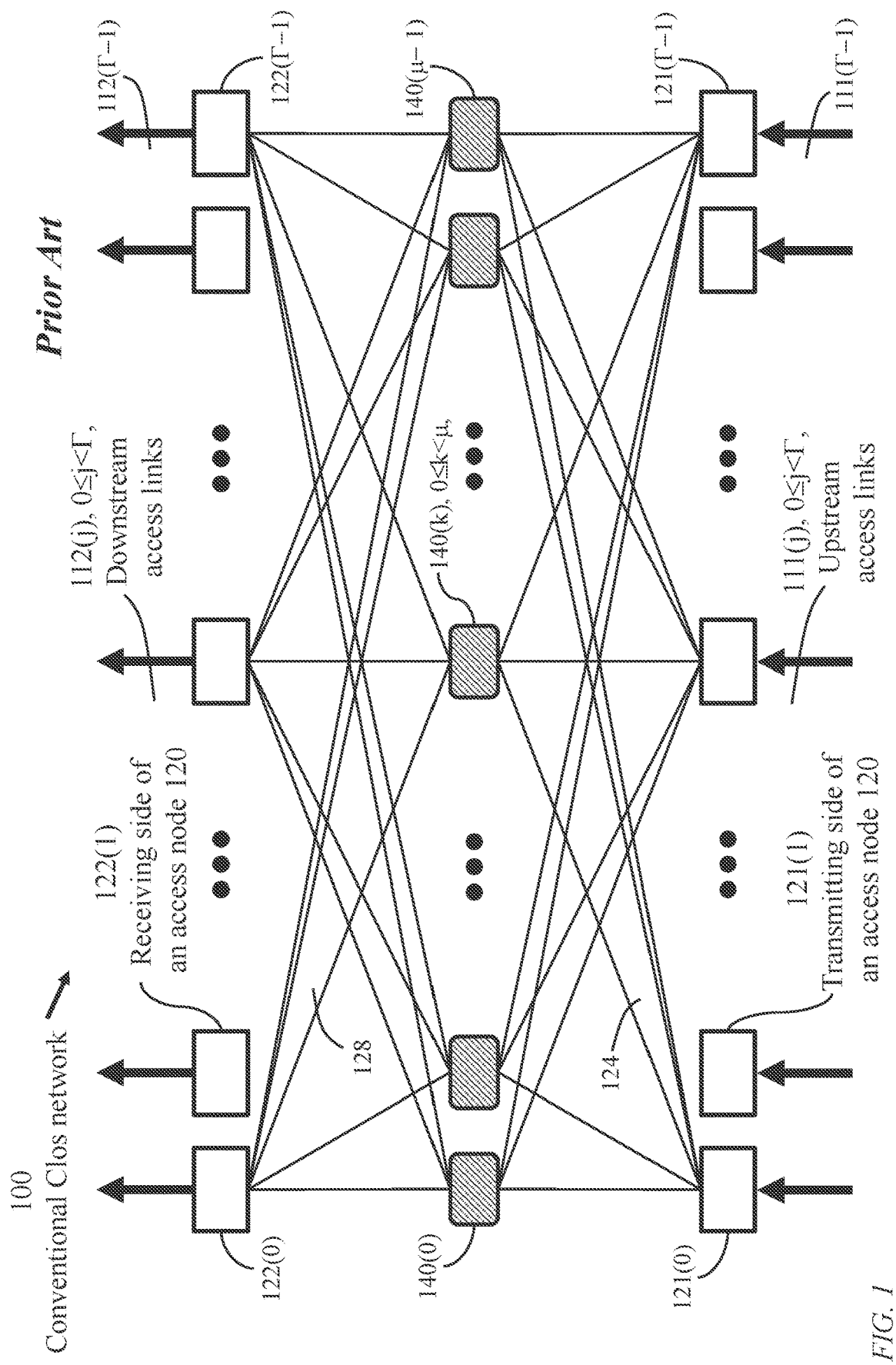
FIG. 1 illustrates a conventional composite-star network (Clos star network) with collocated parallel distributors with each access node connecting to the distributors through dual channels.

A reference numeral may individually or collectively refer to items of a same type. A reference numeral may further be indexed to distinguish individual items of a same type.

100: A conventional composite-star network (Clos star network) having collocated parallel distributors with each access node connecting to the distributors through a WDM link;
111: Upstream access links from data sources
112: Downstream access links to data sinks
120: Access node
121: Transmitting side of access node 120
122: Receiving side of access node 120
124: Upstream channel from an access node 120 to a distributor 140, each access node connects to a number μ, μ>1, upstream channels 124
128: Downstream channel from a distributor 140 to an access node 120, each access node connects to μ downstream channels 128
140: A distributor having Γ dual ports, Γ>1, the network comprises μ distributors and Γ access nodes 120
200: An implementation of a composite star network where spectral routers 230 connect geographically distributed access nodes 120 to geographically spread distributors 140
220: Dual links 111, 112 connecting data sources/sinks to an access node 120
225: Dual ports connecting dual links 220 to spectral routers
230: A layer of spectral routers
240: A set of, generally geographically spread, distributors 140
300: An implementation of a composite star network where WDM links directly connect geographically distributed access nodes 120 to geographically spread distributor groups 350, each distributor group comprising a number of collocated distributors but the distributor groups may be geographically spread
330: Dual WDM links each comprising multiple spectral bands (multiple channels)
350: Distributor groups
400: Connectivity of a distributor group to dual WDM links 330
410: Upstream WDM link
412: Spectral demultiplexer
420: Downstream WDM link
422: Spectral multiplexers
500: Detailed implementation of network 300
524: Upstream links of γ upstream channels
528: Downstream links of γ downstream channels
600: An expanded composite star network where spectral-temporal connectors connect geographically distributed access nodes 120 to geographically spread distributors 140
620: Dual channels from/to access nodes
630: A layer of spectral-temporal connectors
640: A set of geographically spread distributors m times larger than set 240, m>1
700: Connectivity of an upstream passive transposing unit (upstream PTU) transferring signals from upstream channels emanating from access nodes 120 to upstream WDM links
708: Upstream channels from access nodes 120, the access nodes being logically organized into access groups of m access nodes each
710: Input port of a temporal clockwise rotator
720: Temporal clockwise rotator connecting at input to a set of m upstream channels emanating from respective m access nodes
730: Output port of a temporal clockwise rotator
735: Internal channel of an upstream PTU
750: An upstream PTU comprising a predefined number of temporal clockwise rotators
755: Input port of a spectral multiplexer 760
760: A spectral multiplexer combining a spectral band from each clockwise rotator into an output WDM link
770: Output WDM links each carrying a data segment from each upstream channel 708
800: Connectivity of upstream PTU 750 transferring signals from upstream channels emanating from access nodes 120 to a set of distributors 140
855: Input port of a distributor connecting to upstream PTUs 750
860: A set of n output channels of a PTU 750 each output channel carrying signal segments from m access nodes 120
900: Representation of an upstream PTU 750
970: A set of m upstream WDM links each comprising n channels (n spectral bands), m being the number of access nodes per access group and n being the number of access groups connecting to an upstream PTU
1000: Connectivity of a downstream passive transposing unit (downstream PTU) transferring signals from downstream WDM links to channels directed to access nodes 120
1008: Downstream channels to access nodes 120, the access nodes being logically organized into access groups of m access nodes each
1010: Input port of a temporal counterclockwise rotator 1020
1020: Temporal counterclockwise rotator connecting at input to a set of m downstream channels carrying signal segments directed to respective m access nodes
1030: Output port of a temporal counterclockwise rotator 1020
1035: Internal channel of a downstream PTU
1050: A downstream PTU comprising a predefined number of temporal counter clockwise rotators
1055: Output port of a spectral demultiplexer
1060: A spectral demultiplexer separating spectral bands from an input WDM link 1070: Input downstream WDM links each carrying a data segment to each downstream channel 1008
1100: Connectivity of downstream PTU 1050 transferring signals from a set of distributors to downstream channels directed to access nodes 120
1140: Output port of a distributor connecting to downstream PTUs 1050
1160: A set of n input channels of a PTU 1050, each input channel carrying signal segments directed to m access nodes
1170: A distributor collocated with dPTU 1050
1200: Representation of a downstream PTU 1050
1300: A specific miniature upstream PTU 750
1400: An example of signal-segments transposition within an upstream PTU (uPTU)
1410: Signal segments at input ports of the clockwise temporal rotators of FIG. 13
1412: A signal segment
1414: Signal segments forming a signal frame
1420: Signal segments at output ports of the clockwise temporal rotators of FIG. 13
1430: Signal segments at input ports of the spectral multiplexer 760 of the uPTU of FIG. 13
1500: A specific miniature downstream PTU 1050
1600: An example of signal-segments transposition within a downstream PTU (dPTU)
1610: Signal segments at output ports of the counterclockwise rotators of FIG. 15
1612: A signal segment
1614: Signal segments forming a signal frame
1620: Signal segments at input ports of the counterclockwise temporal rotators of FIG. 15
1630: Signal segments at output ports of spectral demultiplexers 1060 of the dPTU of FIG. 15
1700: An upstream passive transposing module (uPTM module)
1710: A multi-channel link from an access node
1720: A spectral demultiplexer
1800: A downstream passive transposing module (dPTM)
1810: A multi-channel link to an access node
1820: A spectral multiplexer
1900: Connectivity of an upstream passive transposing module (uPTM) and a downstream passive transposing module (dPTM) to a set of access nodes and a set of distributors forming the kernel of an expanded Clos network (e-Clos network)
1920: An access node of the e-Clos kernel
1940: A distributor (electronic or optical) of the e-Clos kernel, the distributor having at least n dual ports, n>1
2000: Schematic of the kernel of an e-Clos network
2010: A dual multi-channel link connecting an access node 1920 to dual-PTM 2020
2012: A set of dual multichannel links 2010 of dual-PTM 2020
2020: A dual passive transposing module (dual-PTM)
2030: A dual multi-channel link connecting dual-PTM 2020 to a distributor 1940
2032: A set of dual multichannel links 2030 of dual-PTM 2020
2100: A first single-constellation e-Clos network comprising a constellation 2150 of a predetermined number of dual-PTMs connecting access nodes 2120 to a plurality of distributors 1940
2110: Dual links to data source/data sinks
2120: An access node connecting to the predetermined number of dual-PTMs
2121: A dual link connecting an access node 2120 to a dual-PTM 2020
2122: A set of dual links connecting an access node 2120 to a constellation 2150 of dual-PTMs
2150: A constellation of a predetermined number, H, H>1, of dual-PTMs
2200: A simplified schematic of global type-I constellation network 2100
2220: Dual links from access node 2120 of the type-I constellation network 2100 to constellation 2150 of dual-PTMs
2300: A first single-constellation e-Clos network 2100 adapted to use optical implementations of distributors 1940
2310: A core module of first single-constellation network 2300
2400: A first multi-constellation e-Clos network comprising a selected number Π, Π>1, of constellations 2150 of dual-PTMs
2440: A distributor having at least (n×Π) dual ports
2441: A dual link connecting a distributor 2440 to a constellation 2150
2442: A set of dual links 2441 connecting a distributor 2440 to different constellations 2150
2500: A second single-constellation e-Clos network comprising a constellation 2150 of a predetermined number, H, H>1, of dual-PTMs connecting a plurality of access nodes 1920 to a predetermined number of distributors 2540
2540: A distributor having at least (n×H) dual ports
2541: A dual link of n channels connecting a distributor 2540 to a dual-PTM 2020
2542: A number, H, of dual links 2541, each dual multi-channel link comprising n dual channels
2600: A simplified schematic of second single-constellation e-Clos network 2500
2700: A second multi-constellation e-Clos network comprising Π, Π>1, constellations 2150 of dual-PTMs
2720: An access node
2721: A dual link of Δ dual channels connecting an access node 2720 to a constellation 2150
2800: An arrangement for time aligning data at the upstream temporal rotators of a uPTM
2900: An arrangement for time aligning data at the downstream temporal rotators of a dPTM
3000: A prior-art mesh network 3000
3020: An access node
3022: A dual WDM link connecting an access node to a spectral router
3050: A plurality of spectral routers
3100: An expanded mesh-network (e-Mesh network)
3122: A set of WDM links connecting an access node 3020 to a passive transposing core 3150
3150: A passive transposing core comprising a plurality of unidirectional passive transposing modules (uni-PTMs) 3230 of a spread parameter m, m>1
3200: Schematic of a kernel of an e-mesh network
3220: An ingress node of the e-mesh kernel
3224: A link of n dual channels connecting an ingress node 3220 to uni-PTM 3230
3228: A set of ingress nodes of the e-mesh kernel
3230: A unidirectional passive transposing module (uni-PTM)
3240: An egress node of the e-mesh kernel
3244: A link of n dual channels connecting a single uni-PTM 3230 to an egress node 3240
3248: A set of egress nodes of the e-mesh kernel 3300: Components of a growable e-mesh network
3400: A first arrangement for synthesizing a global e-mesh network
3410: Channels carrying data from data sources to an ingress node linked to multiple uPTMs
3420: An ingress node linked to each uPTM of a constellation 3450 of H uPTMs, H>1
3422: A number, H, of WDM links, of n dual channels each, connecting an ingress node 3420 to uPTMs of constellation 3450
3450: A constellation of uni-PTMs
3500: A simplified schematic of the first configuration 3400
3600: A first global e-mesh network comprising H, H>1, constellations 3450 of dual-PTMs
3640: An integrated egress node
3641: A link connecting an integrated egress node 3640 to a constellation 3450 of uni-PTMs
3650: Passive transposing core comprising multiple uni-PTMs
3700: A second arrangement for synthesizing a global e-mesh network
3740: An egress node linked to each uPTM of a constellation 3450 of H uni-PTMs, H>1
3744: A number, H, of WDM links, of n dual channels each, connecting uni-PTMs of constellation 3450 to an egress node 3740
3780: Channels carrying data from data sources to an ingress node linked to multiple uPTMs
3800: A simplified schematic of the first configuration 3400
3900: A second global e-mesh network comprising H, H>1, constellations 3450 of dual-PTMs
3950: Passive core, of global network 3900, comprising the specified number, H, of core constellations 3450
4000: An e-mesh network comprising a plurality of shared access nodes 4020 interconnected through the passive transposing core 3650 (FIG. 36, FIG. 39)
4020: A shared access node configured to switch local data (from or to subtending sources and sinks) as well as transit data
4050: A global controller of network 4000 (optional)
4060: A direct path from a source access node 4020A to a destination access node 4020B
4061: A path from the source node 4020A to an intermediate access node 4020
4062: A path from the intermediate access node to the destination access node 4020B
4100: An e-mesh network comprising a plurality of shared access nodes 4020 and gateway nodes 4120 interconnected through the passive transposing core 3650 (FIG. 36, FIG. 39)
4120: A gateway node designated for exchanging data between external sources/sinks and access nodes 4020
4150: A global controller of network 4100 (optional)
4160: A direct path from a gateway node 4120A to a destination access node 4020C
4161: A path from the gateway node 4120A to an intermediate shared access node 4020B
4162: A path from the intermediate shared access node to the destination access node 4020C
4200: An e-mesh network comprising a plurality of access nodes 4220 and transit nodes 4220 interconnected through the passive transposing core 3650 (FIG. 36, FIG. 39)
4220: An access node configured to connect subtending data source and sinks to other access nodes 4220 or transit nodes 4240 but does not process transit data to another access node
4240: A transit node configured to process only transit data from one access node 3020 to another access node 4220
4250: A global controller of network 4200 (optional)
4260: A direct path from an access node 4020A to an access node 4020B
4261: A path from access node 4020A to transit node 4240
4262: A path from the transit node 4340 to access node 4020B
4300: Upstream connectivity of an ingress node to inputs of u-PTMs 1700 or uni-PTMs 3230
4305: A dual outer access-node port connecting to data sources and data sinks
4311: A dual inner access-node port
4320: Upstream WDM link
4330: A spectral multiplexer combining signals from a respective set of dual inner access-node ports 4311
4400: Downstream connectivity of an egress node to outputs of d-PTMs 1800 or of uni-PTMs 3230
4420: Downstream WDM link
4430: A spectral demultiplexer
4500: An access node connecting to core switches through spectral multiplexers and spectral demultiplexers

TERMINOLOGY

Terms used in the present specification are defined below.
Multi-channel link: The term refers to a bundle of communication channels that may be physically distinct or occupying spectral bands of a shared medium.
Passive: The adjective "passive" of any network component indicates that the component provides a non-steerable signal path
Upstream direction: The term refers to signal propagation from an ingress node (the transmitting part of an access node) towards distributors or directly towards an egress node (the receiving part of an access node)
Downstream direction: The term refers to signal propagation from a distributor towards an egress node
Temporal rotator: The term refers to a rotator, having a number, m, of input ports and m output port, cyclically transferring data from each input port each output port. The value of m determines the extent of network expansion and is referenced herein as an "expansion parameter" or a "spread parameter".
Upstream temporal rotator: The term refers to a temporal rotator connecting at input to ingress nodes.
Downstream temporal rotator: The term refers to a temporal rotator connecting at input to distributors.
Simple star network: A simple star network comprises a central distributor interconnecting several access nodes.
Composite-star network: A composite-star network comprises an array of distributors of a same dimension interconnecting several access nodes of a larger dimension. The conventional single-hop Clos network is a composite star network which supports a number of access nodes not exceeding the distributor's dimension.
Access node: A switching device connecting to data sources and data sinks, which may include servers, and configured to transfer data from the data sources to another switching device, from another switching device to the data sinks, and/or from the data sources to the data sinks is referenced as an access node or an edge node.

Distributor: A distributor may be implemented as a data switch, a router, or even a rotator.

Switch: A switch comprises a switching mechanism for transferring data from a set of input ports to a set of output ports. A switch transfers data from any access node connecting to an input port of the switch to access nodes connecting to output ports of the switch. A switch may use an electronic or a photonic switching mechanism.

Dual: The adjective is used to refer to two components where one component handles upstream data while the other handles downstream data. A dual temporal rotator, for example, comprises an upstream temporal rotator and a downstream temporal rotator which may function independently.

Dual channel: A dual channel comprises a channel from a first device to a second device and a channel from the second device to the first device. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa.

WDM link: A number of channels occupying different spectral bands of an electromagnetic transmission medium forms a wavelength-division-multiplexed link (a WDM link).

Dual link: A dual link comprises two directional links of opposite directions.

Collocation: The term refers to spatial proximity of devices which may be interconnected using relatively short links, such as fiber links each carrying a single spectral band. In some implementations, the lengths of the (short) links may be selected to equalize propagation delays.

Spectral multiplexer: A spectral multiplexer combines spectral bands of separate input channels onto an output wavelength-division-multiplexed link (WDM link).

Spectral demultiplexer: A spectral demultiplexer directs individual spectral bands of an input WDM link to separate output channels.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "access controller", "distributor controller", or "global controller" is a hardware entity.

Spectral router: A spectral router (also called "wavelength router") is a passive device connecting a number $\Lambda$ of WDM input links each carrying $\Lambda$ channels, $\Lambda>1$, to a number $\Lambda$ of WDM output links where each output WDM link carries a channel from each input WDM link.

Dual spectral router: A dual spectral router comprises:
an upstream spectral router connecting upstream WDM links from access nodes to WDM links connecting to a set of distributors; and
a downstream spectral router connecting WDM links from the set of distributors to downstream WDM links connecting to the access nodes.

Spectral temporal connector: A spectral-temporal connector is a passive device connecting a number m×Λ of WDM input links each carrying Λ channels, Λ>1, m>1, to a number m×Λ of WDM output links each carrying Λ channels, where each output WDM link carries a fraction (1/m) of a channel from each input WDM link of the m×Λ of WDM input links. The integer multiplier m determines the extent of network expansion.

Dual spectral temporal connector: A dual spectral temporal connector comprises an upstream spectral temporal connector connecting a number m×Λ of upstream WDM links from m×Λ access nodes to a switching stage, and a downstream WDM spectral temporal connector connecting m×Λ WDM links from the switching stage to a number m×Λ of downstream WDM links to the access nodes.

$\lfloor r \rfloor$: $\lfloor r \rfloor$ denotes the nearest integer lower than or equal to a real number "r"; $\lfloor q \rfloor = q$, if "q" is an integer. For example: $\lfloor 7/8 \rfloor = 0$, $\lfloor -7/8 \rfloor = -1$, $\lfloor -8/8 \rfloor = 1$, $\lfloor -8/8 \rfloor - 1$, $\lfloor 9/8 \rfloor = 1$, $\lfloor -9/8 \rfloor = -2$.

$\lceil r \rceil$: $\lceil r \rceil$ denotes the nearest integer higher than or equal to a real number "r"; $\lceil q \rceil = q$, if "q" is an integer Modulo operation: The operation J modulo K, herein denoted $J_{modulo\ K}$, where J is any integer and K is a positive integer is a remainder determined as:

$$J_{modulo\ K} = J - K \times \lfloor J/K \rfloor, \text{ Thus, } 7_{modulo\ 8} = 7,$$
$$(-7)_{modulo\ 8} = \{-7 - (-1) \times 8\} = 1, \quad 8_{modulo\ 8} = 0,$$
$$(-8)_{modulo\ 8} = 0, 9_{modulo\ 8} = 1, \text{ and } (-9)_{modulo\ 8} = 7.$$

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

DETAILED DESCRIPTION

FIG. 1 illustrates a network 100 configured as a conventional composite-star network (a Clos star network) having a number, μ, μ>1, of distributors 140 of equal dimensions (equal numbers of dual ports), each distributor having a number, Γ, Γ>1, of dual ports interconnecting Γ access nodes 120. Each access node 120 has a number of inner dual ports at least equal to μ. An Access node 120 may have unequal inner capacity and outer capacity. The upstream part and downstream part of an access node are referenced as 121 and 122, respectively. Each access node has μ upstream channels, individually or collectively referenced as 124, and μ downstream channels, individually or collectively referenced as 128, to the μ distributors. Each access node receives data traffic from respective sources through a link 111 comprising multiple channels, and deliver data traffic to respective sinks through a link 112 comprising multiple channels.

For a network comprising geographically spread distributors, it may be impractical to connect an access node to the distributors through single channels. One known arrangement is to use spectral routers to connect access nodes to distributors as indicated in the table below.

| Patent # | Title | FIGS. |
|---|---|---|
| U.S. Pat. No. 8,971,340 | Latent space switch using a single transposing rotator | 12-14, 16-19 |
| U.S. Pat. No. 9,565,487 | Network with a fast-switching optical core providing widely varying flow-rate allocations | 4, 22, 23, 30, 31 |
| U.S. Pat. No. 9,596,524 | Time-coherent global network employing spectral routers | 27-31, 34-38, 45-59 |
| U.S. Pat. No. 10,412,472 | Contiguous network | 64-67 |
| U.S. Pat. No. 10,757,488 | Fused three-stage networks forming a global contiguous network | 51-56 |

Figure 2:
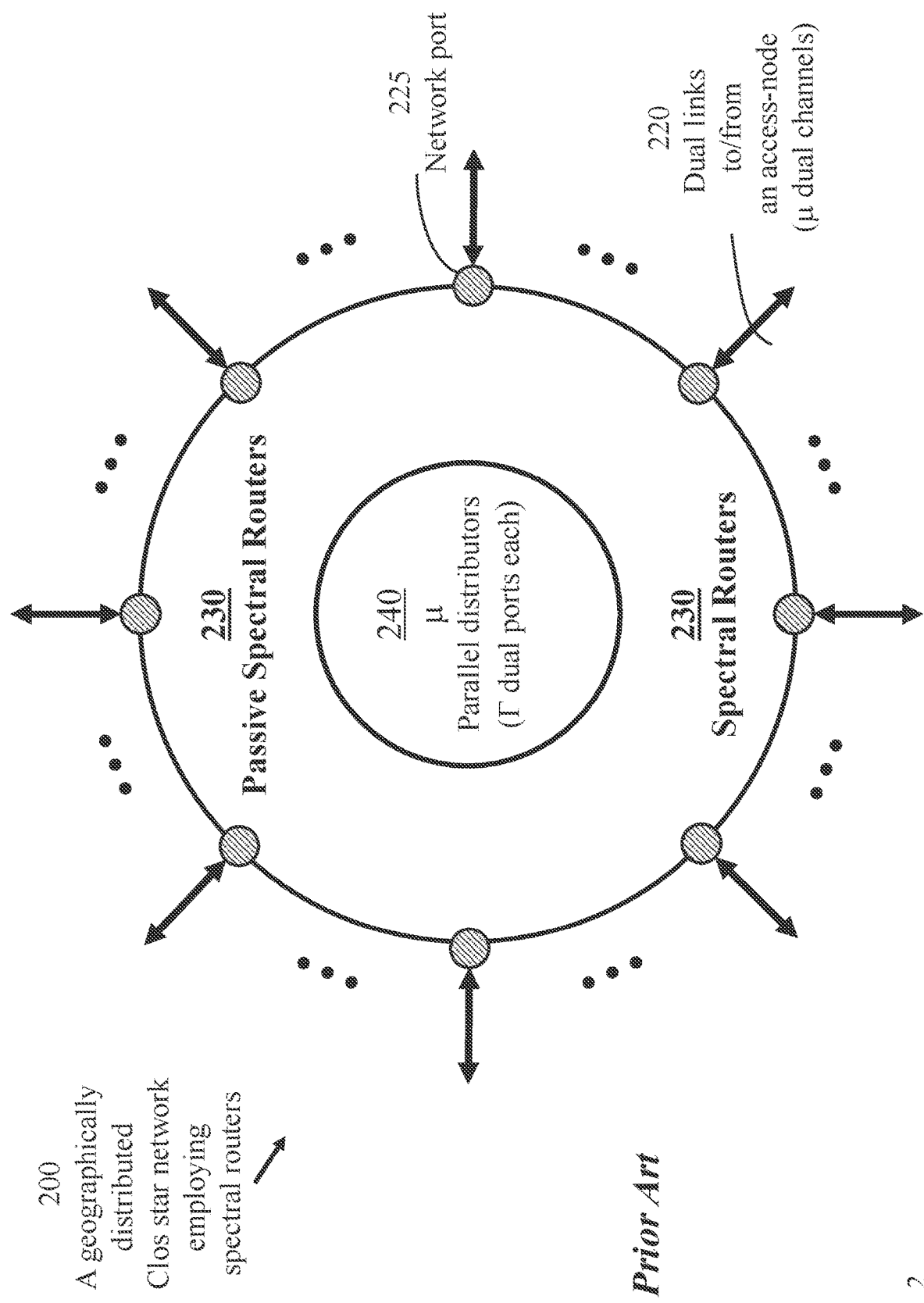
FIG. 2 illustrates the network of FIG. 1 where spectral routers are employed to connect a plurality of access nodes to the parallel core distributors.

FIG. 2 illustrates an implementation 200 of a geographically distributed Clos star network where the access nodes connect to a group 240 of geographically spread distributors 140, of Γ dual ports each, Γ>1, through a layer 230 of spectral routers. Each access node may connect to multiple spectral routers through WDM (wavelength division multiplexed) links as described in the above-listed US patents. The maximum number of access nodes is Γ.

Figure 3:
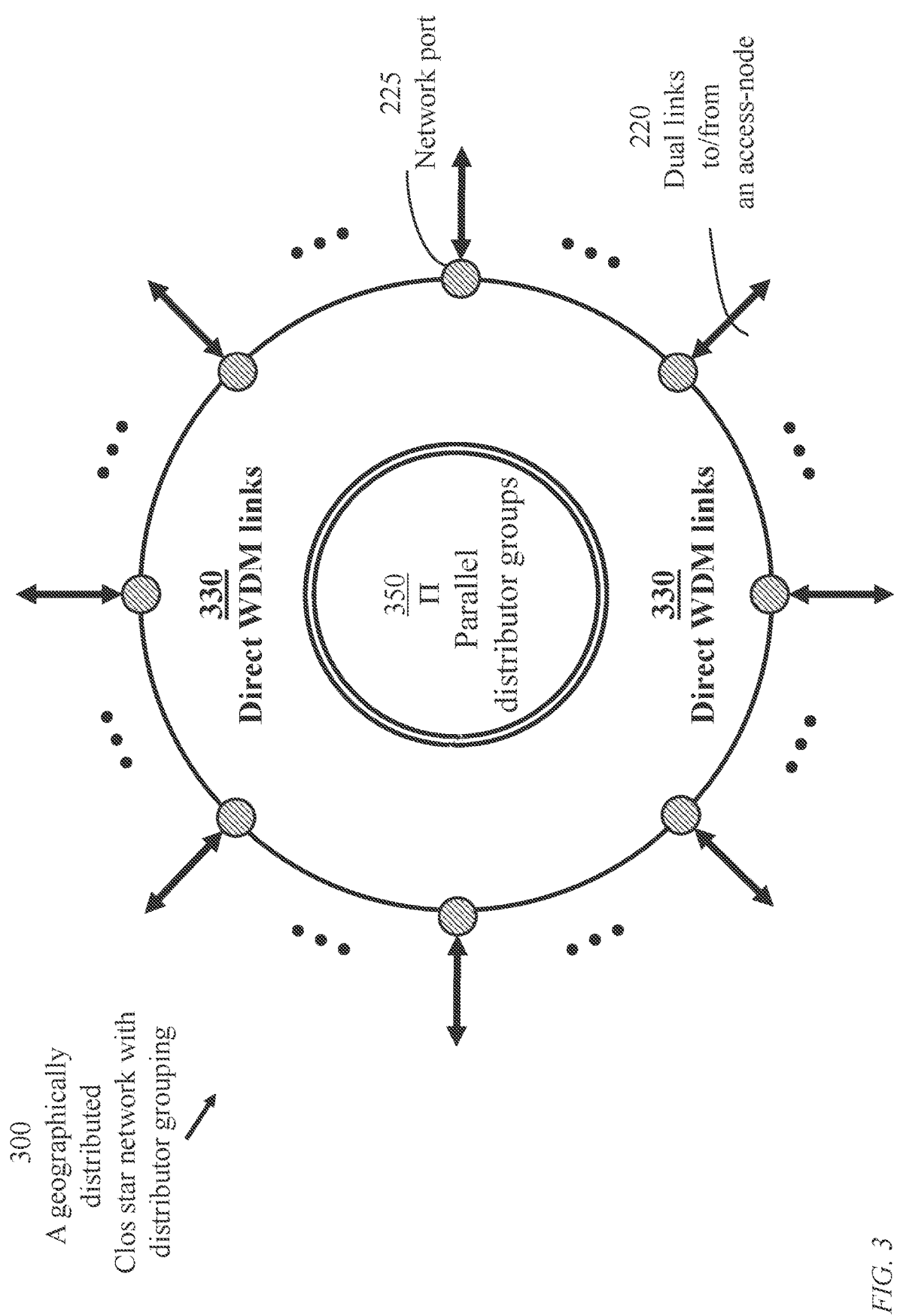
FIG. 3 illustrates a variation of the composite-star network of FIG. 1 where the distributors are grouped into distributor groups, which may be geographically distributed but with collocated distributors within each distributor group, each access node connecting to each distributor group through a WDM link, for use in an embodiment of the present invention.

FIG. 3 illustrates an implementation 300 of the composite-star network of FIG. 1 where the distributors 140 are grouped into a number Π, Π>1, of distributor groups, individually or collectively referenced as 350, in order to avoid use of the intermediate layer 230 of spectral routers. Direct WDM links, collectively referenced as 330, connect the access nodes 120 to the distributor groups. The Π distributor groups may be geographically distributed but the distributors within each distributor group are collocated. Each access node connects to each distributor group through a respective dual WDM link.

Figure 4:
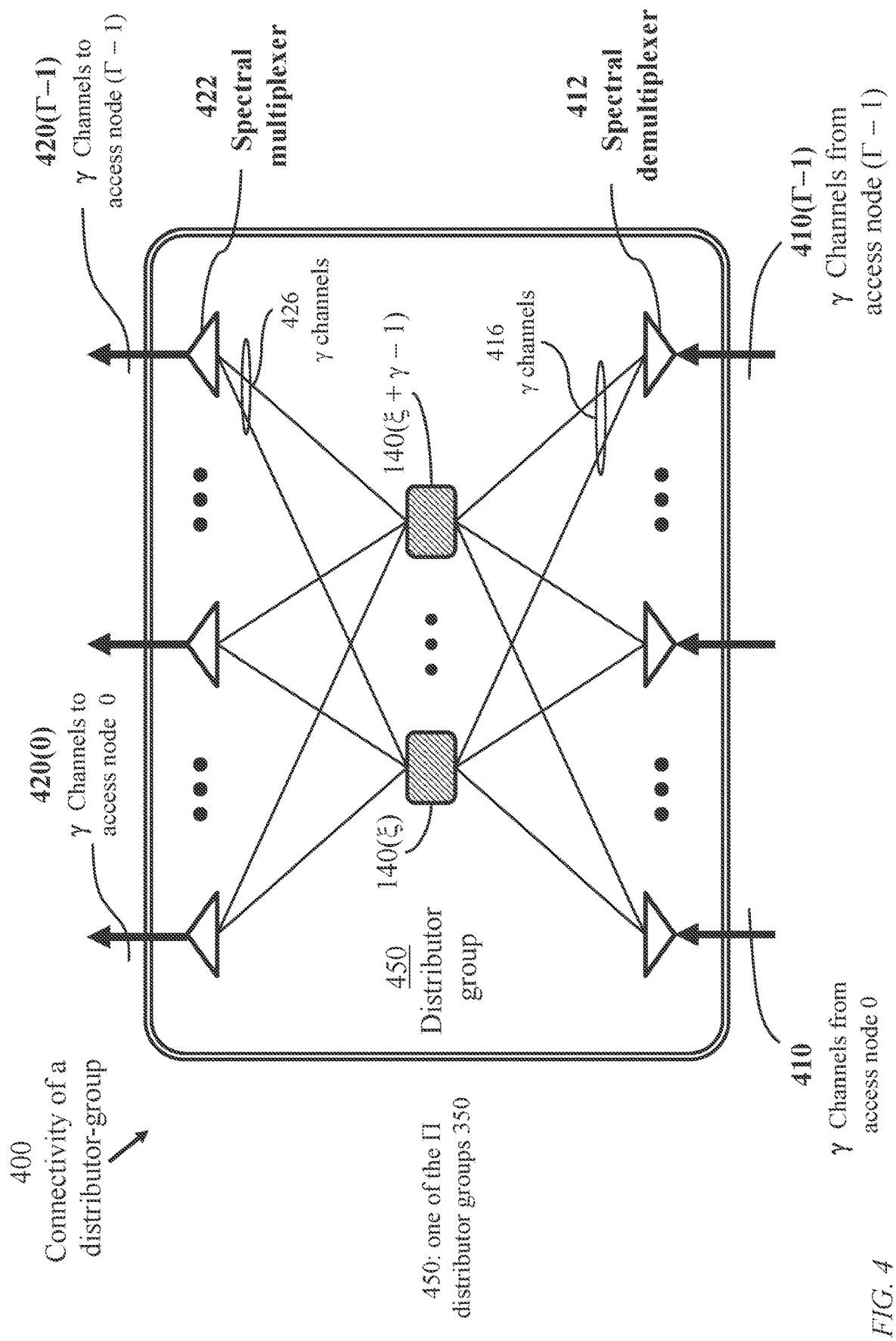
FIG. 4 illustrated a distributor group of a specified number of distributors, connecting to upstream WDM links from individual access nodes through spectral demultiplexers and connecting to downstream WDM links directed to individual access nodes through spectral multiplexers.

FIG. 4 illustrates connectivity 400 of an individual distributor group 350 to respective access nodes. The distributor group comprises a specified number γ, γ>1, of distributors 140, connecting to upstream WDM links 410 from selected access nodes through spectral demultiplexers 412 and connecting to downstream WDM links 420 to the selected access nodes through spectral multiplexers 422. A WDM link 412 comprises γ channels; γ=32, for example.

Figure 5:
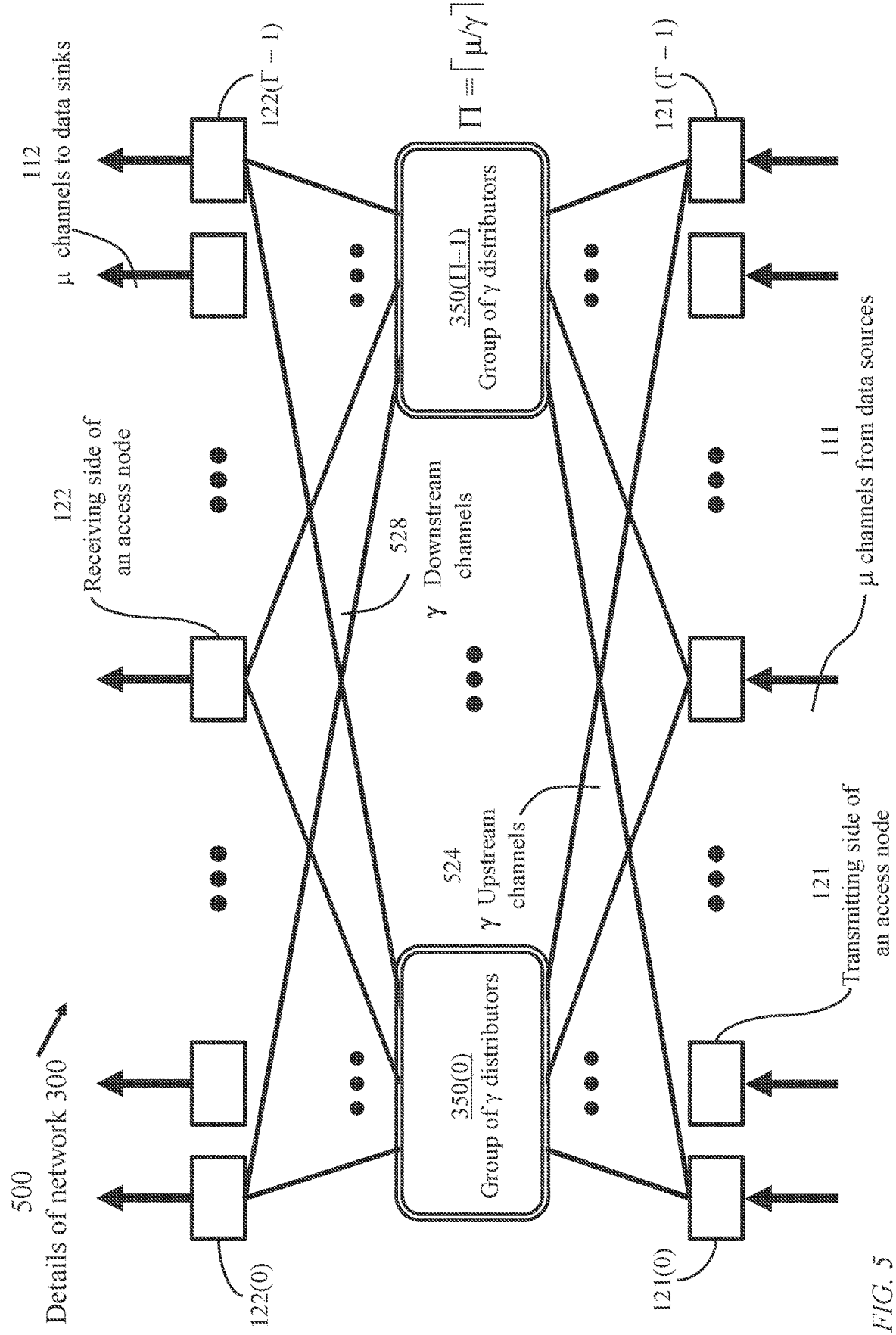
FIG. 5 details the network of FIG. 3, where a number of geographically spread access nodes, equal to a number of dual access ports of each distributor, connect to geographically spread access groups through respective Dual WDM links.

FIG. 5 illustrates an implementation 500 of the network of FIG. 3, where a number of geographically spread access nodes 120, equal to a number Γ of dual access ports of each distributor 140, connect to geographically spread distributor groups through respective upstream WDM links 524, of at most γ channels each, and downstream WDM links 528, of at most γ channels each. Grouping the distributors into distributors groups 350 eliminates the need to employ cross-connectors between access nodes and distributors.

Figure 6:
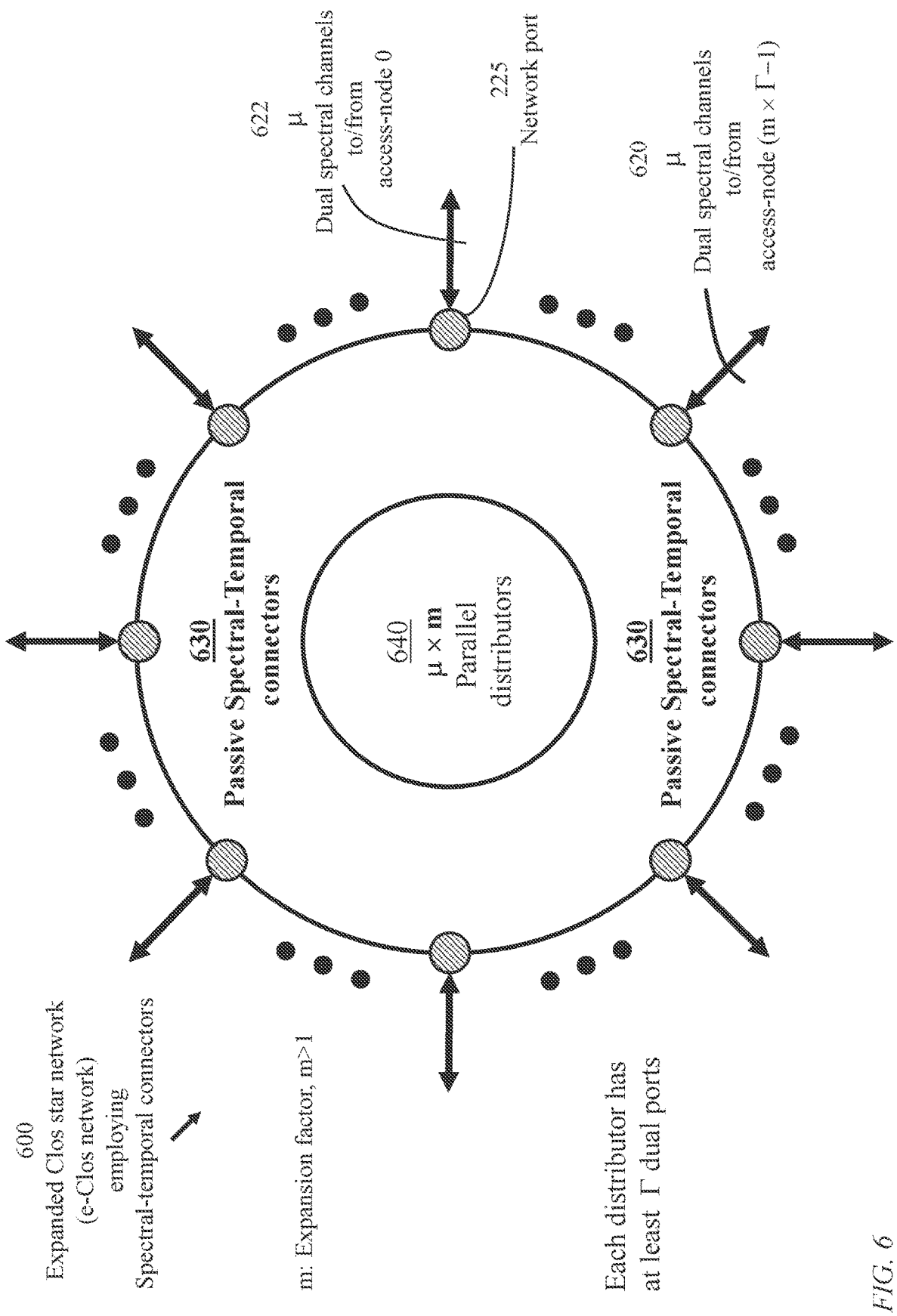
FIG. 6 illustrates an expanded Clos-star network where dual spectral-temporal connectors connect individual access nodes to distributors, in accordance with an embodiment of the present invention.

FIG. 6 illustrates an expanded Clos-star network 600 (where a layer 630 of dual spectral-temporal connectors connect a number Γ of access groups, where Γ is a number of dual ports per distributor 140, to a group 640 of μ×m distributors 140, where μ is a number of dual channels from an access node to the passive spectral-temporal connectors 630. Each access group comprises a preselected number m access nodes 120, m≥1, thus the total number of access nodes is m×Γ. For example, with m=32 and Γ=1024, the total number of provisioned access nodes is 32768. As will be described below, the parameter m is a network expansion parameter (also referenced as a "spread parameter" which is a result of using spectral-temporal connectors 630 instead of spectral routers (spectral connectors) 230.

In accordance with a preferred implementation, a basic component of the layer 630 of spectral-temporal connectors is a passive transposing unit (PTU) to be detailed below.

Figure 7:
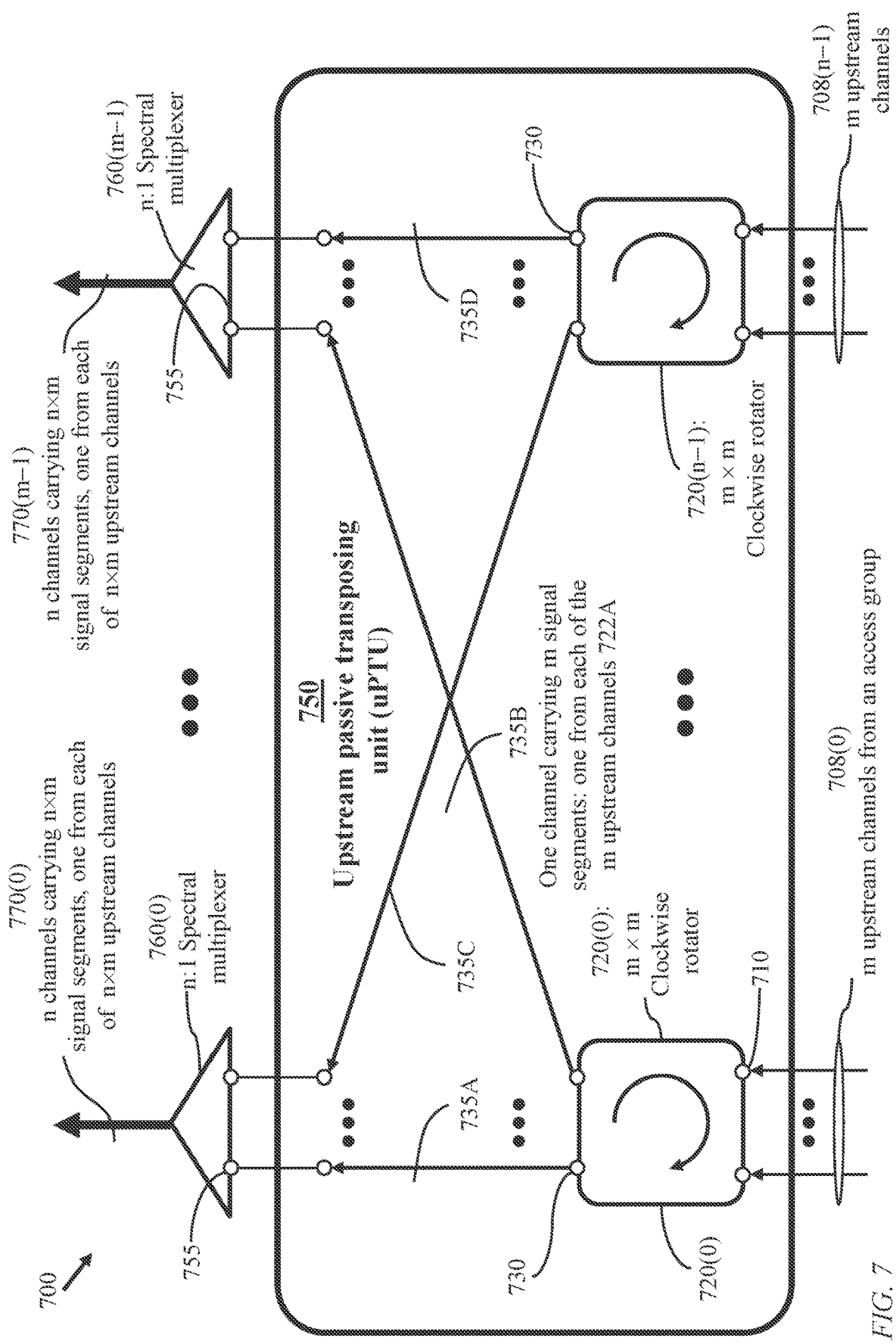
FIG. 7 illustrates an upstream passive transposing unit (upstream PTU, denoted uPTU) comprising a specified number, n, n>1, of clockwise temporal rotators, each clockwise temporal rotator having m input ports and m output ports, each input port connecting to an upstream channel from a respective access node, each output port connecting to an input port of a respective spectral multiplexer of a set of m spectral multiplexers, the uPTU transposing m signal segments of each of n×m upstream channels from respective n×m access nodes to a respective input port of each of the m spectral multiplexers, in accordance with an embodiment of the present invention.

FIG. 7 illustrates connectivity 700 of an upstream PTU (u-PTU) 750 to multi-channel links through spectral multiplexers 760. The u-PTU comprises a specified number, n, n>1, of clockwise temporal rotators 720, each clockwise temporal rotator 720 having a number of input ports 710 equal to the number, m, of access nodes 120 per access group, and a same number, m, of output ports 730. Each input port 710 connects to an upstream channel 708 from a respective access node 120. Each output port 730 connects to an input port 755 of a respective spectral multiplexer 760 of a set of m spectral multiplexers. A spectral multiplexer 760 combines n spectral bands into an upstream WDM link to be directed to a distributor or to an access node. Each upstream channel 708 carries signals organized into m cyclic signal segments to be directed to the output ports of a respective clockwise rotator 720. The upstream PTU transposes m signal segments of each of n×m upstream channels from respective n×m access nodes to a respective input port 755 of each of the m spectral multiplexers. Several u-PTUs are combined to form an upstream passive transposing module (uPTM), illustrated in FIG. 17, which is a building block of the entire network.

Figure 8:
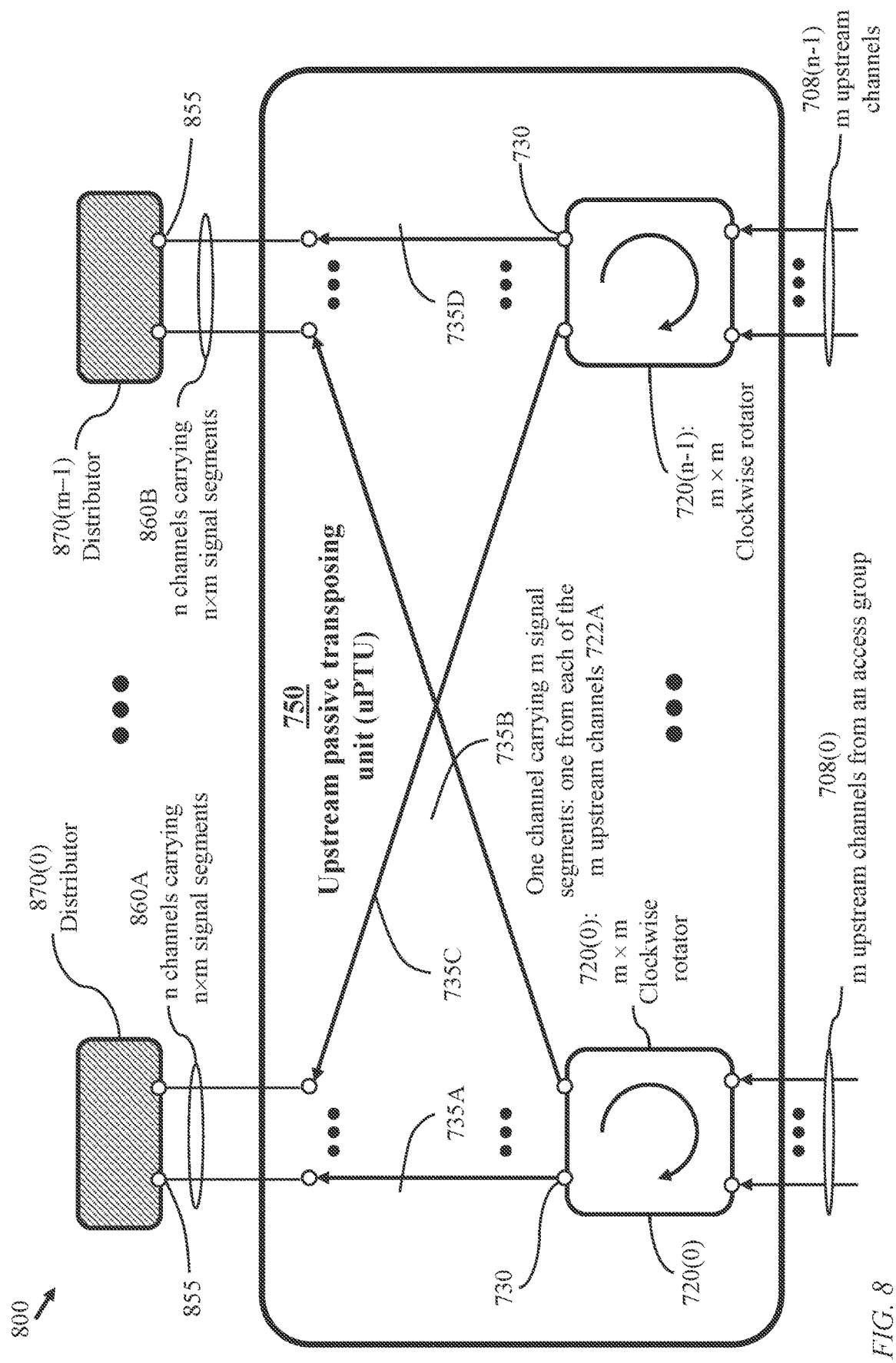
FIG. 8 illustrates an upstream PTU (uPTU) connecting to collocated distributors.

FIG. 8 illustrates connectivity 800 of the upstream PTU 750 of FIG. 7 to a number, m, of collocated distributors 140. The upstream PTU transposes m signal segments of each of n×m upstream channels from respective n×m access nodes to a respective input port 855 of each of the m distributors. The illustrated uPTU is collocated with a set of m distributors 870, hence upstream channels from output ports of clockwise temporal rotators 720 connect directly to distributive 870 according to the illustrated connectivity pattern.

Figure 9:
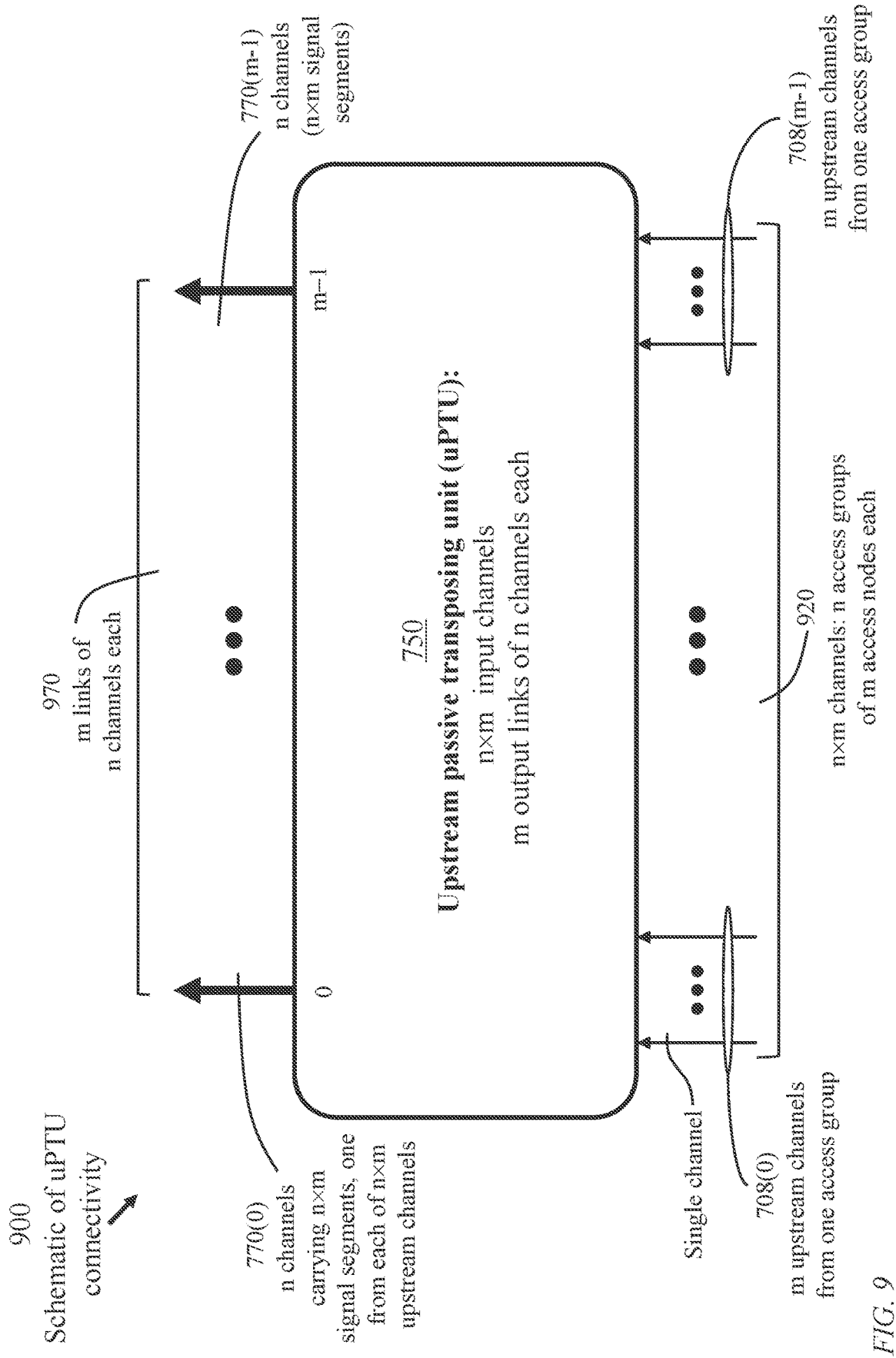
FIG. 9 further illustrates a representation of a uPTU as a device connecting n×m upstream channels to m downstream WDM links, n>1, each downstream WDM link comprising n channels, each channel carrying m signal segments from respective m access nodes, thus each downstream WDM link carries n×m signal segments from respective n×m access nodes.

FIG. 9 is a simplified schematic of the upstream PTU 750 as a device 950 connecting n×m upstream channels, arranged into n upstream WDM links 910 of m channels each, to m downstream WDM links 960, n>1, each downstream WDM link comprising n channels, each channel carrying m signal segments from respective m different access nodes, thus each downstream WDM link carries n×m signal segments from respective n×m different access nodes.

Figure 17:
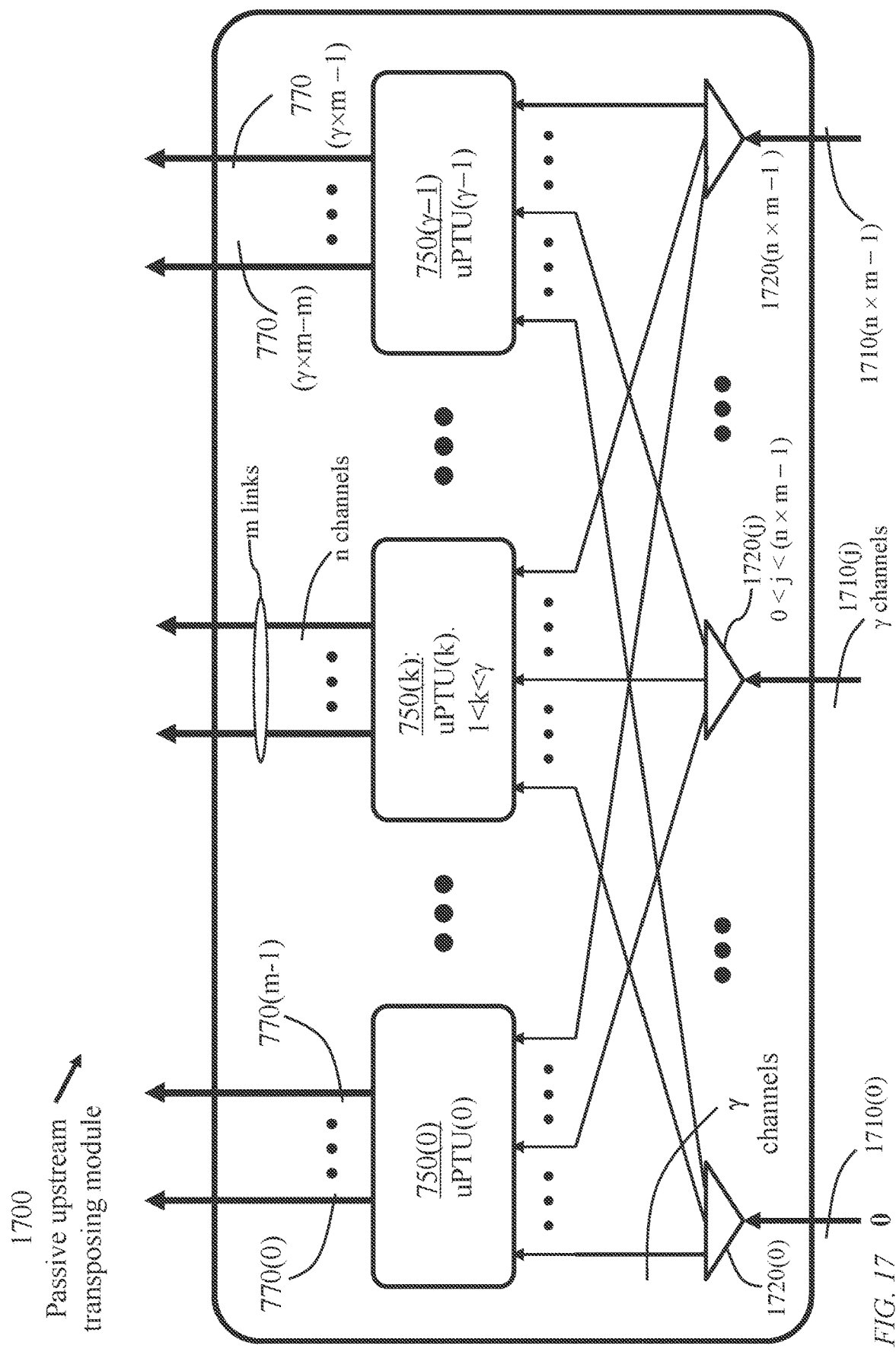
FIG. 17 illustrates arranging uPTUs into upstream passive transposing modules, referenced as uPTMs, in accordance with an embodiment of the present invention.

As illustrated, uPTU 750 has m WDM upstream links connecting to the distributors 870 but individual input channels from access nodes. Hence a group of uPTUs are combined to form a uPTM that connects directly to access nodes via WDM upstream links as illustrated in FIG. 17.

Figure 10:
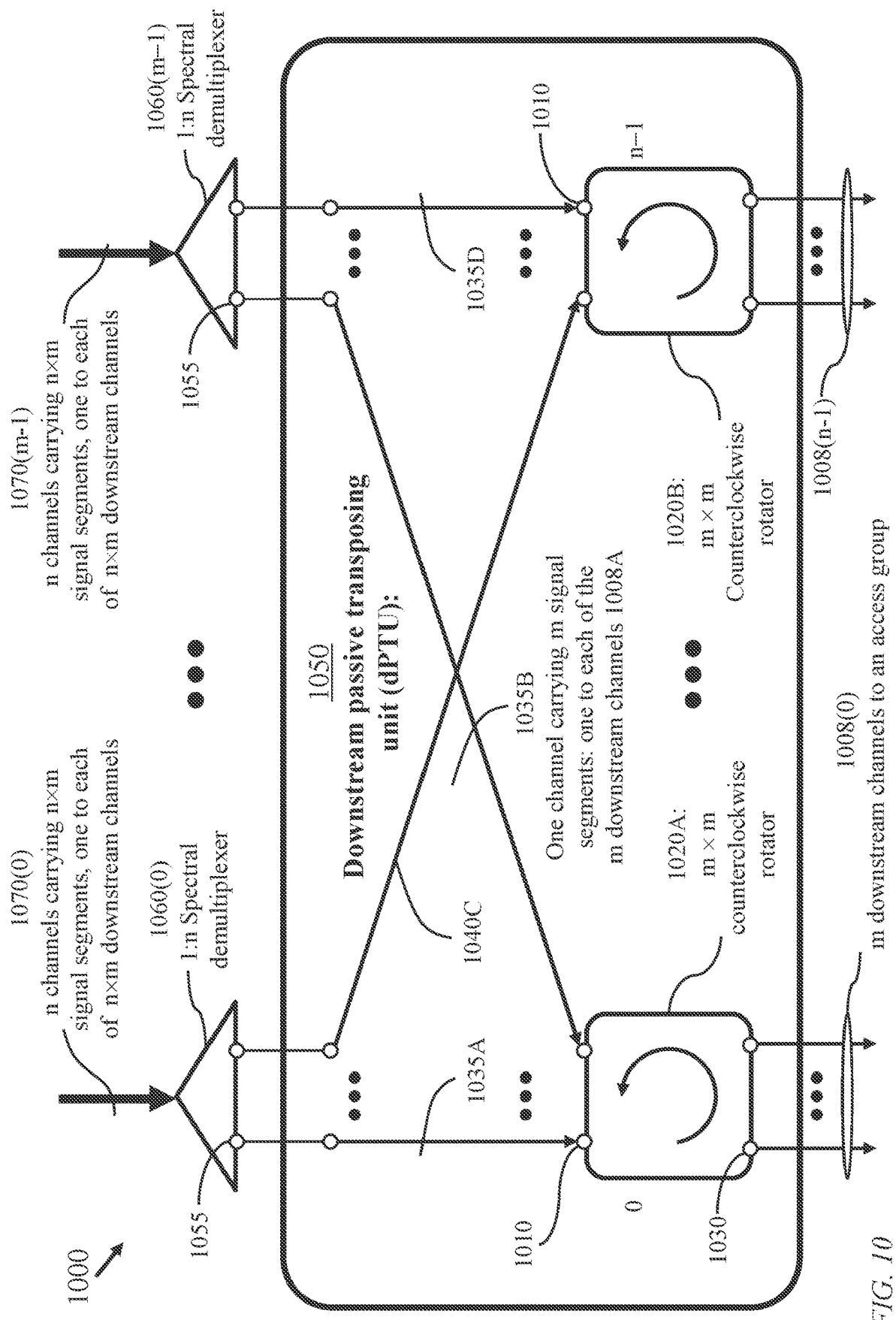
FIG. 10 illustrates a downstream PTU (dPTU) comprising m spectral demultiplexers, each spectral demultiplexer receiving a WDM link of n channels from a distributor and directing each channel to a respective demultiplexer output port having a channel to an input port of a respective counterclockwise temporal rotator of a set of n counterclockwise temporal rotators, each counterclockwise temporal rotator having m input ports and m output ports, each rotator output port connecting to a downstream channel directed to a respective access node, the dPTU transposing m signal segments at each output port of each spectral demultiplexer to m downstream channels each connecting to an access node of a respective access group, in accordance with an embodiment of the present invention.

FIG. 10 illustrates connectivity 1000 of a downstream PTU (dPTU) 1050 comprising a specified number, n, n>1, of spectral demultiplexers 1060, each spectral demultiplexer connecting to a downstream WDM link 1070 of n channels from a distributor or from an access node and directing each channel to a respective demultiplexer output port 1055 having a channel 1035 to an input port 1010 of a respective temporal counterclockwise rotator 1020 of a set of n counterclockwise temporal rotators, each counterclockwise temporal rotator having m input ports and m output ports. Each temporal rotator output port 1030 connects to a downstream channel directed to a respective access node. The downstream PTU transposes m signal segments at each output port of each spectral demultiplexer to m downstream channels 1008 each connecting to an access node of a respective access group.

Figure 11:
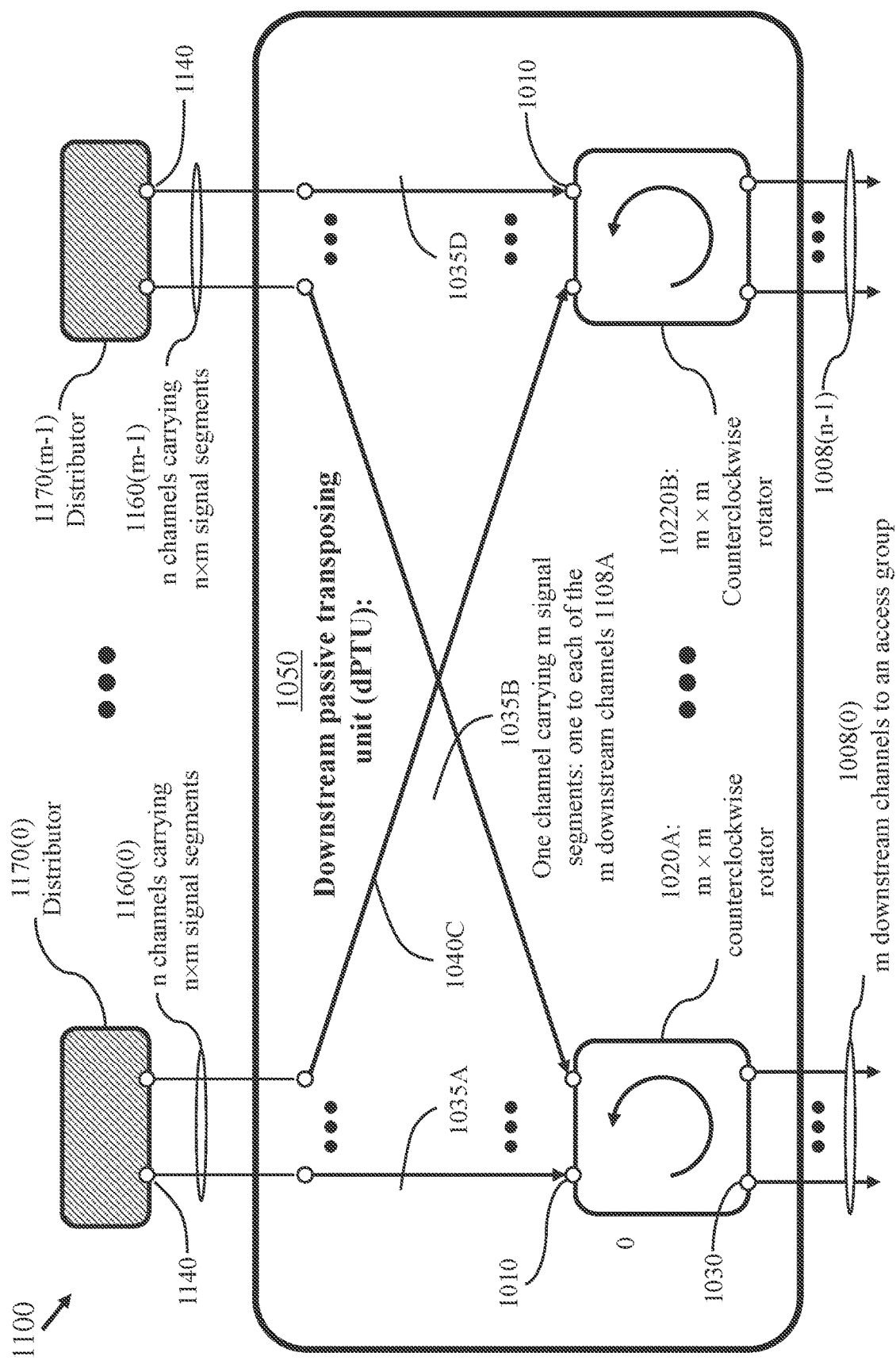
FIG. 11 illustrates a dPTU connecting to collocated distributors.

FIG. 11 illustrates connectivity 1100 of the dPTU 1050 of FIG. 10 to a number, m, of collocated distributors 140. The downstream PTU transposes signal segments at output ports 1140 of the m distributors to each of n×m downstream channels 1008.

Figure 12:
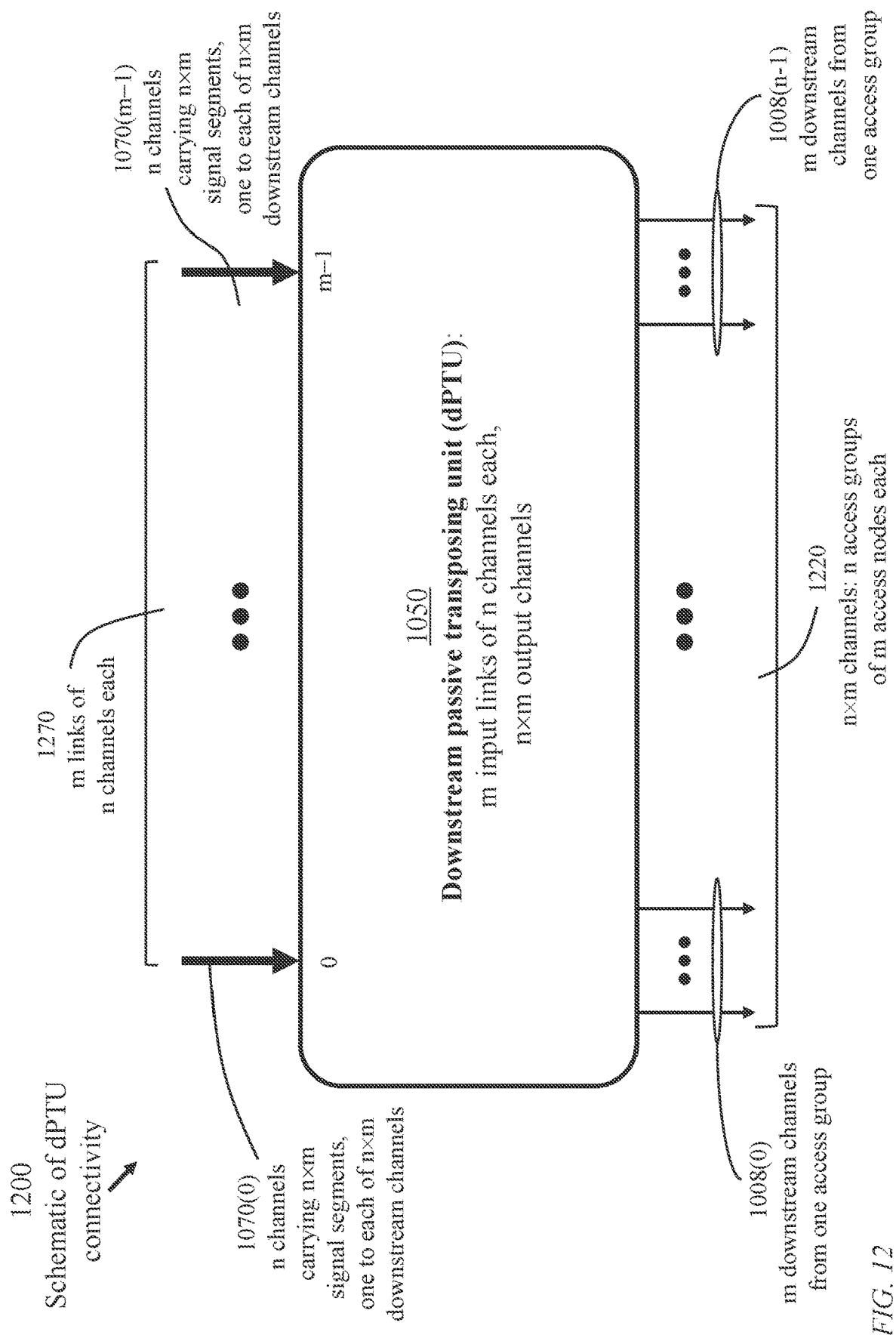
FIG. 12 further illustrates a representation of a dPTU as a device connecting m downstream WDM links, of n channels each, from a distributor to n×m downstream channels to n downstream WDM links, each downstream channel carrying m signal segments from respective m distributors.

FIG. 12 is a simplified schematic of a downstream PTU 1050 connecting m downstream WDM links 1070, of n channels each to n×m downstream channels 1008. Each downstream channel 1008 carries m signal segments from the m distributors.

Figure 18:
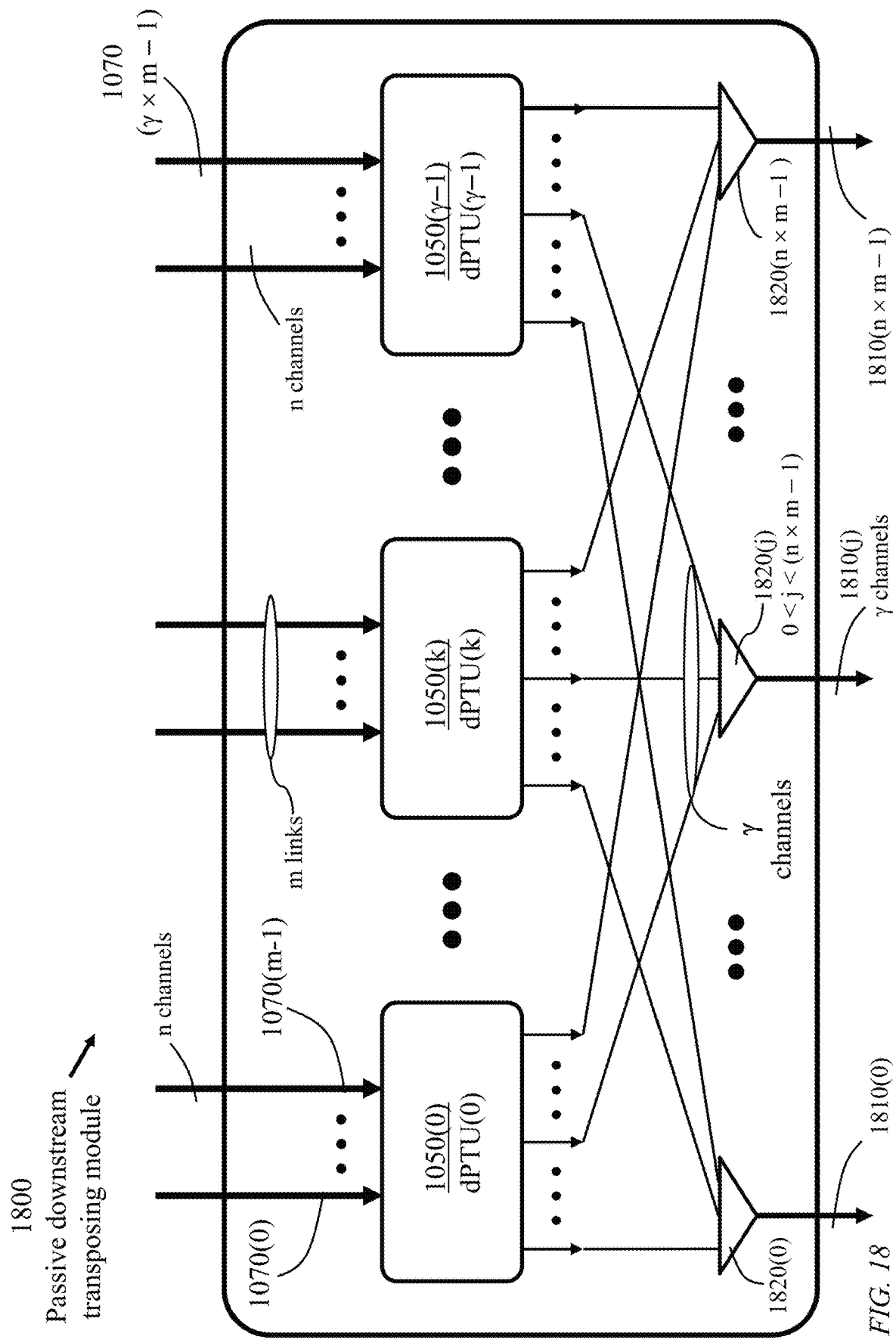
FIG. 18 illustrates arranging dPTUs into downstream passive transposing modules, referenced as uPTMs, in accordance with an embodiment of the present invention.

As illustrated, dPTU 1050 has m WDM upstream links from distributors but individual output channels to access nodes. Hence a group of dPTUs are combined to form a dPTM that connects directly to access nodes via WDM upstream links as illustrated in FIG. 18.

Figure 13:
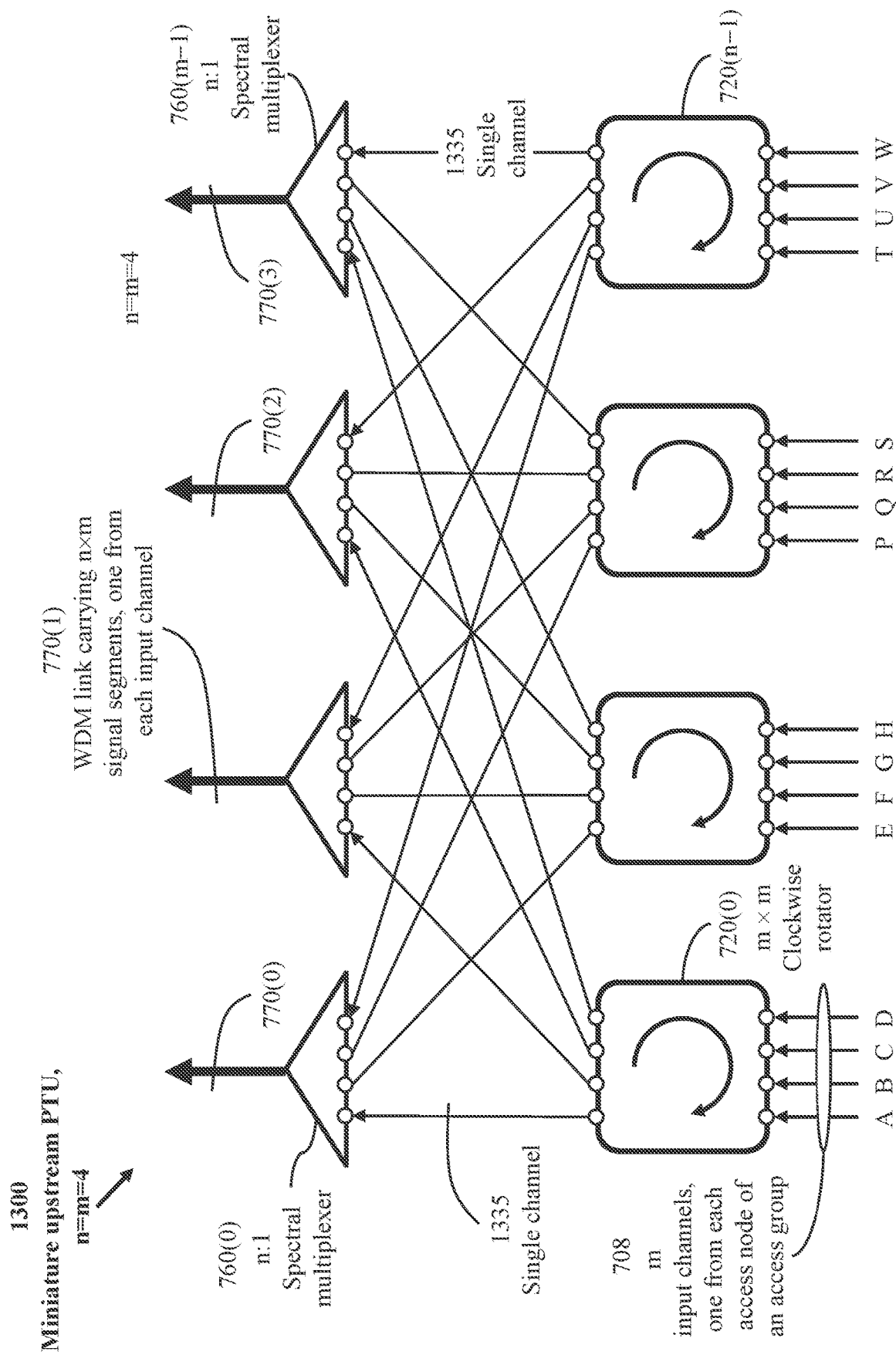
FIG. 13 illustrates a miniature uPTU, with n=m=4, for clarifying the process of upstream signal-segment transposition, in accordance with an embodiment of the present invention.

FIG. 13 illustrates an example 1300 of a miniature u-PTU 750, with n=m=4, to be used for clarifying the process of upstream signal-segment transposition.

Figure 14:
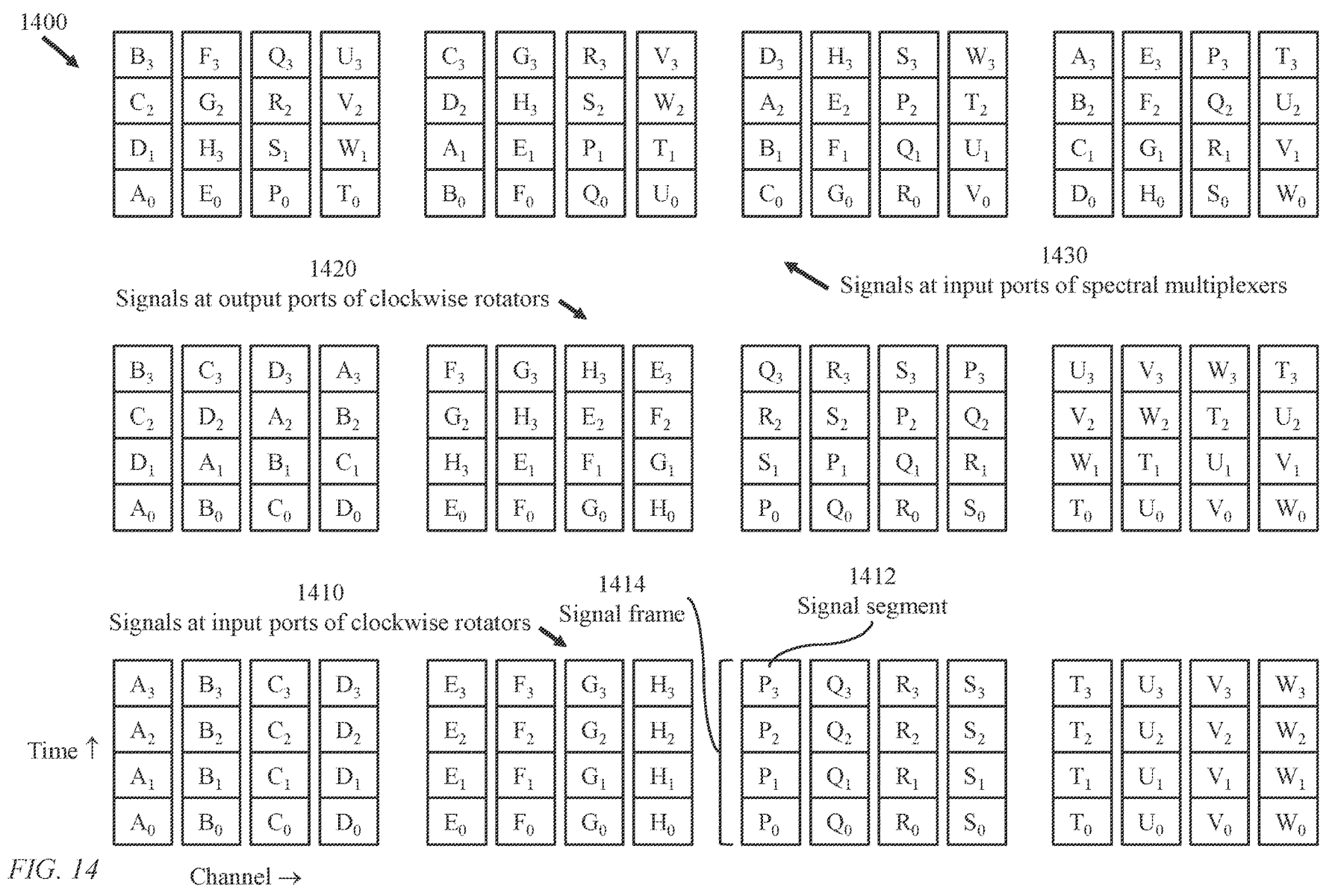

FIG. 14 Illustrates signal-segments formation in the upstream direction. Tables 1400 indicate overall signal-segments transposition in miniature upstream PTU 750, including signal segments 1410 at input ports of the four clockwise temporal rotators of FIG. 10, signal segments 1420 at output ports of the four clockwise temporal rotators, and signal segments 1430 at input ports of the spectral multiplexers. Each input port of a clockwise temporal rotator receives signals arranged into cyclic signal frames 1414, each signal frame comprising m signal segments 1412. A first clockwise temporal rotator 720(0) receives signals from four upstream channels labeled "A", "B", "C", and "D". A second clockwise temporal rotator 720(1) receives signals from four upstream channels labeled "E", "F", "G", and "H", and so on. The m signal segments of a signal frame received from upstream channel "A", are identified as "A0", "A1", "A2", and "A3". The m signal segments of the signals received from upstream channels "B", "C", "D", "E", "F", "G", "H", "P", "Q", "R", "S", "T", "U", "V", "W", are likewise identified. As illustrated, the signal segments at the input ports of each spectral multiplexer 760 comprise one signal segment from each of the n×m upstream channels "A" to "W".

Figure 15:
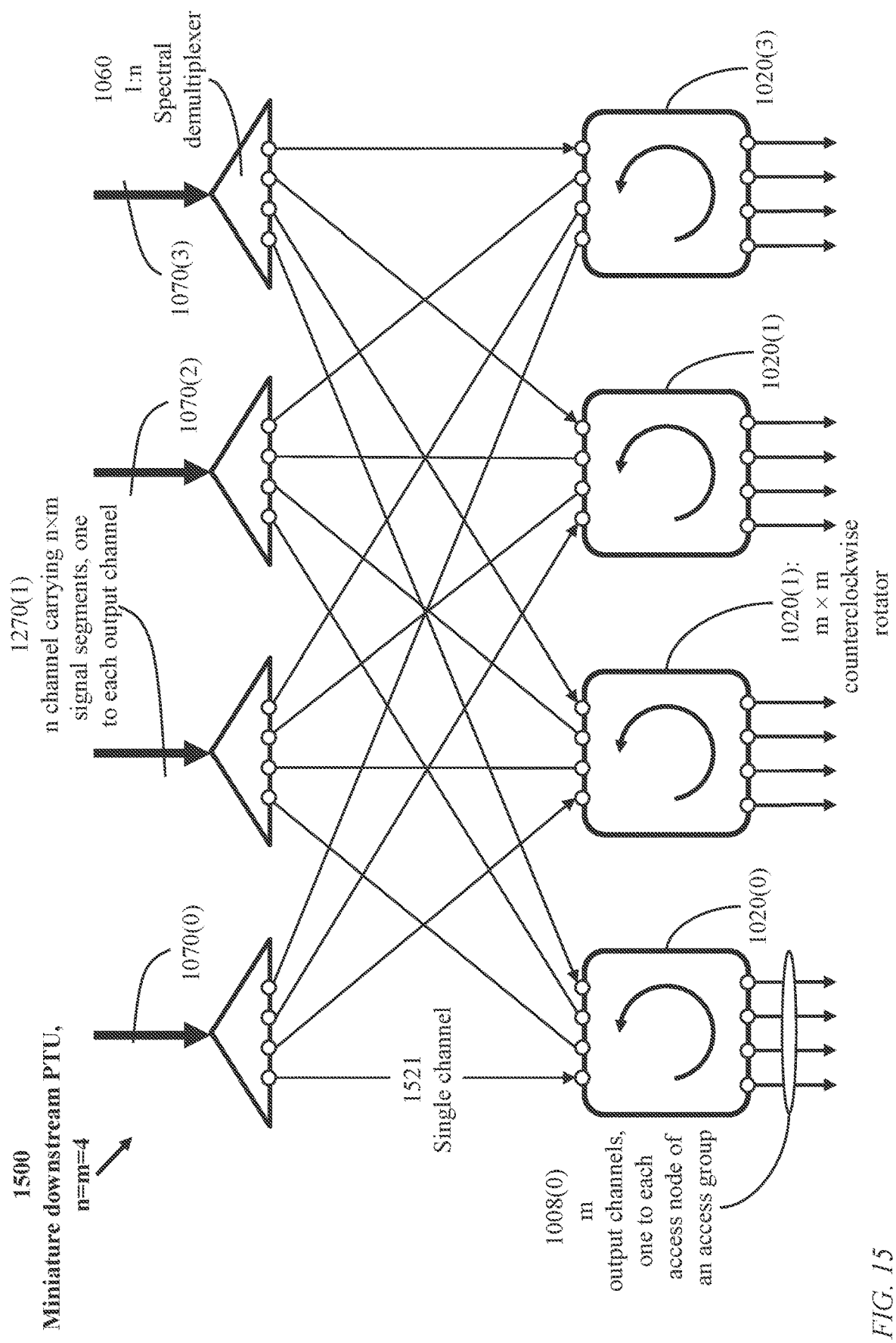
FIG. 15 illustrates a miniature dPTU, with n=m=4, for clarifying the process of downstream signal-segment transposition, in accordance with an embodiment of the present invention.

FIG. 15 illustrates a miniature d-PTU 1500, with n=m=4, for use in clarifying the process of downstream signal-segment transposition.

Figure 16:
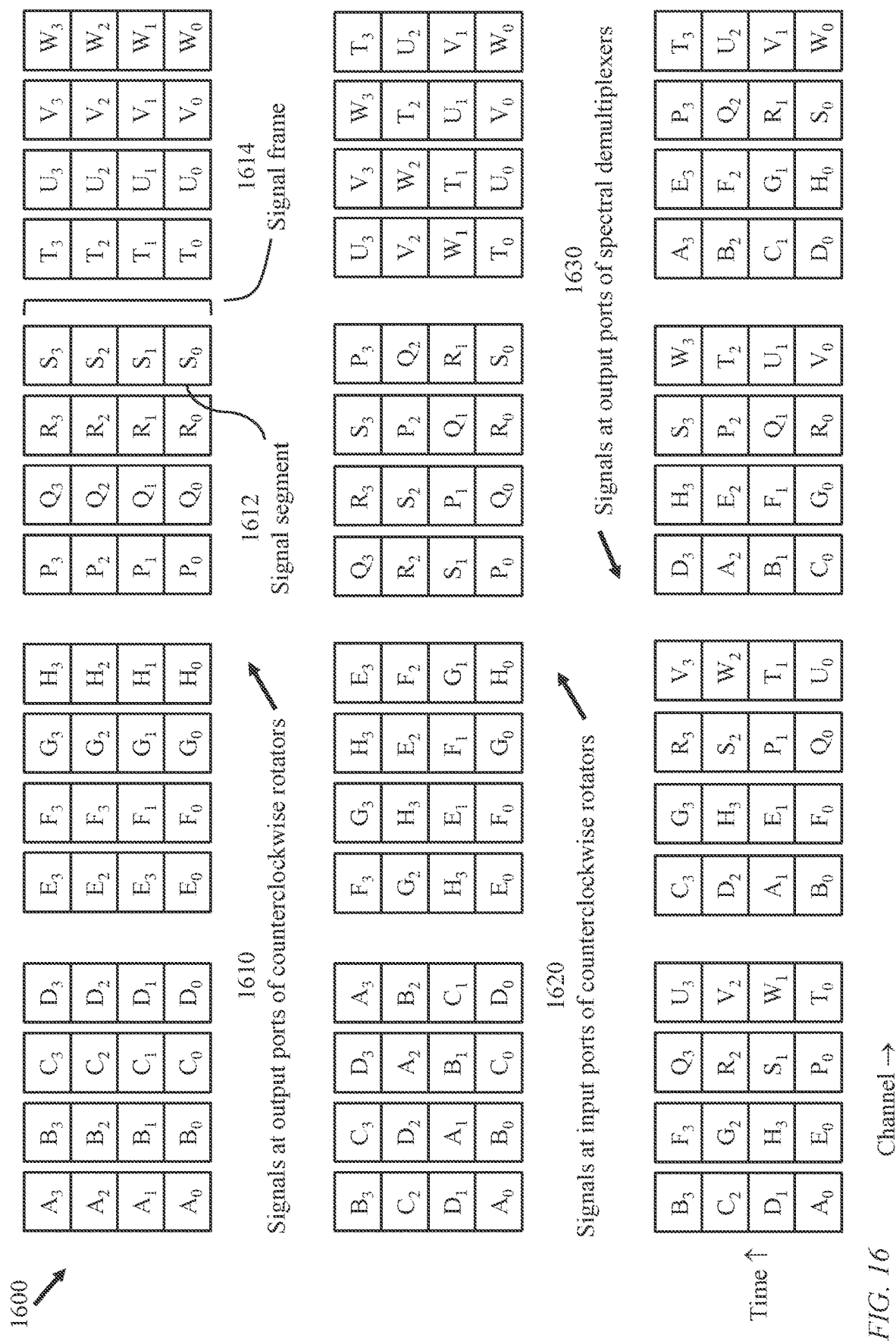
FIG. 16 illustrates signal segments at output ports of the four spectral demultiplexers of FIG. 15, signal segments at input ports of the four counterclockwise temporal rotators, and signal segments at output ports of the counterclockwise temporal rotators.

FIG. 16 illustrates tables 1600 indicating overall signal-segments transposition in dPTU 1500, including signal segments 1610 at output ports of the four spectral demultiplexers 1560 of FIG. 15, signal segments 1620 at input ports of the four counterclockwise temporal rotators 1520, and signal segments 1630 at output ports of the counterclockwise temporal rotators 1520.

Signal segments 1610 correspond to signal segments 1430 of FIG. 14.

Signal segments 1620 correspond to signal segments 1420 of FIG. 14.

Signal segments 1630 correspond to signal segments 1410 of FIG. 14.

FIG. 17 illustrates an upstream passive transposing module (uPTM) 1700 comprising a number, γ, γ>1, of uPTUs 750. The uPTM 1700 connects at input to a respective set of (n×m) of access nodes organized into a number n of access groups of m access-nodes each, n>1, m>1. Each access node, of the respective set of (n×m) access nodes, has a respective multi-channel link 1710, carrying γ channels, to a respective spectral demultiplexer 1720 which supplies one channel of a link 1710 to each of the γ uPTUs 750. Thus, each uPTU 750 connects at input to n×m channels; one channel from each of the respective set of (n×m) access nodes.

Each uPTU transposes m signal segments of each of n×m upstream channels from respective n×m access nodes to a respective output channel group 780 comprising m output multichannel links 770 as illustrated in FIG. 7. Each output link 770 comprises n channels with each channel carrying cyclic m signal segments of an access group of m access nodes. Thus, each output multichannel link 770 of each uPTU carries a data segment from each of the n×m access nodes coupled to uPTM 1700. In summary, uPTM 1700 provides "permanent" paths from each of n×m multichannel links 1710, of γ channels each, emanating from respective n×m access nodes to each output link 770 of a total of γ×m links 770 of n channels each.

FIG. 18 illustrates a downstream passive transposing module (dPTM) 1800 comprising a number, γ, γ>1, of dPTUs 1050. The dPTM 1800 connects at input to a respective set of (γ×m) WDM links of n channels each organized into a number γ of link groups of m links each, γ>1, m>1, n>1. The dPTM 1800 connects at output to a respective set of n×m access nodes through links 1810 of γ channels each.

Each dPTU transposes m signal segments of each of n downstream channels from respective m distributors to a respective access group as illustrated in FIG. 8.

The dPTM comprises n×m spectral multiplexers 1820, each spectral multiplexer 1820 combining γ downstream channels, one from each dPTU.

Figure 19:
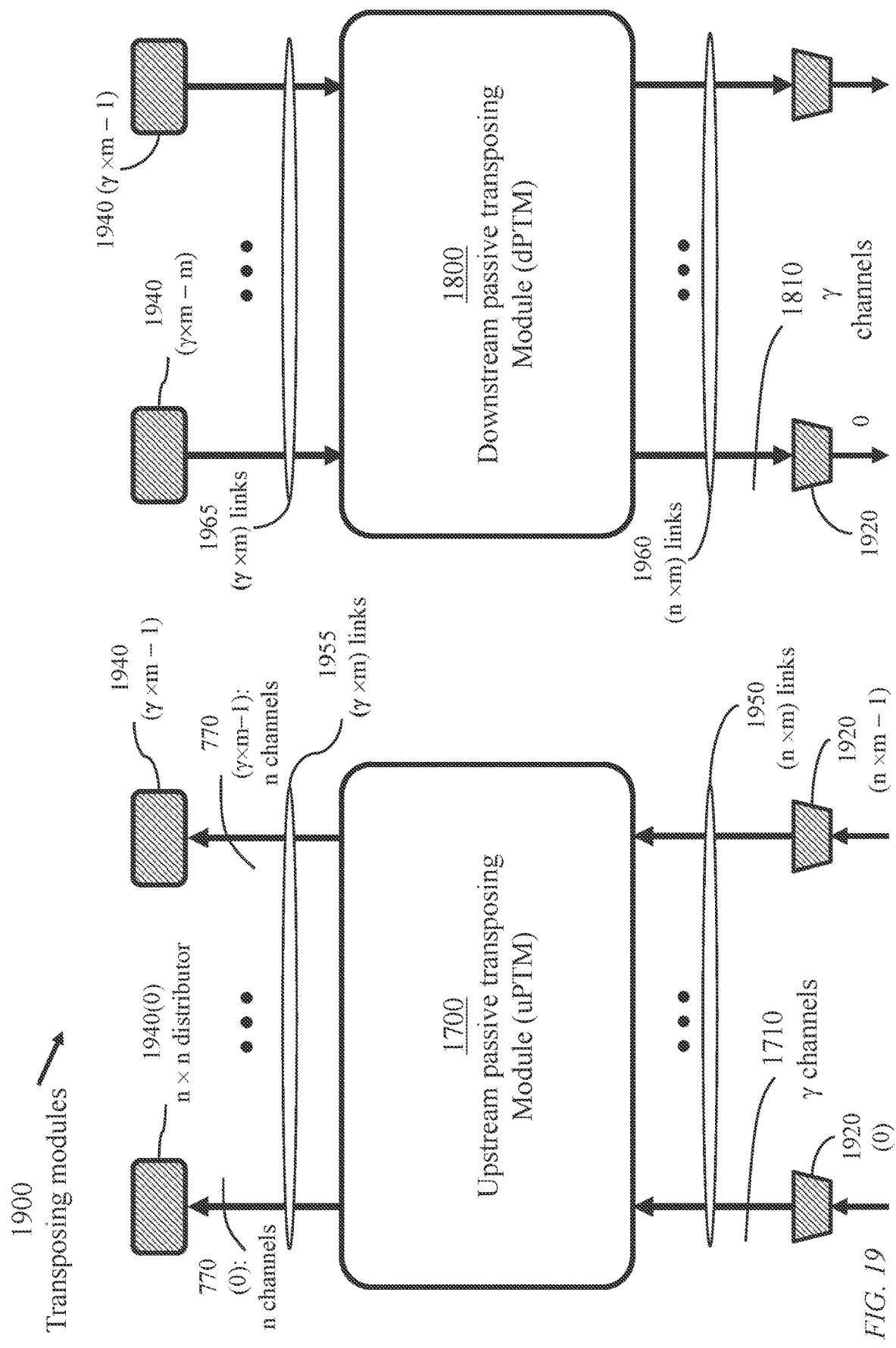
FIG. 19 illustrates connectivity of an uPTM and a dPTM to a plurality of access nodes and a plurality of distributors.

FIG. 19 is a schematic 1900 of connectivity of an upstream passive transposing module (uPTM) 1700 and a downstream passive transposing module (dPTM) 1800 to a set of n×m access nodes 1920 and a set γ×m of distributors 1940 forming the kernel of an expanded Clos network (e-Clos network). A distributor 1940 may be electronic or optical.

The uPTM 1700 connects at input to a set 1950 of (n×m) WDM links 1710, of γ channels each, from access nodes 1920 and connects at output to a set 1955 of γ×m WDM links 770, of n channels each, to distributors 1940. The dPTM 1800 connects at input to a set 1965 of γ×m WDM links 1070, of n channels each, from distributors 1940 and connects at output to a set 1960 of n×m WDM links 1810, of γ channels each, to access nodes 1920.

Figure 20:
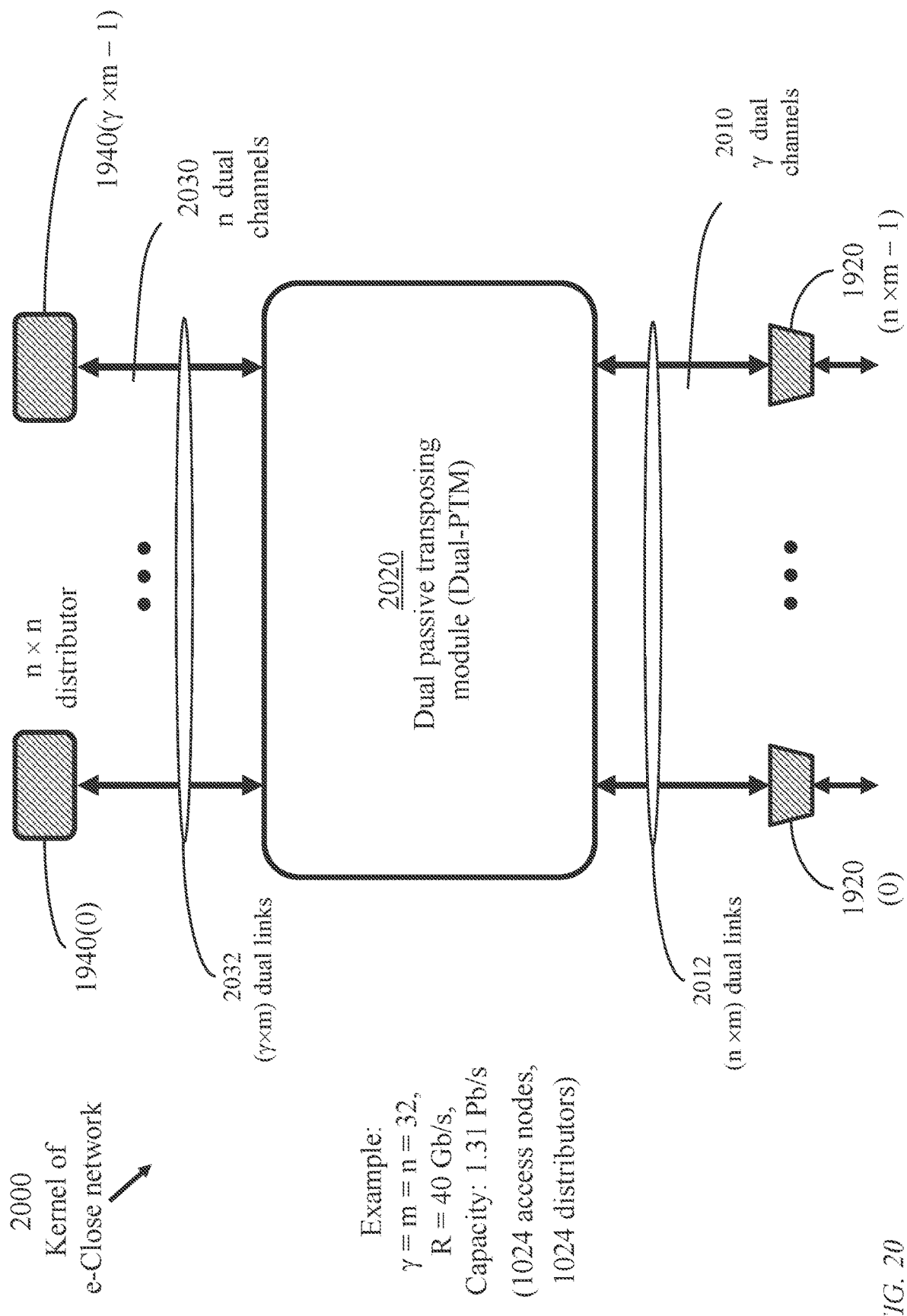
FIG. 20 illustrates connectivity of a passive dual upstream-downstream module, referenced as dual passive module, to a number of access nodes and a number of distributors.

FIG. 20 is a schematic of a kernel 2000 of an e-Clos network comprising a dual passive transposing module (dual-PTM) 2020, which combines a uPTM 1700 and a dPTM 1800, connecting to a set of n×m access nodes 1920 and a set of γ×m distributors 1940. Each access node 1920, of a set of (n×m) access nodes, connects to the dual-PTM 2020 through a dual WDM link of γ dual channels each (comprising an upstream link 1710 and a downstream link 1810). Each distributor 1940, of the set of γ×m distributors, has a dual multi-channel link 2030 of n dual channels connecting to the dual-PTM 2020. The set 2012 of dual multichannel links 2010 comprises n×m links of γ channels each. The set 2032 of dual multichannel links 2030 comprises γ×m links of n channels each.

Figure 21:
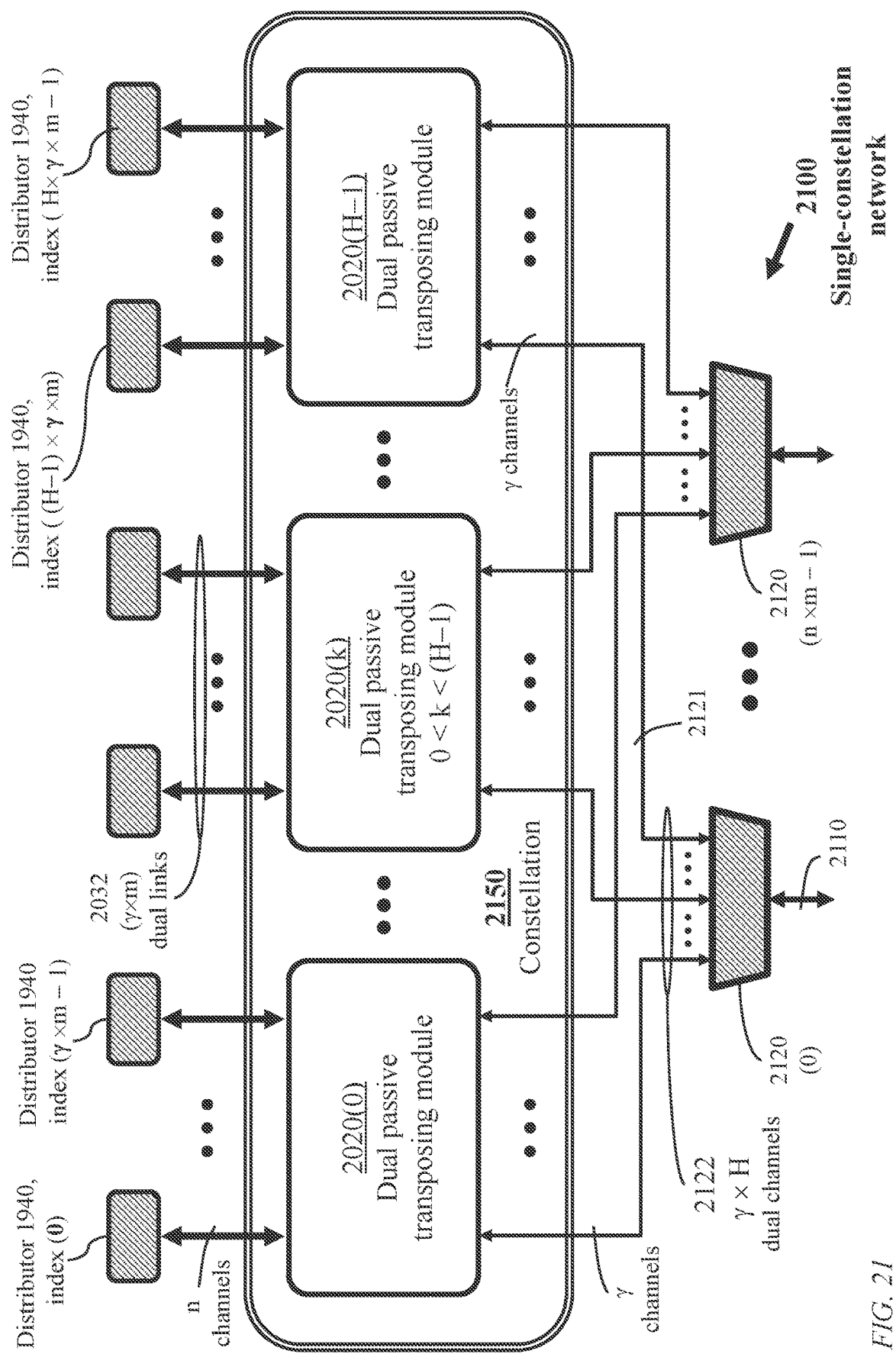
FIG. 21 illustrates a first single-constellation network of global coverage where a constellation of passive dual transposing modules interconnects all of the access nodes of a global network to a set of distributors, in accordance with an embodiment of the present invention.

FIG. 21 illustrates a first single-constellation network 2100 of global coverage comprising a constellation 2150 of a predetermined number, H, H≥1, of dual-PTMs 2020 connecting integrated access nodes 2120 to a plurality of distributors 1940. Constellation network 2100 comprises H kernels 2000 with integrate access nodes 1920 so that each access node 1920 of the n×m access nodes of one kernel is integrated with (H−1) counterpart access nodes of the other kernels to form an integrated access node 2120 having H dual links, of γ dual channels each. Each of the H dual links connects to a respective dual-PTM 2020. A dual link 2121 connects an access node 2120 to a dual-PTM 2020. A set 2122 of H dual links connects an access node 2120 to the constellation 2150. Integrated access node 2120 connects to respective data sources and data sinks through dual links 2110. Each dual-PTM connects to a respective set of γ×m distributors 1940. The total number of distributors 1940 is H×γ×m, with each distributor 1940 having n dual ports.

With H=γ=m=n=32, for example, the total number of distributors is 32768 and the total number of integrated access nodes 2120 is 1024. With each unidirectional channel in the network having a capacity R of 40 Gb/s, the capacity of the network is 41.94 Pb/s.

Constellation network 2100 is preferred when it is desired to use distributors of a relatively small dimension.

Figure 22:
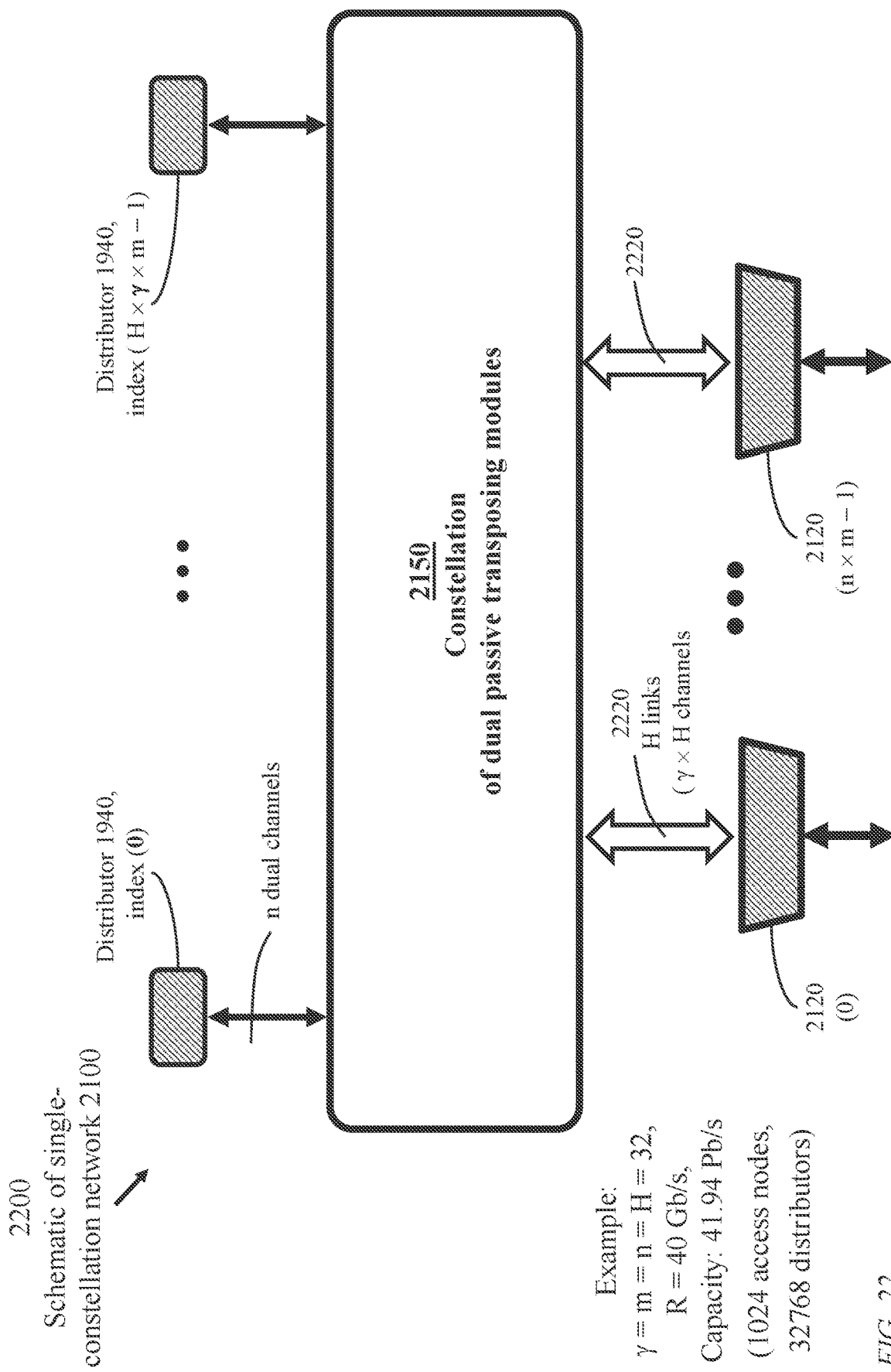
FIG. 22 is a simplified schematic of the constellation of FIG. 21.

FIG. 22 is a simplified schematic of constellation network 2100 representing the constellation 2150 of H dual-PTMs, without details, connecting to each integrated access node 2120 through H dual links 2220 carrying γ×H dual channels and connecting to each distributor 1940 through a dual link of n dual channels.

Figure 23:
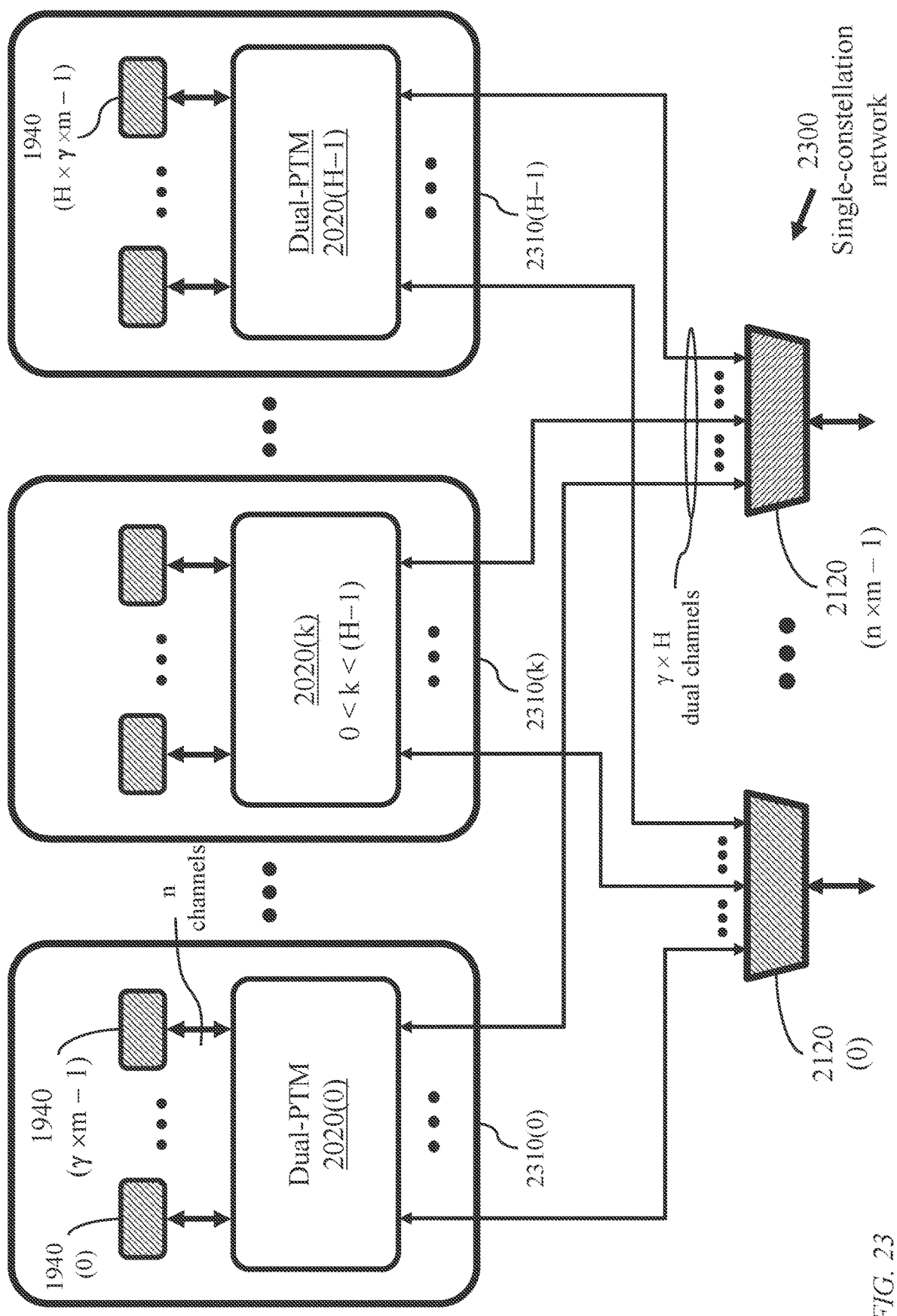
FIG. 23 illustrates an optical-core constellation network adapted from the constellation network of FIG. 21 to use fast-switching optical distributors, in accordance with an embodiment of the present invention.

FIG. 23 illustrates an optical-core constellation network 2300 adapted from constellation network 2100 to use fast-switching optical distributors (or electronic distributors 1940 not provisioned with input buffers). The use of fast-switching optical distributors (or bufferless distributors) necessitates that the optical distributors be collocated with respective dual-PTMs to enable time alignment of access nodes to distributors despite the absence of buffers at the distributors.

Thus, network 2300 is organized into H core modules 2310 each of which comprising a set of γ×m distributors with individual channels directly connecting to uPTUs and dPTUs of respective dual-PTMs. The core modules 2300 may be geographically distributed.

Figure 24:
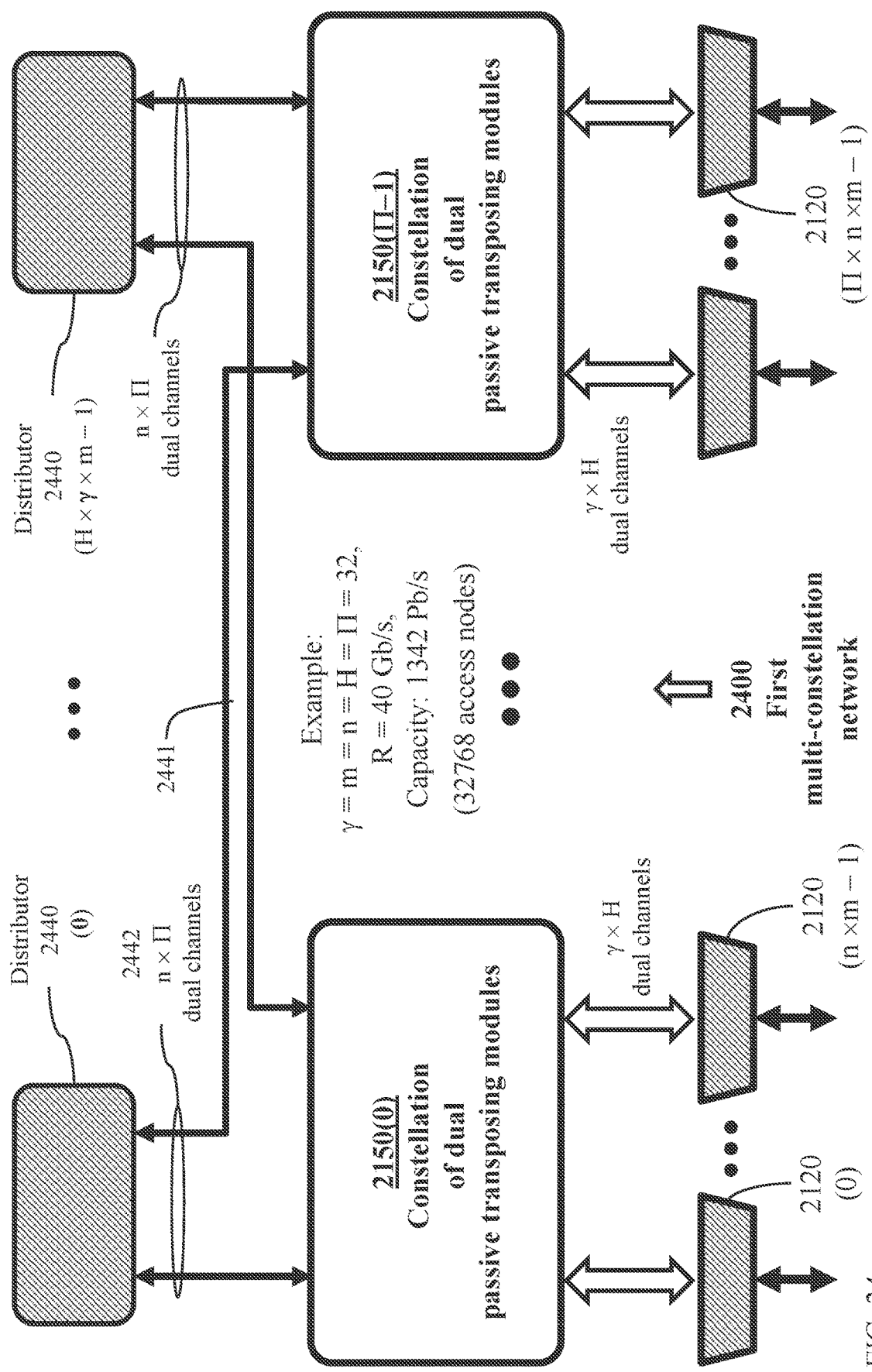
FIG. 24 illustrates a first multi-constellation e-Clos network comprising a predefined number of the first single-constellation network of FIG. 21, in accordance with an embodiment of the present invention.

FIG. 24 illustrates a first multi-constellation e-Clos network 2400 comprising a predefined number Π, Π>1, of constellations 2150 of dual-PTMs, having Π times the capacity of the first single-constellation network 2100.

As described above, with reference to FIG. 21, for H=γ=m=n=32, for example, the total number of distributors 1940 is 32768 and the total number of integrated access nodes 2120 is 1024. With each unidirectional channel in the network having a capacity R of 40 Gb/s, the capacity of the network is 41.94 Pb/s. Selecting H to equal 32, for example, yields a first multi-constellation network of 1342 Pb/s (1.342 Exabits/second).

Each constellation 2150 is coupled to each integrated access node 2120, of a respective set of (n×m) integrated access nodes 2120, through H links 2122, yielding a total number of (Π×n×m) of integrated ingress nodes 2120.

To form the first multi-constellation e-Clos network 2400, each distributor 1940 of the (H×γ×m) distributors 1940 of one single-constellation network 2100 is integrated with corresponding distributors 1940 of the other (H−1) single-constellation networks 2100 to form an integrated distributor 2440. A dual link 2441 connects an integrated distributor 2440 to a constellation 2150. A set of dual links 2441 connects an integrated distributor 2440 to different constellations 2150. The integrated distributor 2440 has at least (n×Π) dual ports connecting to one uPTM of each constellation 2150 of the Π constellations through a respective link of n channels.

Thus, the invention provides a first multi-constellation network 2400 comprising a plurality of dual passive transposing modules (dual-PTMs) 2020 arranged into a number Π, Π≥1, of constellations 2150, each constellation 2150 comprising a number H, H≥1, of dual-PTMs 2020. The plurality of dual-PTMs constitutes a passive signal transport medium.

A plurality of access nodes 2120 connects to the plurality of dual-PTMs 2020 with each access node 2120 connecting to each of H dual-PTMs 2020 of a respective constellation 2150 through a respective dual link 2121 of γ dual channels. A plurality of distributors 2440 connects to the plurality of dual-PTMs 2020 with each distributor 2440 connecting to one dual-PTM 2020 from each of the Π constellations through a dual link 2441 of n dual channels.

Each dual-PTM connects to a first number n×m of exterior links 2010, each exterior link comprising γ dual channels, γ>1, and a second number γ×m of interior links 2030, each interior link 2030 comprising n dual channels, n>1, m being a positive integer which is a design parameter referenced as an "expansion parameter" (also called a "spread parameter"). Each dual-PTM 2020 is configured so that each exterior link 2010 has an upstream cyclic path to each interior link 2030 and each interior link 2030 has a downstream cyclic path to each exterior link 2010.

Multi-constellation network 2400 supports Π×n×m access nodes 2120, each access node 2120 having a number (H×γ×m) of parallel single-hop paths, through the H×γ×m distributors 2440 (individually labeled 2440(0) to 2440(H× γ×m−1) to any other access node. The parameters {n, m, γ, H, Π} define the scope of the network and may be selected to construct networks of a variety of configurations. Selecting the parameters so that n=m=γ=H=Π=32, for example, the network accommodates a total of 32768 access nodes 2120 each having 32768 parallel single-hop paths to each other access node each path having a capacity of R/m, R being the capacity per channel. With R=40 gigabits/second (Gb/s), the capacity per path is 1.25 Gb/s. Selecting Π to equal 1 yields the network of FIG. 21 which, with n=m=γ=H=32 supports 1024 access nodes 2120 each also having 32768 parallel single-hop paths to each other access node 2120. With R=40 Gb/s, and the above parameters, the transport capacity of network 2400 is 1.34 Exabits/second and the capacity of network 2100 is 41.94 Petabits/second (Pb/s). Network 2100 employs distributors of a relatively small dimension, each having 32 dual ports, for example, which would be the case if fast-switching optical distributors are used. Fast-switching electronic distributors of a large dimension, exceeding 1000 dual ports per distributors, for example, are realizable with the current state of the art.

Figure 25:
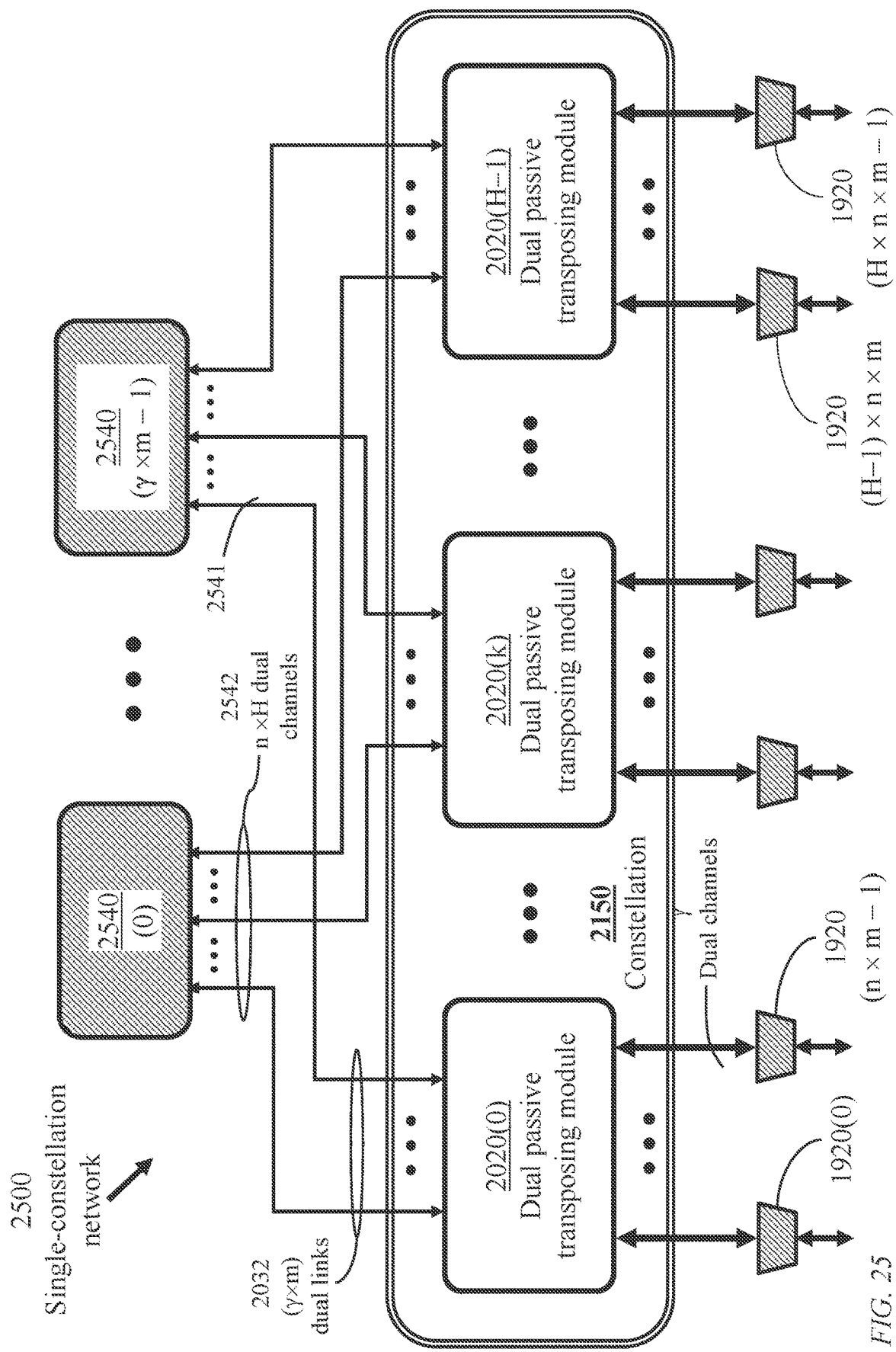
FIG. 25 illustrates a second single-constellation network of global coverage comprising a single constellation of passive dual transposing modules, in accordance with an embodiment of the present invention.

FIG. 25 illustrates a second single-constellation network 2500 of global coverage comprising a constellation 2150 of a predetermined number, H, H≥1, of dual-PTMs 2020 connecting access nodes 1920 to a plurality of distributors 2540.

Constellation network 2500 comprises H kernels 2000 with integrate distributors 1940 so that each distributor 1940 of the γ×m distributors of one kernel is integrated with (H−1) counterpart distributors of the other kernels to form an integrated distributor 2540 having H dual links, of n dual channels each. Each of the H dual links connects to a respective dual-PTM 2020. A set 2542 of dual links connects a distributor 2540 to the constellation 2150. The total number of distributors 2540 is H×γ×m, with each distributor 2540 having n×H dual ports. Each dual-PTM connects to the γ×m distributors 2540.

Figure 26:
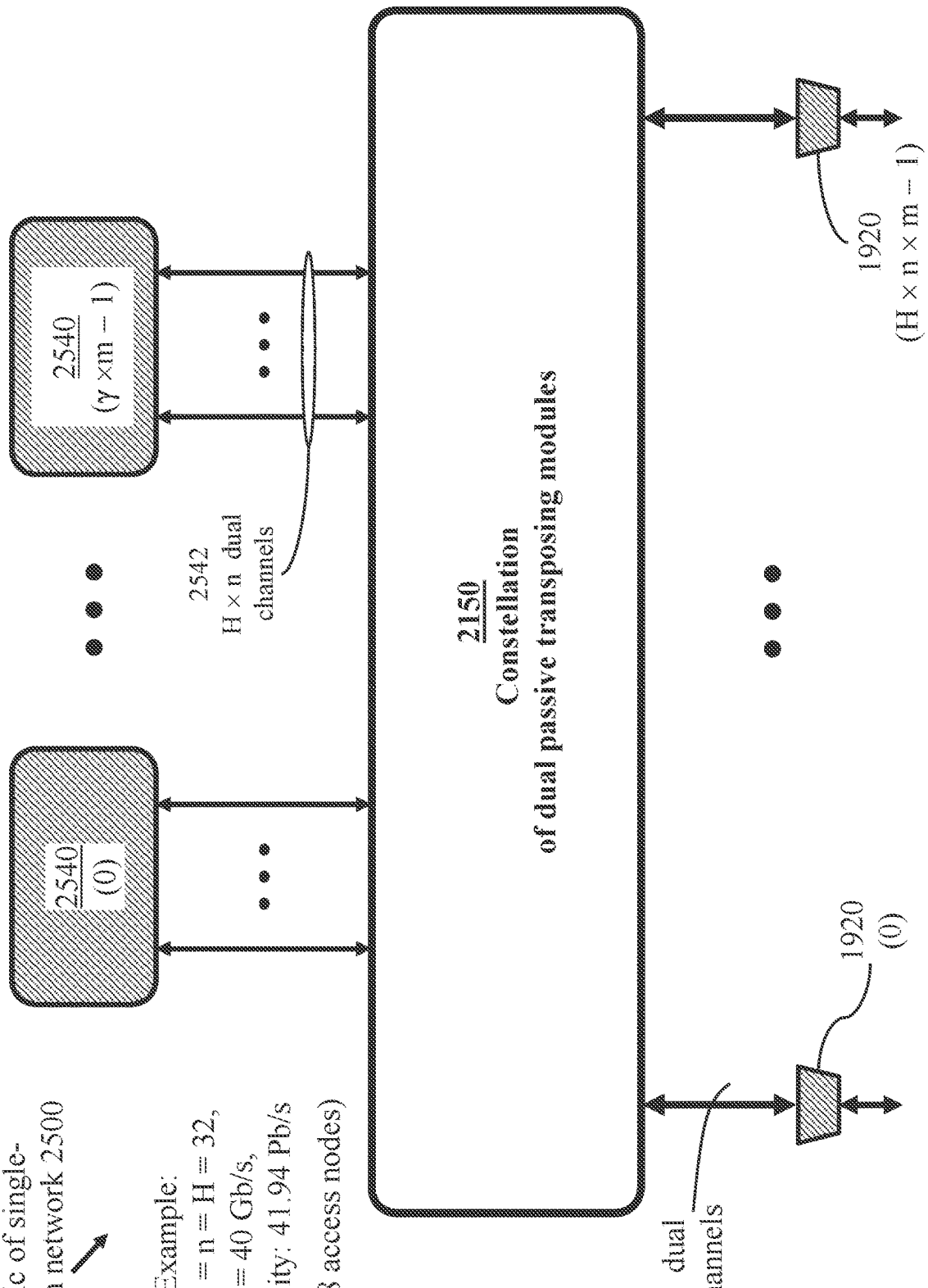
FIG. 26 is a simplified schematic of single-constellation network of FIG. 25.

FIG. 26 is a simplified schematic of single-constellation network 2500 representing the constellation 2150 of H dual-PTMs, without details, connecting to each access node 1920 through a dual link of γ dual channels and connecting to each integrated distributor 2540 through H dual links of n dual channels.

Figure 27:
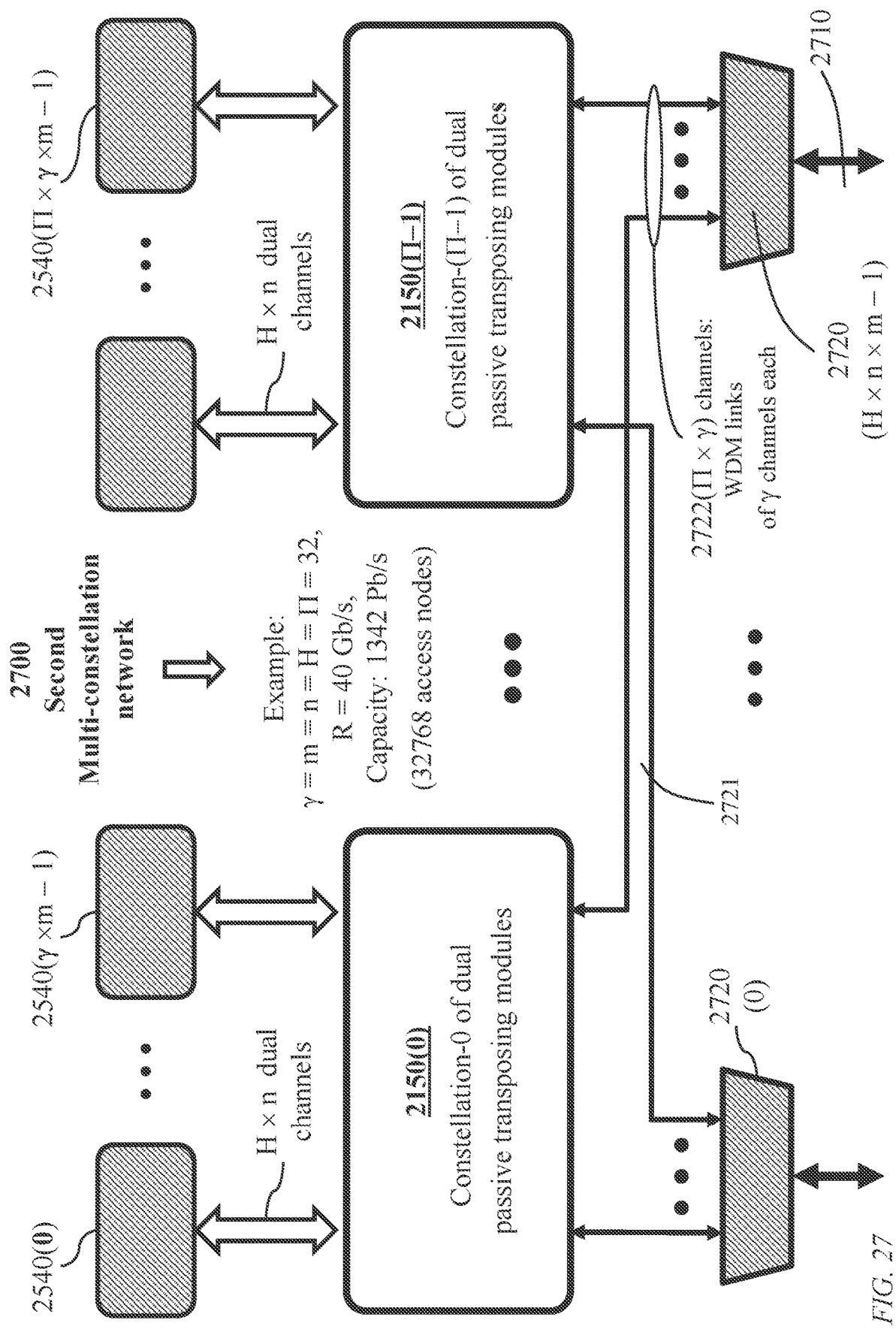
FIG. 27 illustrates a second multi-constellation e-Clos network comprising a predefined number of the second single-constellation network of FIG. 25, in accordance with an embodiment of the present invention.

FIG. 27 illustrates a second multi-constellation e-Clos network 2700 comprising a predefined number Π, Π>1, of constellations 2150 of dual-PTMs, having Π times the capacity of the second single-constellation network 2500.

Each constellation 2150 is coupled to each integrated distributor 2540, of a respective set of (γ×m) distributors 2540, through H links 2542 of n upstream channels each, yielding a total number of (Π×γ×m) of integrated distributors 2540

To form the second multi-constellation e-Clos network 2700, each access node 1920 of the (H×n×m) access nodes of one single-constellation network 2500 is integrated with corresponding access nodes 1920 of the other (H−1) single-constellation networks 2500 to form an integrated access node 2720. The integrated access node 2720 has at least (γ×Π) dual ports connecting to one uPTM of each constellation 2150 of the Π constellations through a respective link of γ channels.

Thus, each integrated access node 2720 has a direct single path of a capacity of (R/m) to each integrated distributor 2540 of the (Π×γ×m) integrated distributors, R being the capacity of a single channel, and m being the aforementioned spread parameter. With R=40 Gb/s, and m=32, for example, each path from an ingress node to an egress node has a capacity of 1.25 Gb/s.

Thus, the invention provides a second multi-constellation network 2700 comprising a plurality of dual passive transposing modules (dual-PTMs) 2020 arranged into a number Π, Π≥1, of constellations 2150, each constellation comprising a number H, H≥1, of dual-PTMs 2020. A plurality of access nodes 2720 connects to the plurality of dual-PTMs 2020, each access node 2720 connecting to one dual-PTM 2020 from each of the Π constellations 2150 through a dual link 2721 of γ dual channels. A plurality of distributors 2540 connects to the plurality of dual-PTMs 2020, each distributor connecting to each of H dual-PTMs of a respective constellation through a respective dual link 2541 of n dual channels.

Multi-constellation network 2700 supports H×n×m access nodes 2720, each access node 2720 having a number (Π×γ×m) of parallel single-hop paths, through the Π×γ×m distributors 2540 (individually labeled 2540(0) to 2540(Π×γ×m−1) to any other access node 2720.

Figure 28:
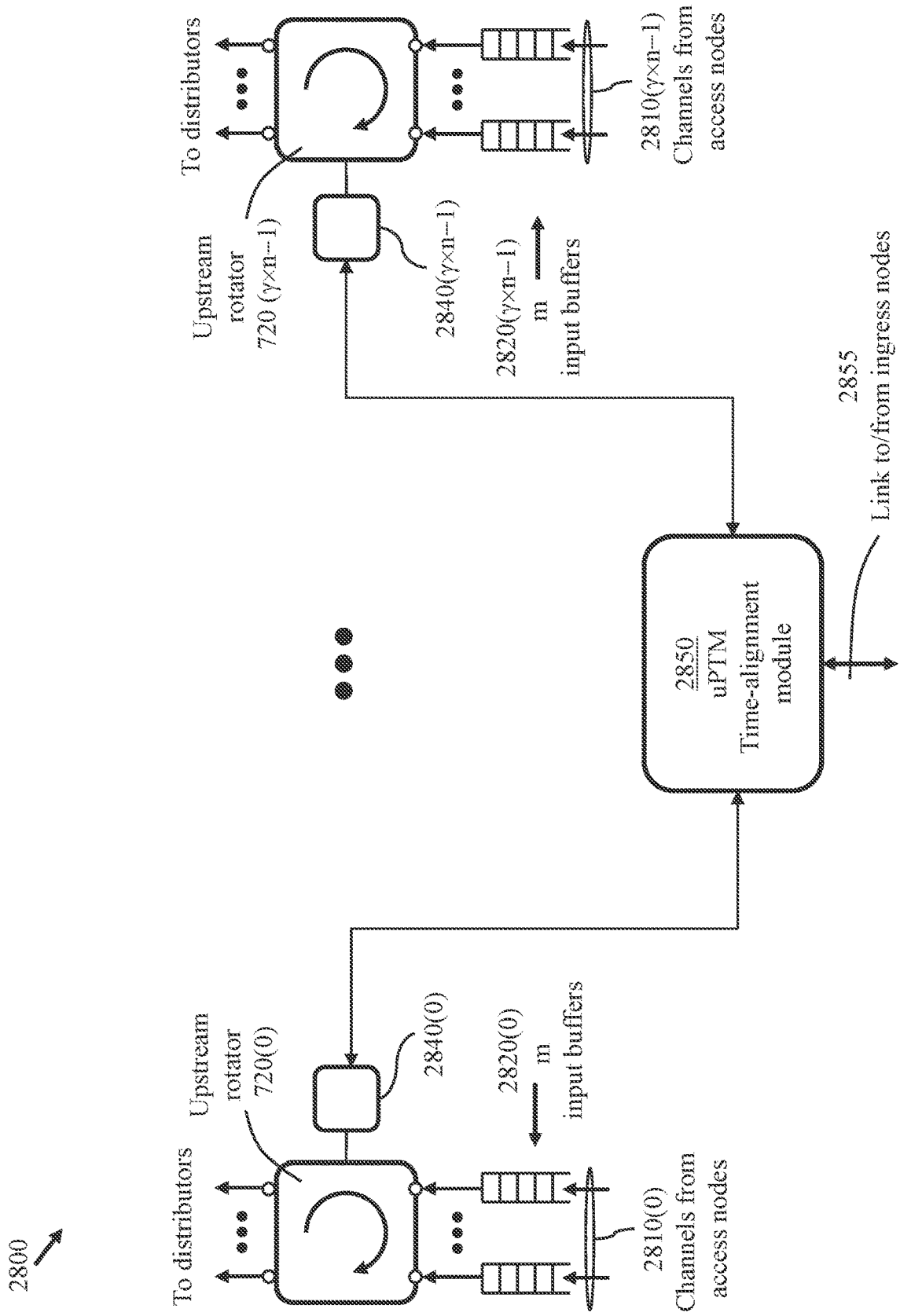
FIG. 28 illustrates an arrangement for time aligning data at the upstream temporal rotators.

FIG. 28 illustrates an arrangement 2800 for time aligning data at the upstream temporal rotators 720 of a uPTM. An upstream rotator 720 cyclically transposes data received from ingress nodes at each of the m input ports of the upstream rotator onto the m output ports of the rotator. The source data from an ingress node may be structured in several ways to facilitate the transposition process at the rotator. The rotator may be constructed as an electronic rotator or an optical rotator. If the rotator is constructed as an electronic rotator, buffers may be provided at the m input ports to facilitate time alignment of signal segments directed to different upstream path. If the rotator is constructed as an optical (photonic) rotator, the signal transposition can be time aligned to the signal segmentation at the source (the ingress node) using a time-alignment technique disclosed in U.S. Pat. No. 11,356,240. As illustrated, a set 2820 of m buffers is provided at each of upstream temporal rotators connecting to channels 2810 from access nodes. A master time-alignment module 2850 sets a time reference for the uPTM and exchanges timing data with ingress nodes through a dual link 2855 to enable the ingress nodes to adjust transmission time instants. Each rotator is coupled to a respective slave timing module 2840 coupled to the mater time-alignment module 2850.

Figure 29:
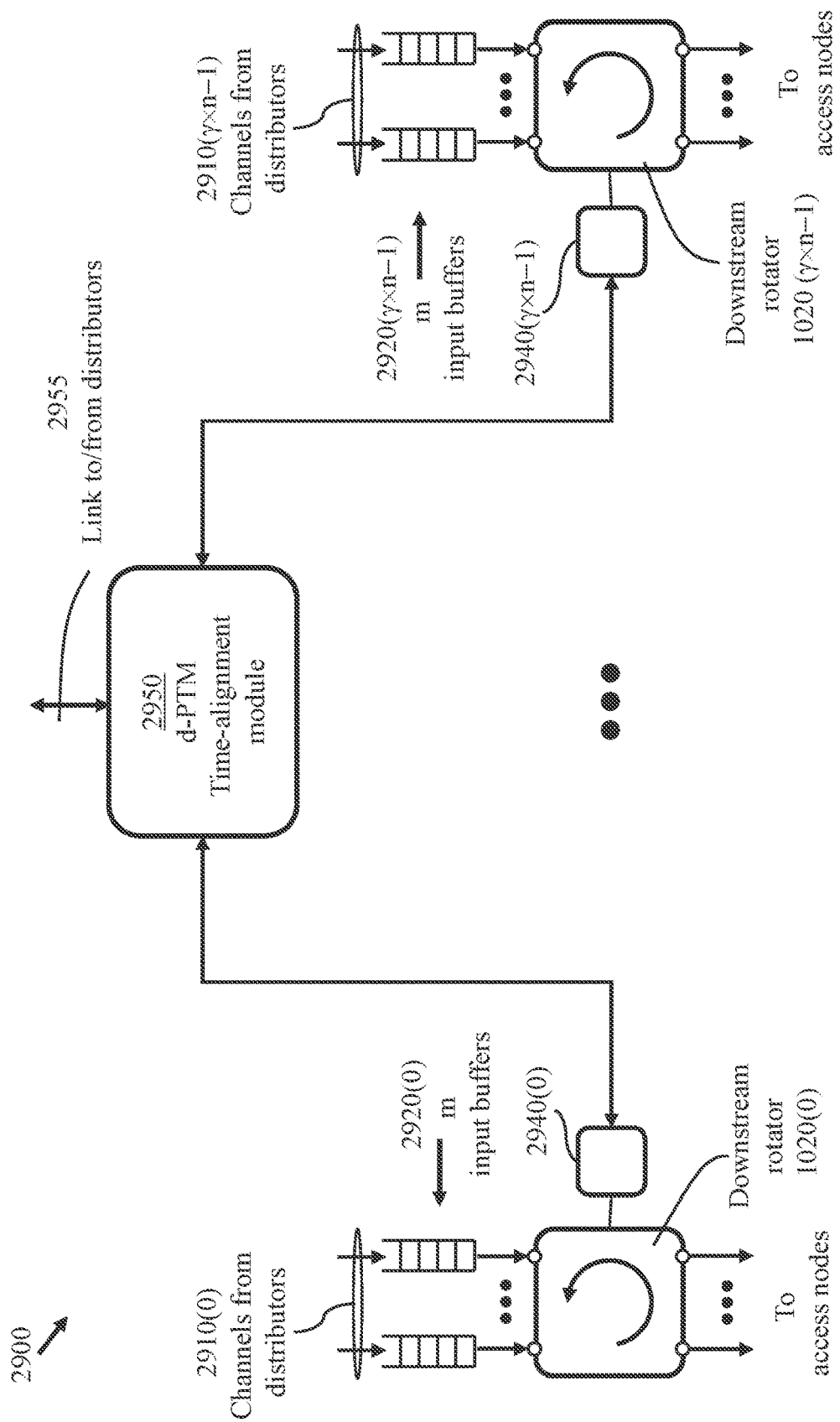
FIG. 29 illustrates an arrangement for time aligning data at the downstream temporal rotators.

FIG. 29 illustrates a similar arrangement 2900 for time aligning data at the downstream temporal rotators 1020 of a dPTM. Preferably, the downstream time alignment follows the same procedure of the upstream time alignment. The main difference is that the data received at the m input ports of a downstream rotator originate from distributors. Hence, the distributors are instructed to adjust transmission time instants to the dPTM.

As illustrated, a set 2920 of m buffers is provided at each of downstream temporal rotators connecting to channels 2910 from distributors. A master time-alignment module 2950 sets a time reference for the dPTM and exchanges timing data with distributors through a dual link 2955 to enable the distributors to adjust transmission time instants. Each rotator is coupled to a respective slave timing module 2940 coupled to the mater time-alignment module 2950.

Preferably, time-alignment modules 2850 and 2950 maybe integrated.

Full-Mesh Network

Figure 30:
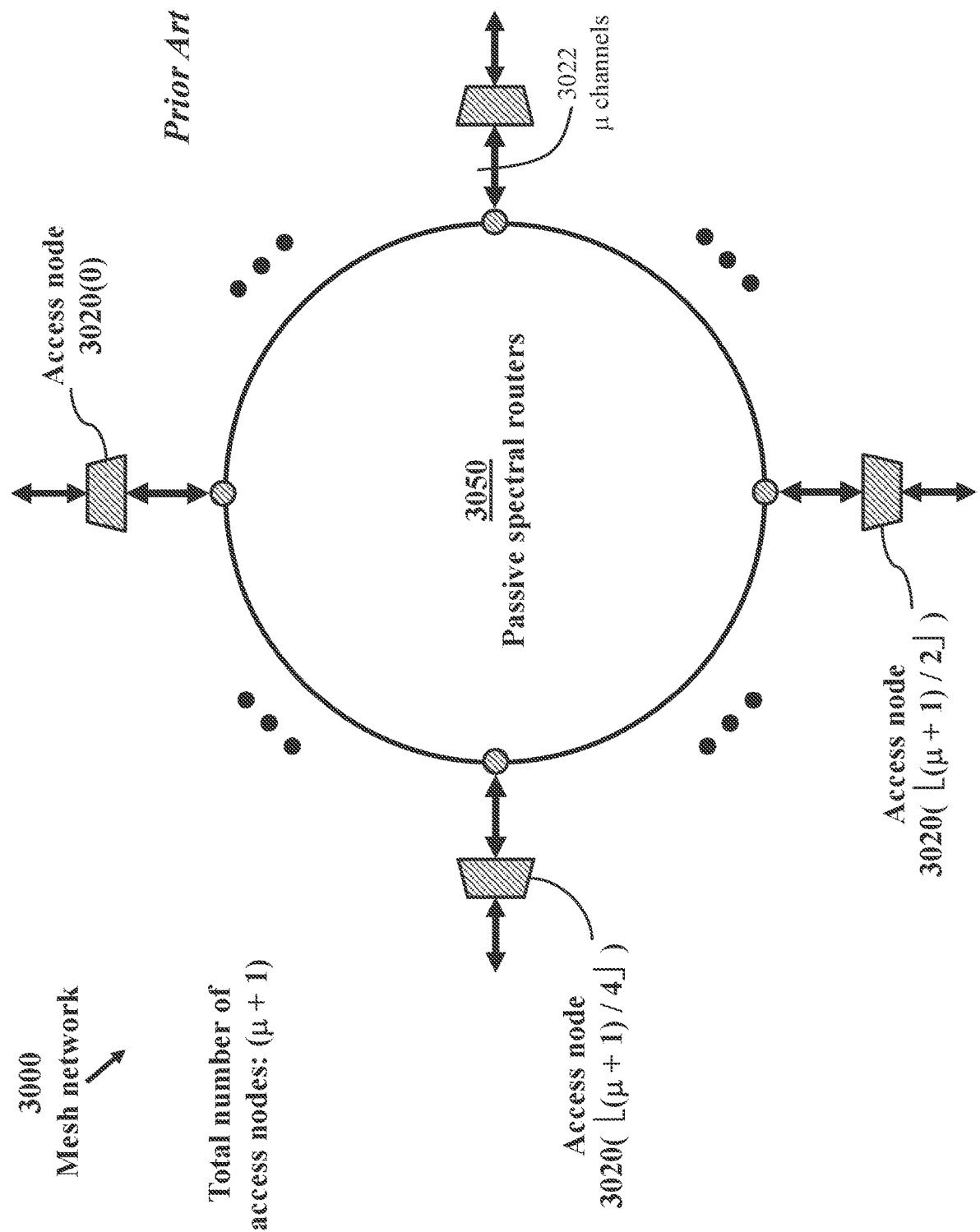
FIG. 30 illustrates a prior-art mesh network interconnecting a plurality of access nodes through a passive spectral router.

FIG. 30 illustrates a prior-art mesh network 3000 interconnecting a plurality of access nodes 3020 through passive spectral routers 3050 (colloquially referenced as wavelength routers) 3050. Each access node 3020 has a dual WDM link 3022 comprising μ, μ>1, dual channels carrying data to other access nodes 3020 in the upstream direction and data from the other access node in the downstream direction. The spectral routers directly connect each access node 3020 to each of μ other access nodes 3020, through one channel. The spectral routers provide a path of capacity R, R being the capacity of one channel (40 Gb/s, for example) for each directed access-node pair. With μ=256, for example, the network comprises a maximum of 257 access nodes.

Expanded Full-Mesh Network (E-Mesh Network)

A full-mesh network is a special case of a single-hop Clos network where the number of distributors equals the number of access nodes and each distributor is integrated with a respective access node.

Thus, in the first multi-constellation e-Clos network 2400, setting the parameter γ to equal n, and the parameter Π to equal H, the number, Π×n×m, of integrated access nodes 2120 would equal the number, Π×γ×m, of integrated distributors. Each integrated distributor 2440 may then be integrated with an integrated access node 2120 to form an integrated access-transit node directly interconnected through the H constellations 2150 to form an expanded full-mesh network, referenced as an e-mesh network.

Likewise, in the second multi-constellation e-Clos network 2700, setting the parameter γ to equal n, and the parameter Π to equal H, the number, Π×n×m, of integrated access nodes 2120 would equal the number, Π×γ×m, of integrated distributors. Each integrated distributor 2540 may then be integrated with an integrated access node 2720 to form an integrated access-transit node directly interconnected through the Π constellations 2150 to form an e-mesh network.

Figure 31:
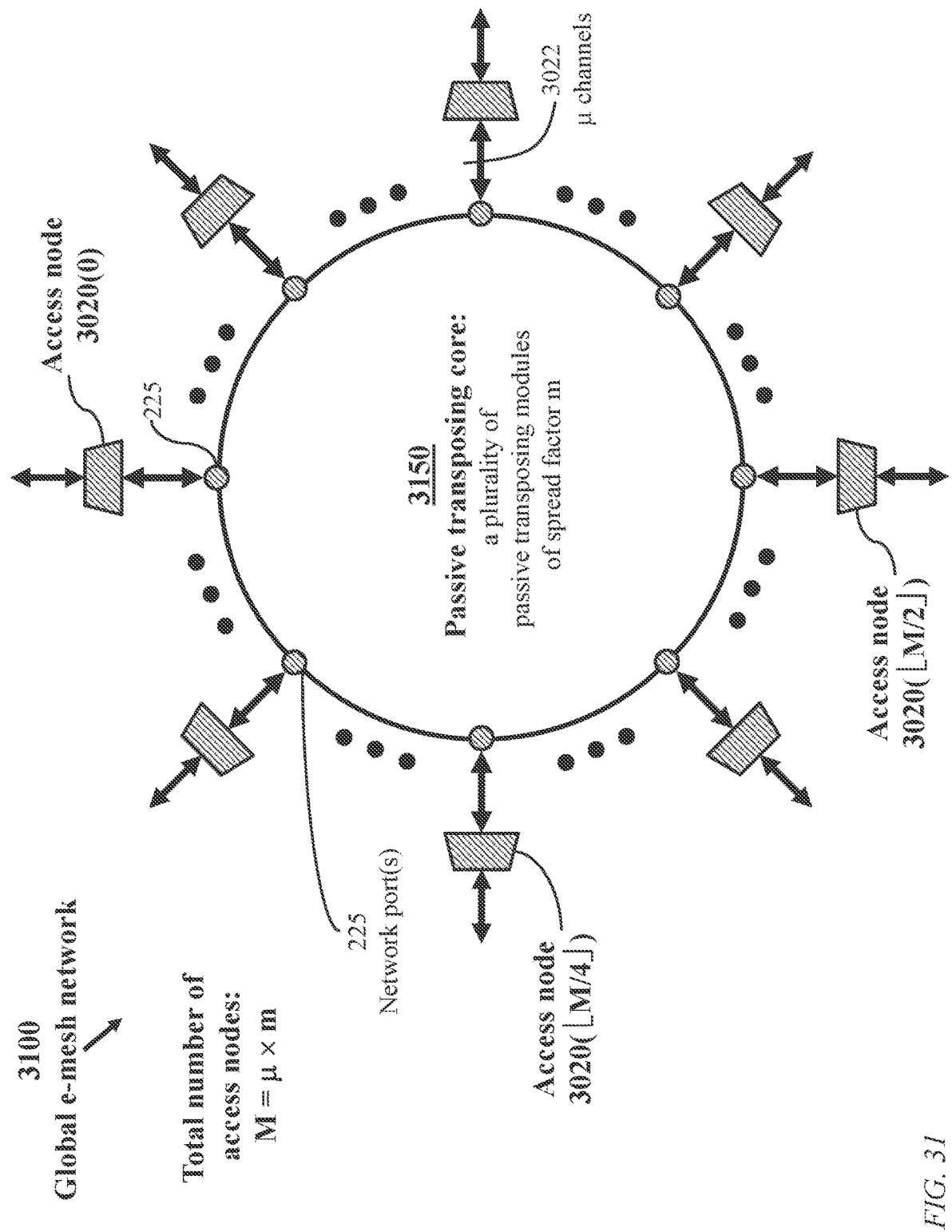
FIG. 31 illustrates an e-mesh network of access nodes having the same dimension of the access nodes on the network of FIG. 30 but capable of interconnecting a larger number of access nodes in a full-mesh configuration, in accordance with an embodiment of the present invention.

FIG. 31 illustrates an e-mesh network 3100 where access nodes 3020, each having μ dual channels for connecting to other access nodes 3020, are interconnected through a passive transposing core 3150 which enables full mutual interconnection of (m×μ) of access nodes 3020, m>1, being the spread parameter described above with reference to FIG. 17 to FIG. 27. A set of WDM links 3122, collectively comprising μ dual channels, connects an access node 3020 to the passive expanding core 3150. The passive transposing core provides a path of capacity R/m, R being the capacity of one channel (40 Gb/s, for example) for each directed access-node pair. With μ=256 and m=32, for example, the e-mesh network comprises a maximum of 8192 access nodes 3020.

Figure 32:
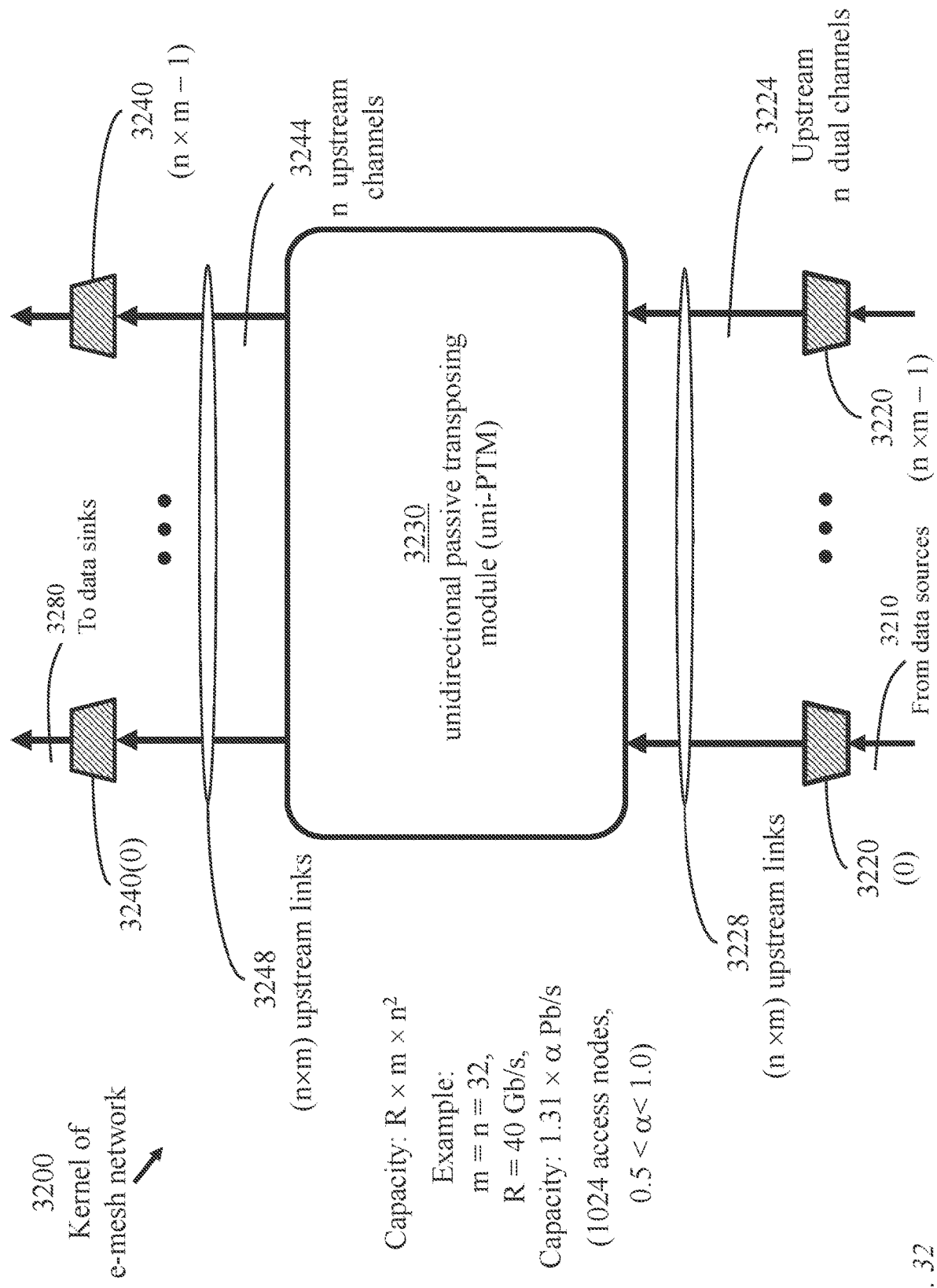
FIG. 32 is a schematic of a kernel of an e-mesh network comprising a unidirectional passive transposing module (uni-PTM), in accordance with an embodiment of the present invention.

FIG. 32 is a schematic of a kernel 3200 of an e-mesh network 3100 comprising a unidirectional passive transposing module (uni-PTM) 3230 connecting a set 3228 of n×m of ingress nodes 3220 to a set 3248 of n×m of egress nodes 3240, n being a number of upstream channels of a link 3224 connecting an ingress node to the uni-PTM 3230, which equals the number of downstream channels of a link 3224 connecting the uni-PTM 3230 to an egress node 3240. The uni-PTM 3230 is similar to uPTM 1700 with the parameter γ equated to the parameter n.

Figure 33:
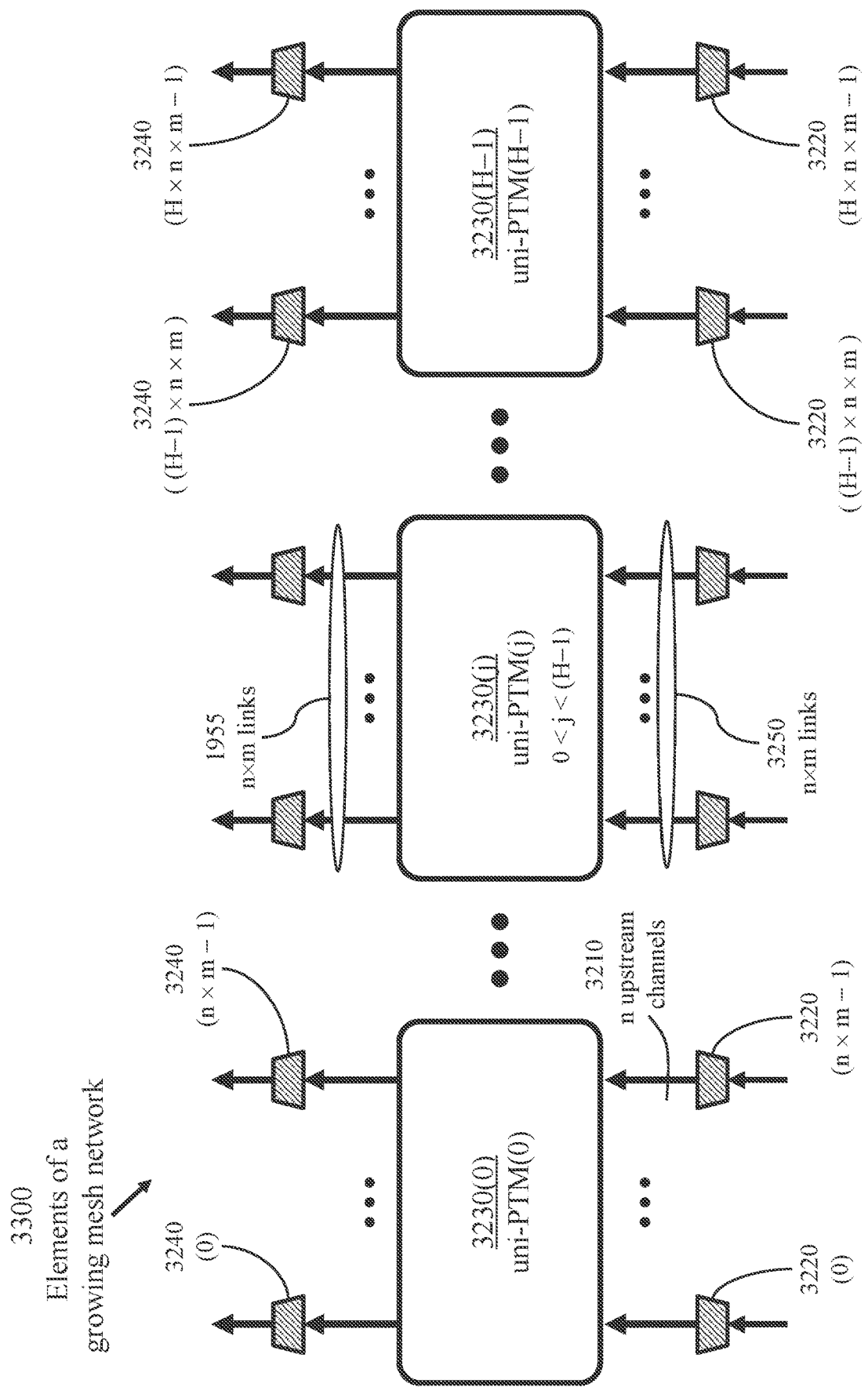
FIG. 33 illustrates a group of e-mesh kernels for synthesizing a growable e-mesh network.

FIG. 33 illustrates a group of H e-mesh kernels 3200, H>1, for synthesizing a growable e-mesh network.

Figure 34:
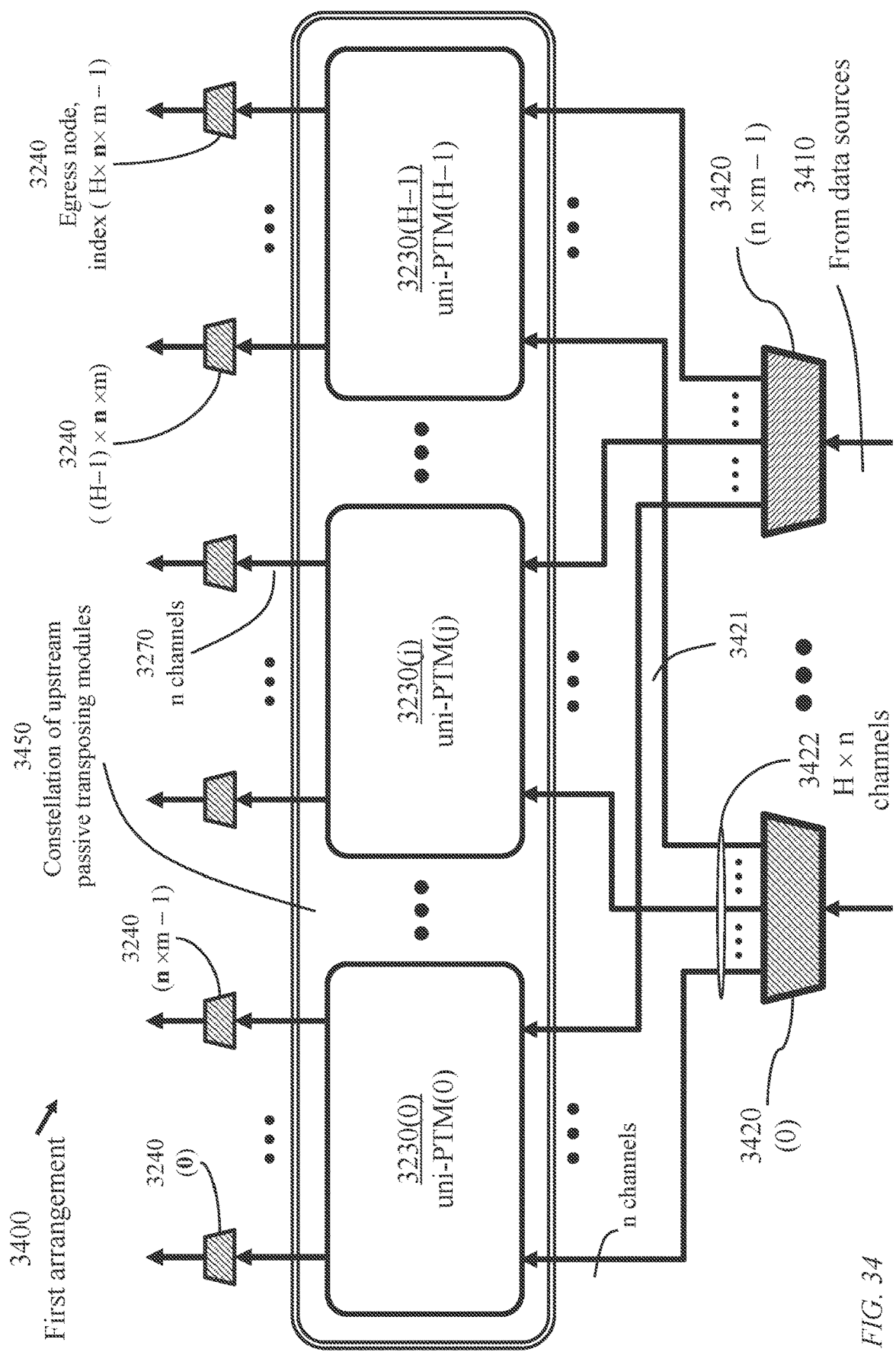
FIG. 34 illustrates a first arrangement for synthesizing a global e-mesh network.

FIG. 34 illustrates a first arrangement 3400 for synthesizing a global e-mesh network comprising a constellation 3450 of uPTMs 3230 which may be collocated or geographically spread. Each uPTM connects to n×m ingress nodes 3220 and n×m egress nodes 3240. The H sets of n×m ingress nodes 3220, each set comprising n×m ingress nodes 3220, are replaced with a set of integrated n×m ingress nodes 3420, each integrated ingress node 3420 having a link of n channels to each of the H uPTMs 3230 of constellation 3450. Thus, an integrated ingress node 3420 has a set 3422 of H×n channels connecting to the constellation 3450. Channels 3410 carry data from data sources to a respective ingress node 3420. Channels 3480 carry data from an egress node 3240 to respective data sinks.

Figure 35:
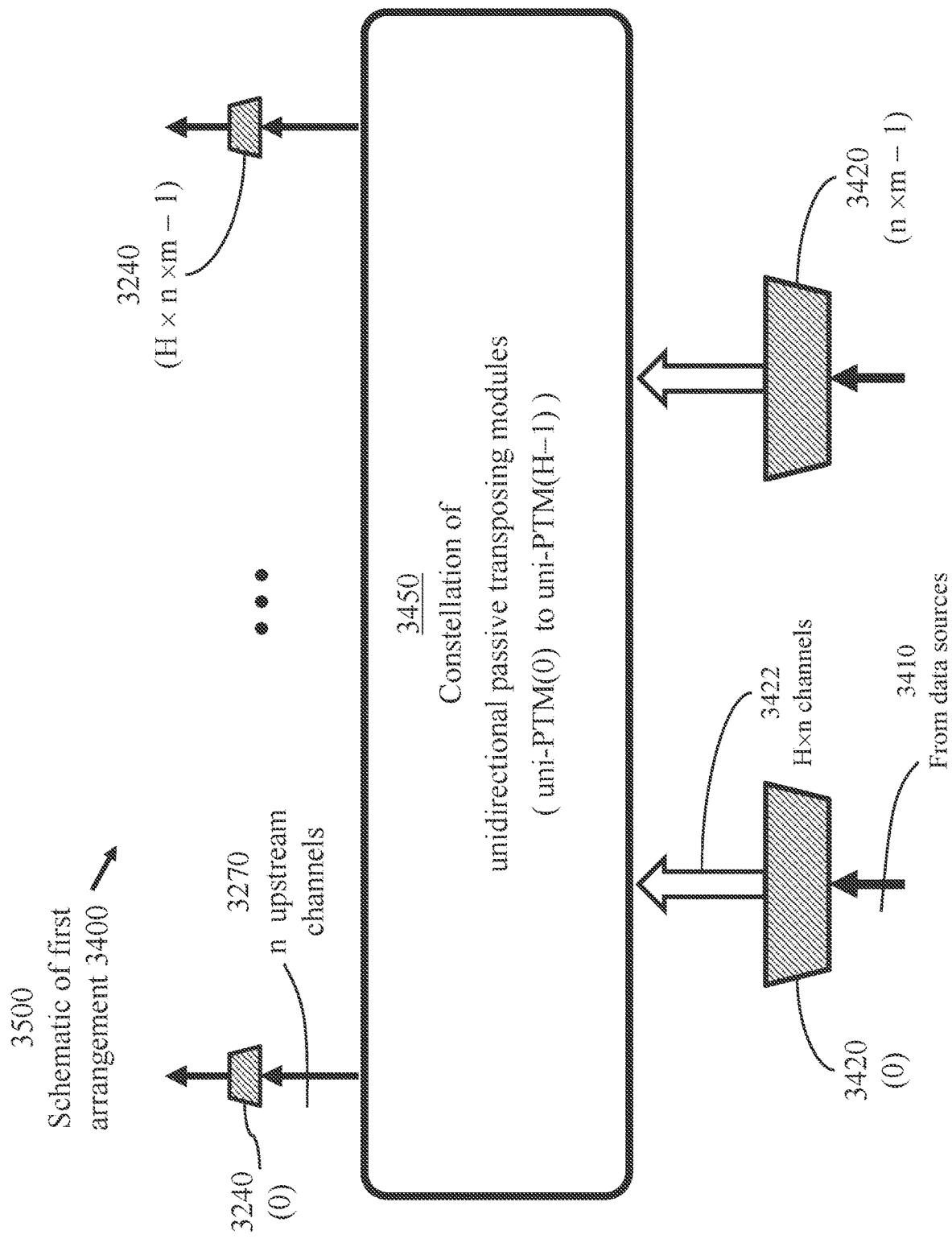
FIG. 35 is a simplified schematic of the first arrangement of FIG. 34.

FIG. 35 is a simplified schematic 3500 of the first arrangement 3400.

Figure 36:
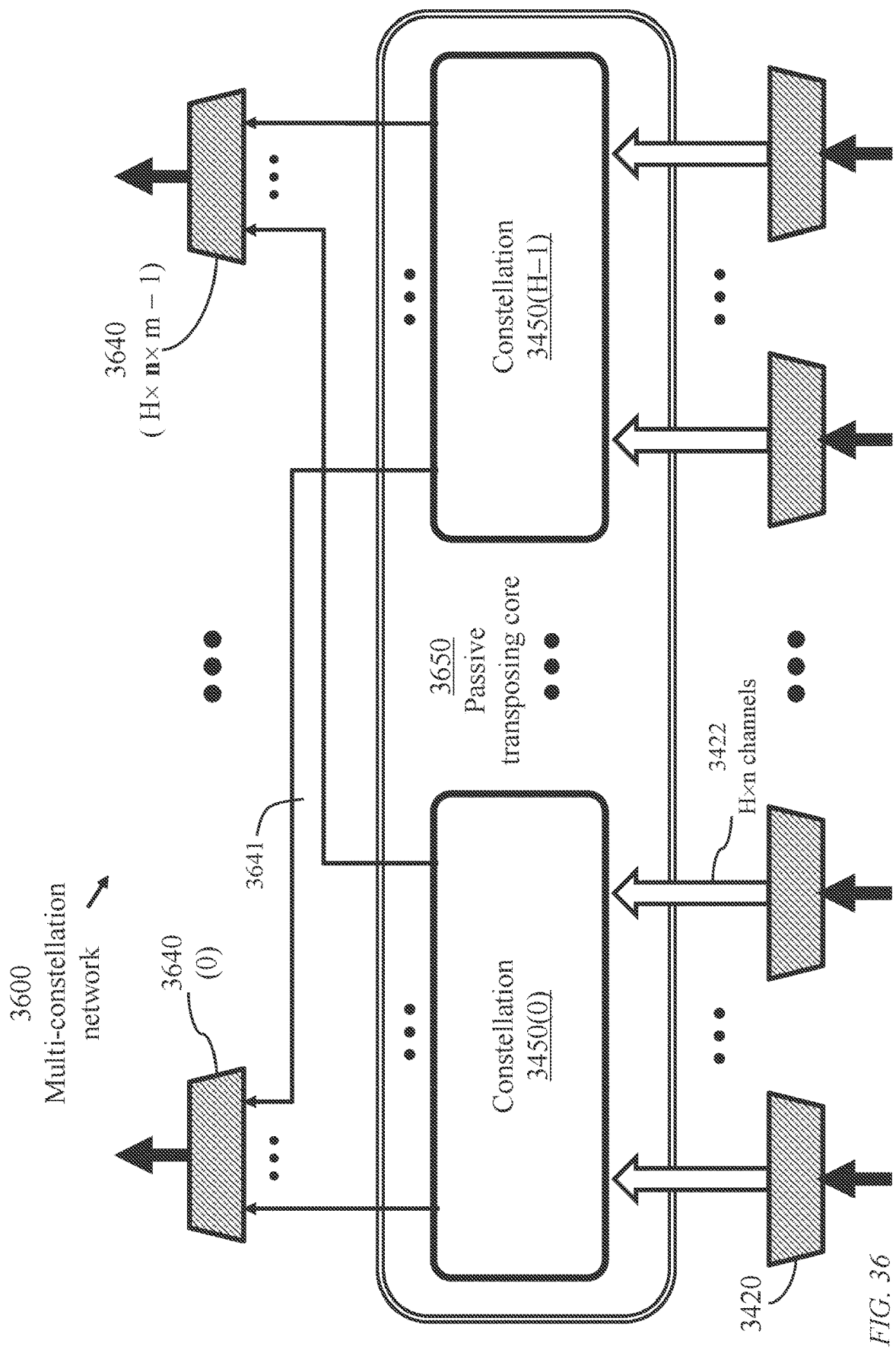
FIG. 36 illustrates a first multi-constellation e-mesh network, in accordance with an embodiment of the present invention.

FIG. 36 illustrates a first multi-constellation e-mesh network 3600 which may be synthesized as a specified number, H, H>1, of first-configuration networks 3400 with integrated egress nodes 3240. Network 3600 comprises a passive transposing core 3650 comprising H core constellations 3450 of dual-PTMs 3230.

Each constellation 3450 is coupled to each integrated ingress node 3420, of a respective set of (n×m) ingress nodes 3420, through H upstream links 3422 of n upstream channels each, yielding a total number of (H×n×m) of integrated ingress nodes 3420.

To form the first multi-constellation e-mesh network 3600, each egress node 3240 of the (H×n×m) egress nodes 3240 of one network 3400 is integrated with corresponding egress nodes 3240 of the other (H−1) networks 3400 to form an integrated egress node 3640 connecting to one uPTM 3230 of each constellation 3450 of the H constellations through a respective downstream link of n downstream channels.

Each egress node 3640 is integrated with one of the ingress nodes 3420 to form an access node which functions as:
an ingress node for upstream data traffic from respective data sources;
an egress node for downstream data traffic to respective data sinks; and
a transit node performing the function of a distributor.

Thus, each integrated ingress node 3420 has a direct single path of a capacity of (R/m) to each egress node 3640, and (H×n×m) single-hop paths, of (R/m) capacity each, to each egress node 3640, R being the capacity of a single channel, and m being the aforementioned spread parameter. With R=40 Gb/s, and m=32, for example, each path from an ingress node to an egress node has a capacity of 1.25 Gb/s.

Thus, the invention provides a second multi-constellation network 3600 comprising a plurality of unidirectional passive transposing modules (uni-PTMs) 3230 arranged into a number H, H≥1, of constellations 3450, each constellation comprising H uni-PTMs 3230. A plurality of ingress nodes 3420 connects to the plurality of uni-PTMs 3230, each ingress node 3420 connecting to a respective constellation 3420 through H links 3421, of n channels each, each of the H links connecting to one uni-PTM of the respective constellation. A plurality of egress nodes 3640 connects to the plurality of uni-PTMs, each egress node 3640 connecting to one uni-PTM from each of the H constellations through a respective link 3641 of n channels. Each egress node 3640 shares a distributing mechanism (a switching mechanism) with an ingress node 3420 to form an integrated node, thus the network comprises a total of (H×n×m) integrated nodes.

Each uni-PTM 3230 connects to a number n×m of exterior links, each exterior link 3224 comprising n channels, n>1, and n×m interior links 3248, each interior link comprising n channels, m being a design parameter referenced as an expansion parameter or a spread-parameter. Each uni-PTM 3230 is configured so that each exterior link 3224 has a cyclic path to each interior link 3248.

Thus, the network accommodates a number (H×n×m) of integrated nodes (each integrated node comprising an ingress node 3420 and an egress node 3640 sharing a switching mechanism). Each integrated node having a direct path to each other integrated node and a number (H×n×m−2) of parallel single-hop paths to each other integrated node.

Figure 37:
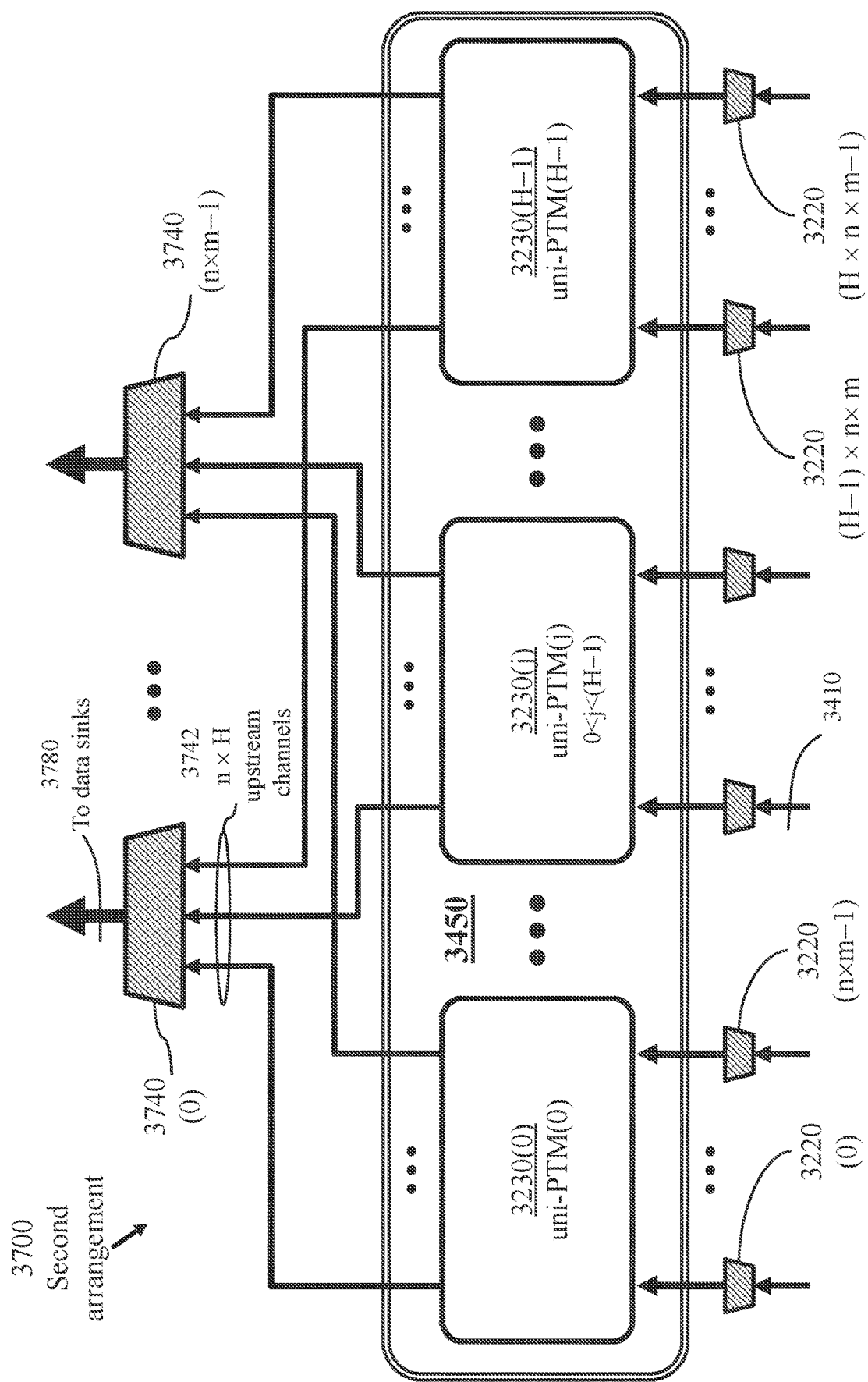
FIG. 37 illustrates a second arrangement for synthesizing a global e-mesh network.

FIG. 37 illustrates a second arrangement 3700 for synthesizing a global e-mesh network comprising a constellation 3450 of uPTMs 3230 which may be collocated or geographically spread. Each uPTM 3230 connects to a respective set of n×m ingress nodes 3220 and a set of n×m egress nodes 3240. The H sets of egress nodes 3220, each set comprising n×m egress nodes 3220, are replaced with a set of n×m integrated egress nodes 3740, each integrated egress node 3740 having a link of n channels from each of the H uPTMs 3230 of constellation 3450. Thus, an egress node 3740 has a respective set 3744 of H×n channels from the constellation 3450. Channels 3410 carry data from data sources to a respective ingress node 3220. Channels 3780 carry data from an integrated egress node 3740 to respective data sinks.

Figure 38:
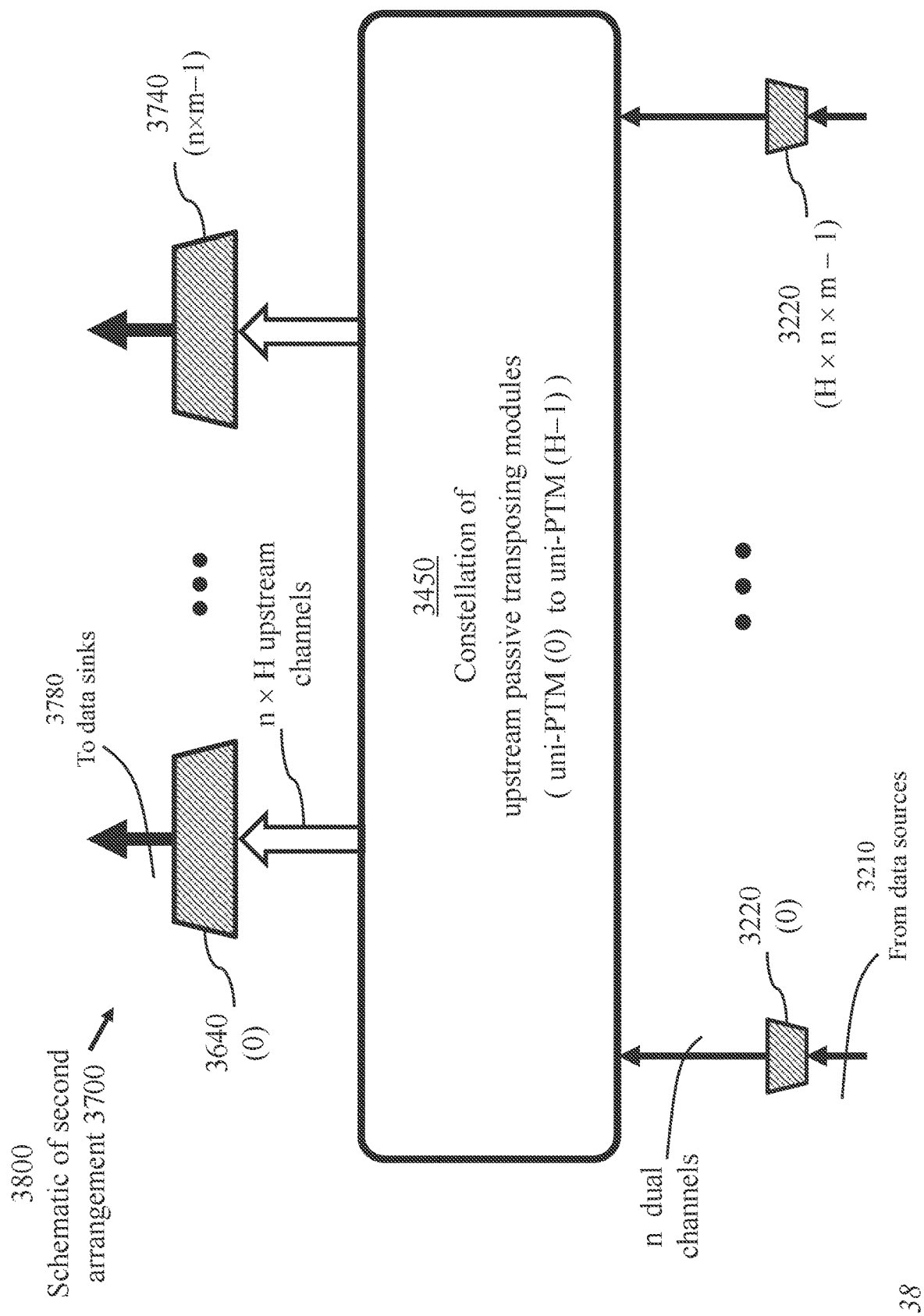
FIG. 38 is a simplified schematic of the second arrangement of FIG. 37.

FIG. 38 is a simplified schematic 3800 of the second arrangement 3700.

Figure 39:
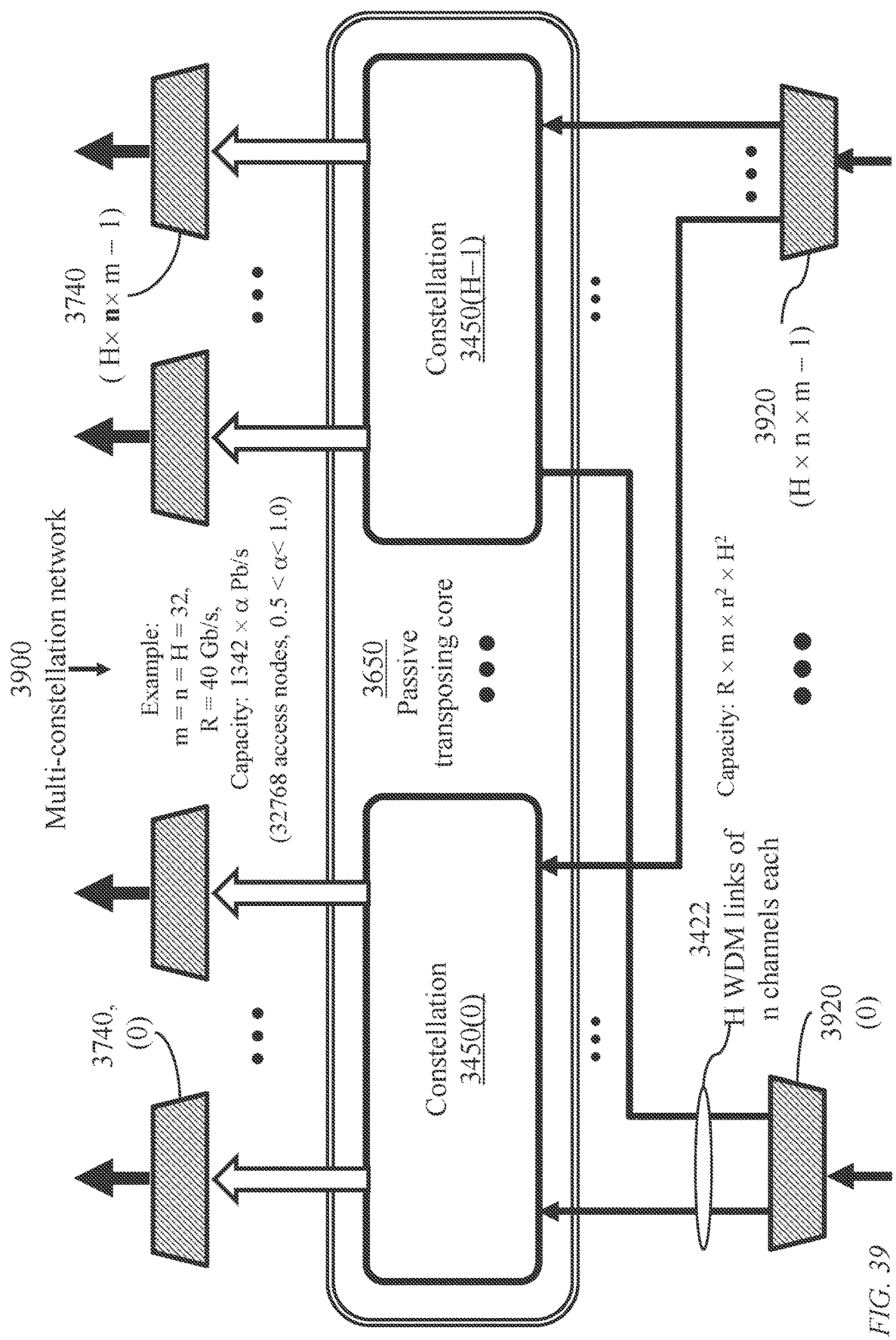
FIG. 39 illustrates a second multi-constellation e-mesh network, in accordance with an embodiment of the present invention.

FIG. 39 illustrates a second multi-constellation network 3900 which may be synthesized as a specified number, H, H>1, of second-configuration networks 3700 with integrated ingress nodes 3220. As in network 3600, network 3900 comprises a passive transposing core 3650 comprising H core constellations 3450 of dual-PTMs 3230.

Each constellation 3450 is coupled to each integrated egress node 3740, of a respective set of (n×m) integrated egress nodes 3740, through H downstream links 3744 of n downstream channels each, yielding a total number of (H×n×m) of integrated egress nodes 3740.

To form the second multi-constellation network 3900, each ingress node 3220 of the (H×n×m) ingress nodes 3220 of one network 3700 is integrated with corresponding ingress nodes 3220 of the other (H−1) networks 3700 to form an integrated ingress node 3920 connecting to one uPTM of each constellation 3450 of the H constellations through a respective upstream link of n upstream channels.

Each egress node 3740 is integrated with one of the ingress nodes 3920 to form an access node which functions as:
an ingress node for upstream data traffic from respective data sources;

an egress node for downstream data traffic to respective data sinks; and a transit node performing the function of a distributor.

Thus, each ingress node 3920 has a direct single path of a capacity of (R/m) to each egress node 3740, and (H×n×m) single-hop paths, of (R/m) capacity each, to each egress node 3740, R being the capacity of a single channel, and m being the aforementioned spread parameter. With R=40 Gb/s, and m=32, for example, each path from an ingress node to an egress node has a capacity of 1.25 Gb/s.

Figure 40:
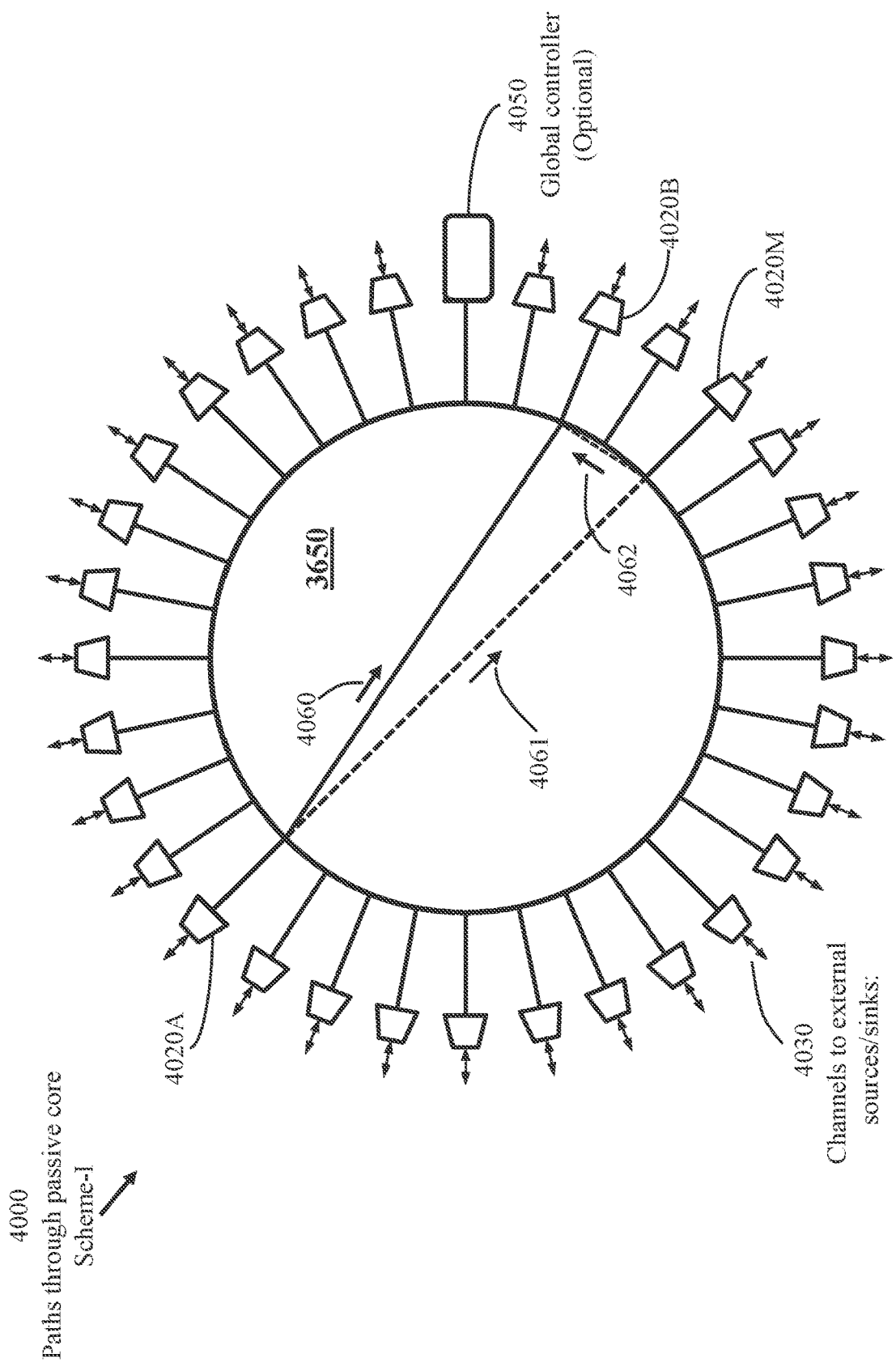
FIG. 40 illustrates a first scheme of establishing paths through the e-mesh network of FIG. 31 (implemented as a multi-constellation network), the e-mesh network comprising access nodes each configured to switch data originating from subtending data sources and data directed to subtending data sinks, as well as transit data directed to another access node, in accordance with an embodiment of the present invention.

FIG. 40 illustrates paths 4000 through the passive transposing core 3150 where each access node 4020 is configured to switch data originating from subtending data sources or directed to subtending data sinks, as well as transit data directed to other access nodes. Access node 4020 is similar to access node 120 and is configured to switch local data (from or to subtending sources and sinks) as well as transit data.

According to a first scheme of establishing paths through the spectral-temporal connector 3030, a direct path 4060 is established from a source access node 4020A to a destination access node 4020B. If a direct path is not feasible, an alternate path is established through any other access node 4020M. The alternate path comprises a path 4061 from the source node 4020A to an intermediate access node 4020M, and a path 4062 from the intermediate access node 4020M to the destination access node 4020B.

One of access nodes 4020 may be replaced with a global controller 4050 accessible to all access nodes 4020 for selecting alternate paths. A path may be established through direct exchange of control signals between access nodes 4020 or through communications between access nodes and the global controller 4050.

Figure 41:
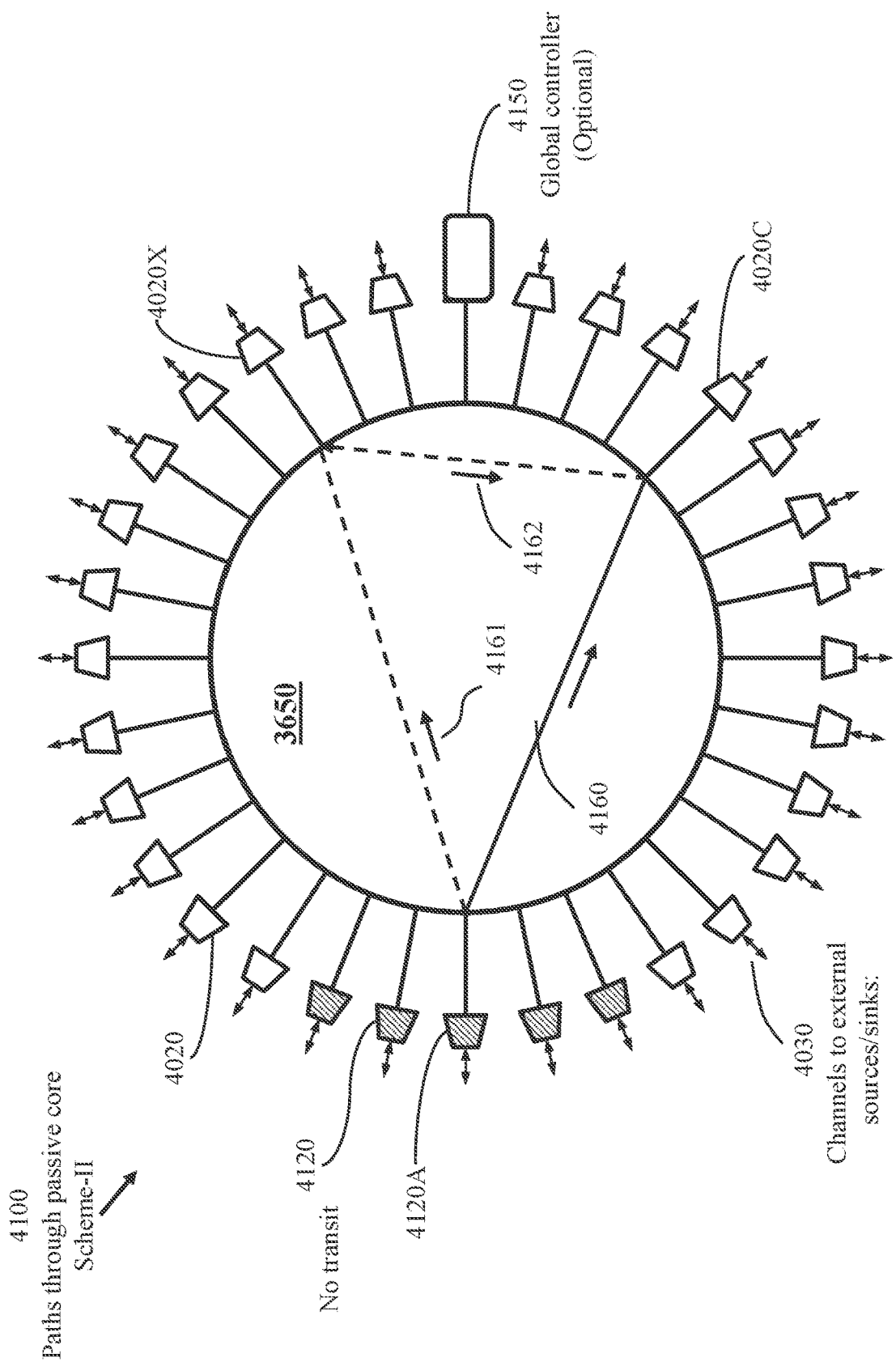
FIG. 41 illustrates a second scheme of establishing paths through the e-mesh network of FIG. 31 (implemented as a multi-constellation network), where specific access nodes switch only local data received from, or directed to, subtending data sources and sinks, in accordance with an embodiment of the present invention.

FIG. 41 illustrates a mesh network 4100 having a passive transposing core 3150. The main difference between network 4000 and network 4100 is that the latter designates a predetermined number of access nodes, individually or collectively referenced as gateway nodes 4120 which processes only data received from data sources, or directed to data sinks. Each other access node 4020 is configured to switch local data (from or to subtending sources and sinks) as well as transit data.

According to a second scheme of establishing paths through the spectral-temporal connector 3030, a direct path 4160 is established from a gateway node 4120A to a destination access node 4020C. If a direct path is not feasible, an alternate path is established through any access node 4020. The alternate path comprises a path 4161 from the gateway node 4020A to an intermediate access node 4020M, and a path 4162 from the intermediate access node 4020M to the destination access node 4020C.

A path may be established through direct exchange of control signals between gateway nodes 4120 and access nodes 4020, among access nodes 4020, or through communications between access nodes or gateway nodes and the global controller 4050.

Figure 42:
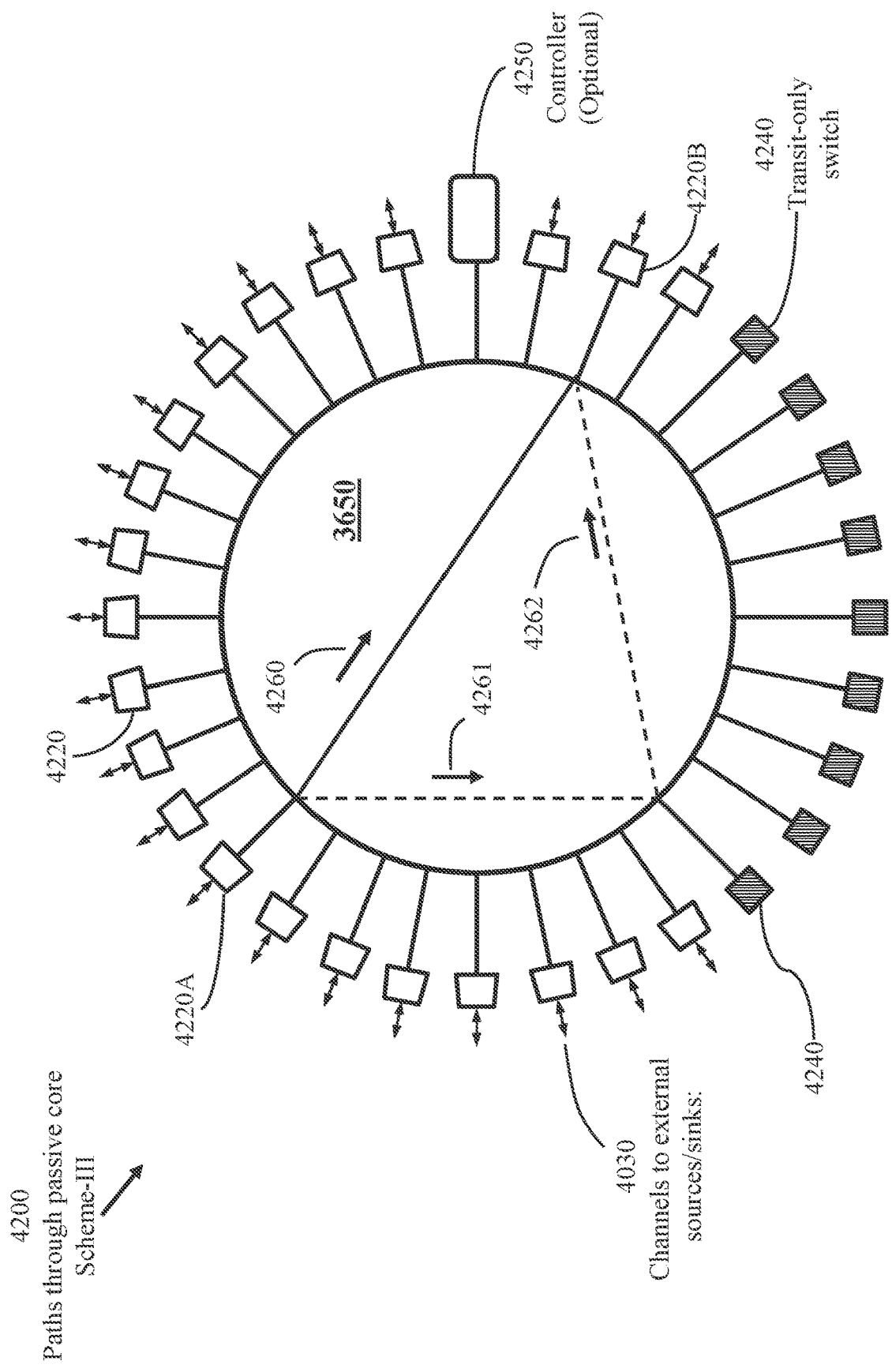
FIG. 42 illustrates a third scheme of establishing paths through the e-mesh network of FIG. 31 (implemented as a multi-constellation network), the e-mesh network comprising a plurality of access nodes and a plurality of transit nodes for exchanging data among the access nodes, in accordance with an embodiment of the present invention.

FIG. 42 illustrates a mesh network 4200 having a passive transposing core 3150. The main differences between network 4000 and network 4200 are:

(1) the spectral-temporal connector 3030 connects to a predetermined number M of transit nodes 4240, 0<M<N, at most (N−M) access nodes 4220, and optionally global controller 4050;

(2) an access node 4220 connects subtending data source and sinks to other access nodes 4220 or transit nodes 4240 but does not process transit data to another access node 4220; and (3) transit node 4240 processes only transit data from one access node 4220 to another access node 4220, in other words, transit nodes 4240 process only overflow of direct paths among access nodes 4220.

According to a third scheme of establishing paths through the spectral-temporal connector 3030, a direct path 4060 is established from a source access node 4220A to a destination access node 4220B. If a direct path is not feasible, an alternate path is established through any transit node 4240. The alternate path comprises a path 4261 from the source node 4220A to a transit node 4240, and a path 4262 from the transit node to the destination access node 4020B. A path may be established through direct exchange of control signals between:

a source access node 4220 and a destination access node 4220;

a source access node 4220 and a transit node 4240; or access nodes 4220 and controller 4250.

According to a first implementation of the mesh network, each node of the plurality of nodes is configured to switch:
(i) data originating from local data sources coupled to the node; and
(ii) data directed to local data sinks coupled to the node, and (3) transit data originating from any other node.

According to a second implementation of the mesh network, the plurality of nodes is divided into a set of gateway nodes and a set of shared nodes.

Each gateway node is configured to switch:
(1) data originating from external data sources coupled to the gateway node; and
(2) data directed to external data sinks coupled to the gateway node.

Each shared node is configured to switch:
(a) data originating from local data sources coupled to the shared node;
(b) data directed to local data sinks coupled to the shared node; and
(c) transit data originating from any other node of the plurality of nodes.

According to a third implementation of the mesh network, the plurality of nodes is selected to include a set of shared nodes and a set of transit nodes.

Each shared node is configured to switch:
(I) data originating from local data sources coupled to the shared node; and
(II) data directed to local data sinks coupled to the shared node.

Each transit node is configured to switch data originating from any shared node and directed to any other shared node.

Figure 43:
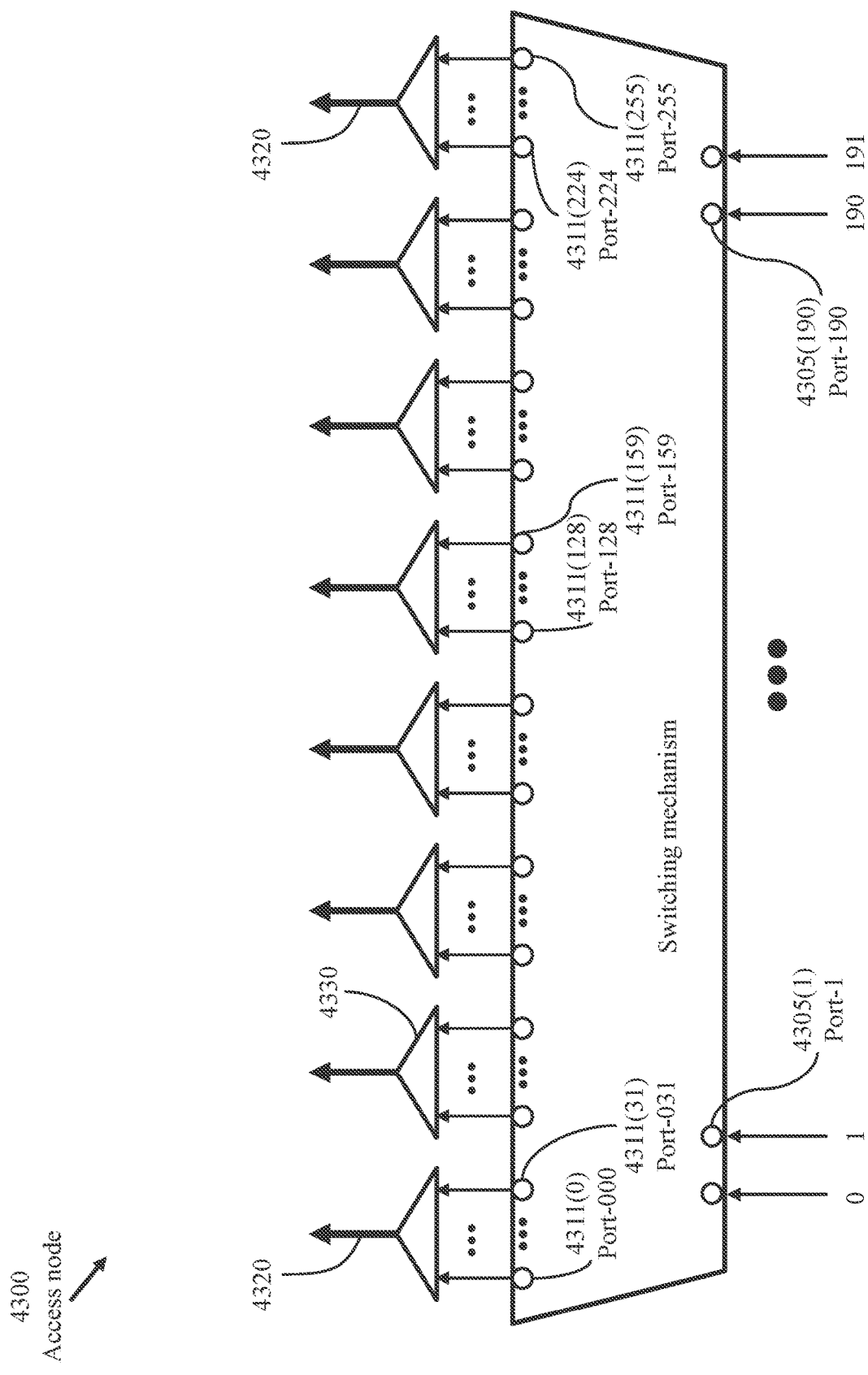
FIG. 43 illustrates the upstream side (ingress side) of an access node using spectral multiplexers to connect to the passive-transposing modules, the illustrated access node has 192 dual outer ports connecting to external data sources/sinks, and 256 dual inner ports connecting to spectral multiplexers.

FIG. 43 illustrates upstream connectivity 4300 of an ingress node of an access node to inputs of u-PTMs 1700 or uni-PTMs 3230. The exemplary access node of FIG. 43 comprises 192 dual outer access-node ports 4305 connecting to data sources and data sinks and 256 dual inner access-node ports 4311. Spectral multiplexers 4330 connect to respective uPTMs through WDM links 4320.

Each inner access-node port 4311 connects to a channel directed to a spectral multiplexer 4330 which combines 32 channels from a respective set of 32 dual inner ports 4311 into an upstream WDM link 4320 connecting to a respective uPTM.

Figure 44:
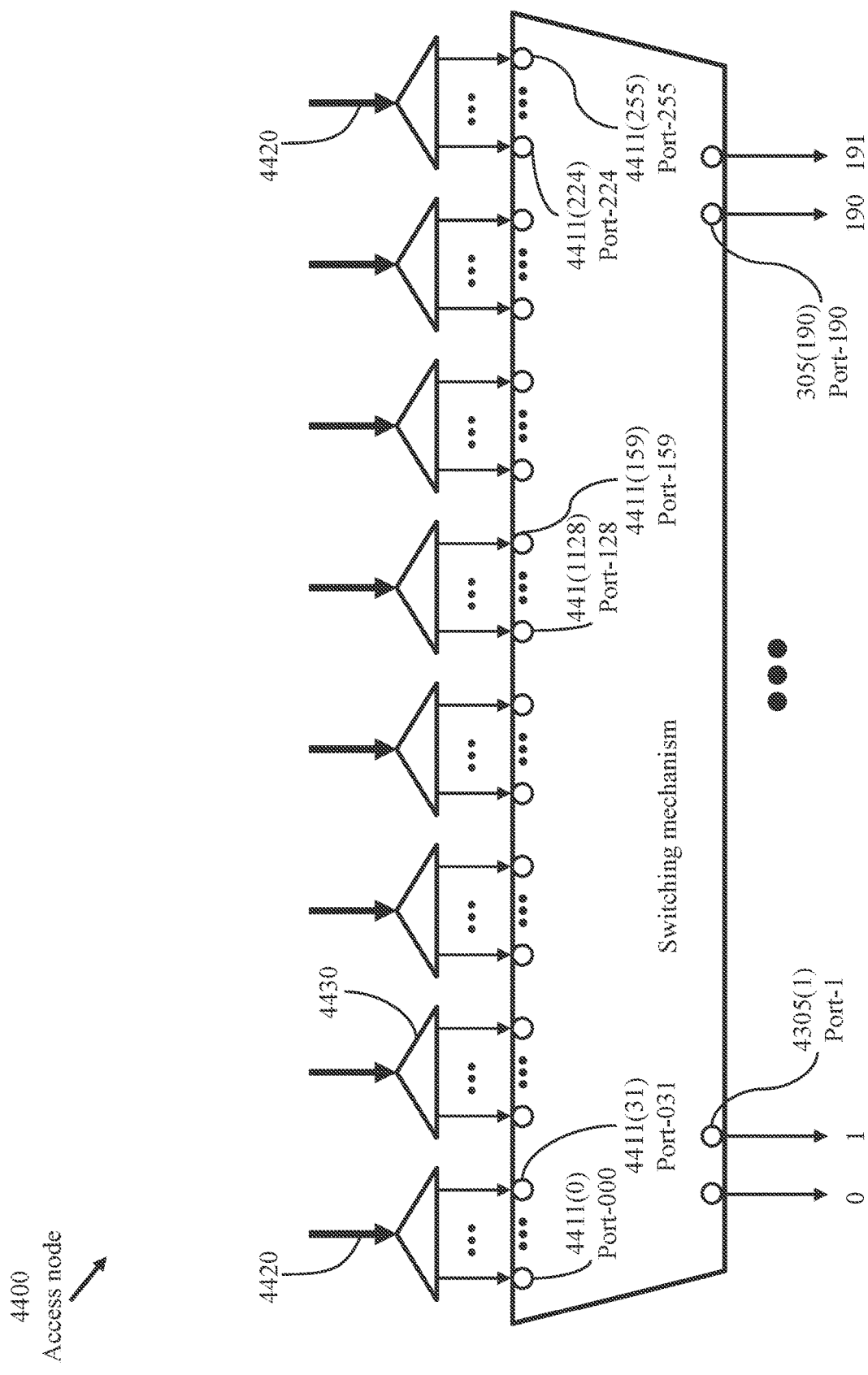
FIG. 44 illustrates the downstream side (egress side) of the access node of FIG. 41.

FIG. 44 illustrates downstream connectivity 4400 of the access node of FIG. 43 (i.e., connectivity of the egress node of access node 4300) to output ports of d-PTMs 1800 or of uni-PTMs 3230 through WDM links 4420. Each downstream WDM links 4420 connects to a respective spectral demultiplexer 4430 which directs individual downstream channels to inner ports 4411.

Figure 45:
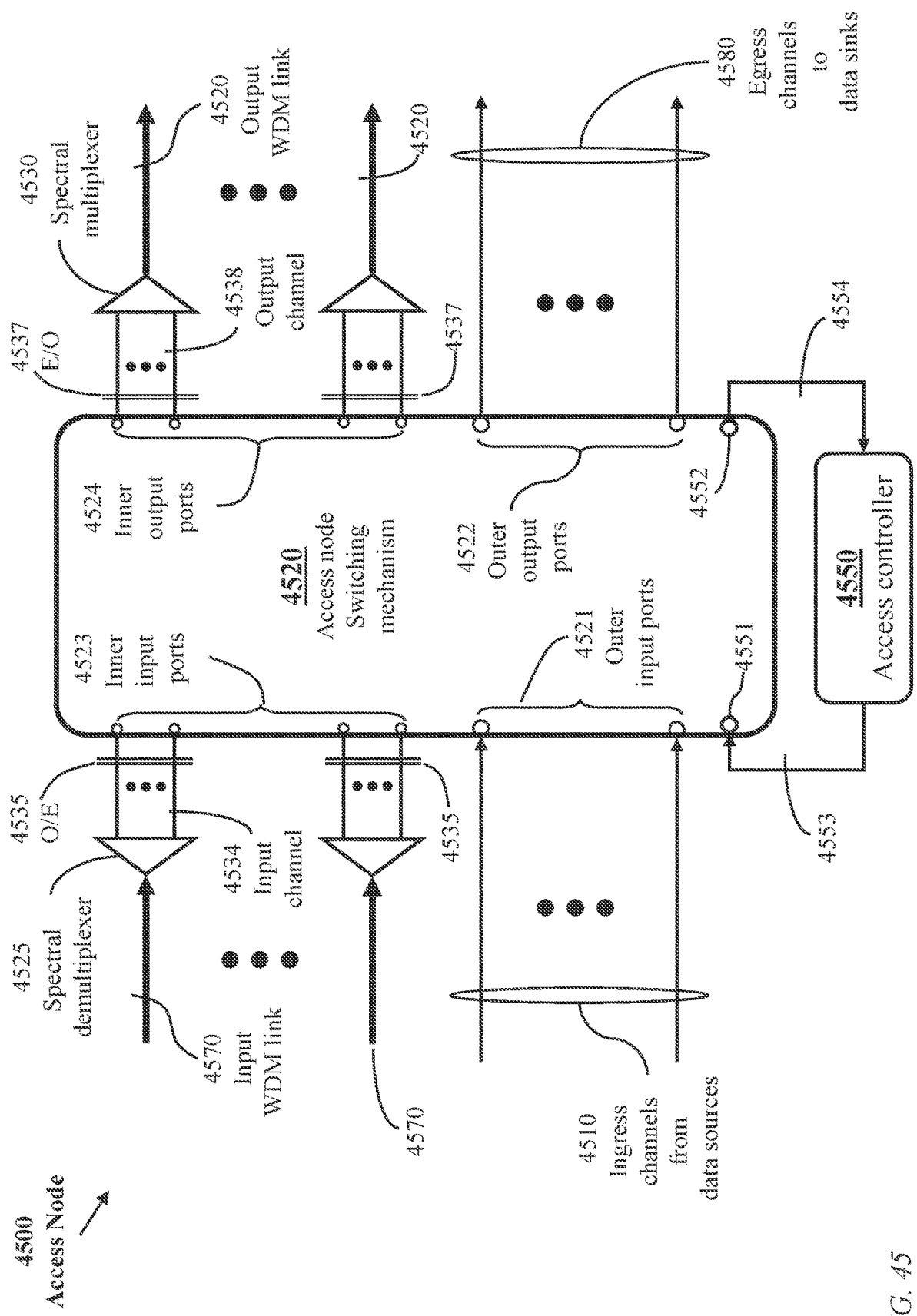
FIG. 45 illustrates an access node coupled to downstream WDM links through spectral demultiplexers at input and upstream WDM links through spectral multiplexers at output for use in an embodiment of the present invention.

FIG. 45 illustrates an alternate representation 4500 of an access node configured to switch data originating from subtending data sources or directed to subtending data sinks as well as transit data directed to other access nodes. Access node 4500 comprises an access-node switching mechanism 4520 having a plurality of input ports and a plurality of output ports. The input ports are divided into ingress ports 4521 for receiving data from ingress channels 4510 originating from data sources, inner input ports 4523 for receiving data from other access nodes, and a receiving control port 4551 coupled to a control channel 4553 originating from an output port of access controller 4550. The output ports are divided into egress ports 4522 for transmitting data to data sinks through egress channels 4580, inner output ports 4524 for transmitting data to other access nodes, and a transmitting control port 4552 coupled to a control channel 4554 connecting to an input port of access controller 4550. A dual ingress channel/egress channel 4510/4580 may connect to a set of servers or a set of network users.

Access node 4500 may receive data through a number of WDM input links and transmit data through output WDM links. The inner input ports 4523 may be divided into a number of sets of inner input ports each set comprising a predetermined number of ports. Likewise, the inner output ports 4524 may be divided into a number of sets of inner output ports In the exemplary case of FIG. 45, each input WDM link 4570 carries multiple spectral bands (multiple channels). A spectral demultiplexer 4525 separates the spectral bands. Input channels 4534 coupled to outputs of the spectral demultiplexer 4330 connect to a bank of optical-to-electrical converters 4535 the output of which is supplied to respective inner input ports 4523. Each set of inner output ports 4524 connects to a respective bank 4537 of electrical-to-optical converters the output of which is supplied through output channels 4538 to a spectral multiplexer 4530 coupled to a respective output WDM link 4520.

The invention claimed is:

1. A network comprising:
a plurality of dual passive transposing modules (dual-PTMs), each dual-PTM connecting to:
a first number of exterior links, each comprising $\gamma$ dual channels, $\gamma>1$; and
a second number of interior links, each comprising n dual channels, n>1, the first number being a positive integer multiple, m, of n, and the second number being $\gamma \times m$;
said each dual-PTM configured so that:
each exterior link has an upstream cyclic path to each interior link; and
each interior link has a downstream cyclic path to said each exterior link;
said plurality of dual-PTMs being arranged into a number $\Pi$, $\Pi \geq 1$, of constellations, each constellation comprising a number H, H$\geq$1 of dual-PTMs;
a plurality of access nodes, each access node connecting to each of H dual-PTMs of a respective constellation through a respective exterior link; and
a plurality of distributors, each distributor connecting to one dual-PTM from each of the $\Pi$ constellations through a respective interior link;

thereby, enabling network expansion to accommodate a number ($\Pi \times n \times m$) of access nodes, each access node having a number (H$\times \gamma \times$m) of parallel single-hop paths to each other access node.

2. The network of claim 1 wherein said each dual-PTM comprises a set of $\gamma$ dual passive transposing units (dual-PTUs), each dual-PTU connecting to a respective set of m interior links of said second number of interior links, said each dual-PTU comprising:
n upstream temporal clockwise rotators, each cyclically connecting an upstream channel from each of a respective set of m exterior links of said first number of exterior links to an upstream channel within each interior link of said respective set of m interior links; and
n downstream temporal counterclockwise rotators, each cyclically connecting a downstream channel within each interior link of said respective set of m interior links to each of a respective set of m exterior links of said first number of exterior links.

3. The network of claim 2 wherein each upstream temporal clockwise rotator is coupled to a respective upstream timing module.

4. The network of claim 3 wherein each downstream temporal counterclockwise rotator is coupled to a respective downstream timing module.

5. The network of claim 4 wherein each of said respective upstream timing module and said respective downstream timing module of said each dual-PTM is coupled to a master time-alignment module which sets a time reference for said each dual-PTM and exchanges timing data with respective access nodes and with respective distributors.

6. The network of claim 2 further comprising a buffer at each input port of each upstream temporal clockwise rotator and a buffer at each input port of each downstream temporal counterclockwise rotator.

7. The network of claim 1 wherein:
said number $\Pi$ of constellations is set to unity;
said each distributor is collocated with said one dual-PTM; and
said respective interior link comprises individual n channels directly connecting to said one dual-PTM.

8. The network of claim 7 wherein said each distributor is implemented as a fast optical switch.

9. The network of claim 1 wherein, for H>1, the dual-PTMs of at least one constellation are geographically distributed.

10. A network comprising:
a plurality of dual passive transposing modules (dual-PTMs), each dual-PTM connecting to:
a first number of exterior links, each comprising $\gamma$ dual channels, $\gamma>1$; and
a second number of interior links, each comprising n dual channels, n>1, the first number being a positive integer multiple, m, of n, and the second number being $\gamma \times m$;
said each dual-PTM configured so that:
each exterior link has an upstream cyclic path to each interior link; and
each interior link has a downstream cyclic path to said each exterior link;
said plurality of dual-PTMs being arranged into a number $\Pi$, $\Pi \geq 1$, of constellations, each constellation comprising a number H, H$\geq$1 of dual-PTMs;
a plurality of access nodes, each access node connecting to one dual-PTM from each of the $\Pi$ constellations through a respective exterior link;

and
  a plurality of distributors, each distributor connecting to each of H dual-PTMs of a respective constellation through a respective interior link;

thereby, enabling network expansion to accommodate a number (H×n×m) of access nodes, each access node having a number (Π×γ×m) of parallel single-hop paths to each other access node.

11. The network of claim 10 wherein:
   said each distributor connecting to said respective constellation and the H dual-PTMs of said respective constellation are collocated; and
   said respective interior link comprises individual channels.

12. A network comprising:
   a plurality of unidirectional passive transposing modules (uni-PTMs), each uni-PTM connecting to:
      a number n×m of exterior links, each exterior link comprising n channels, n>1, m>1; and
      n×m interior links, each interior link comprising n channels;
      said each uni-PTM configured so that said each exterior link has an upstream cyclic path to said each interior link;
      said plurality of uni-PTMs being arranged into a number H, H≥1 of constellations, each constellation comprising H uni-PTMs;
   a plurality of ingress nodes, each ingress node connecting to a respective constellation through H exterior links, each of said H exterior links connecting to one uni-PTM of the respective constellation;
   and
   a plurality of egress nodes, each egress node connecting to one uni-PTM from each of the H constellations through a respective interior link, said each egress node sharing a distributing mechanism with a respective ingress node of the plurality of ingress nodes to form an integrated node yielding a plurality of integrated nodes comprising (H×n×m) integrated nodes;

thereby, enabling network expansion to accommodate a number (H×n×m) of integrated nodes, each integrated node having a direct path to each other integrated node and a number ((H×n×m)−2) of parallel single-hop paths to each other integrated node.

13. The network of claim 12 wherein said each uni-PTM comprises a set of n unidirectional passive transposing units (uni-PTUs), each uni-PTU coupled to a respective set of m interior links of said n×m interior links, said each uni-PTU comprising n temporal rotators, each cyclically connecting a channel from each of a respective set of m exterior links of said number n×m of exterior links to a channel within each interior link of said respective set of m interior links.

14. The network of claim 12 further comprising a global controller accessible to each integrated node of said plurality of integrated nodes.

15. The network of claim 14 wherein each integrated node of said plurality of integrated nodes is a shared node configured to switch:
   data originating from local data sources coupled to said each integrated node;
   data directed to local data sinks coupled to said each integrated node; and
   transit data originating from any other integrated node and directed to an identified integrated node of said plurality of integrated nodes.

16. The network of claim 14 wherein said plurality of integrated nodes is organized into:
   a set of gateway nodes, each gateway node of said set of gateway nodes configured to switch;
      data originating from external data sources coupled to said each gateway node; and
      data directed to external data sinks coupled to said each gateway node;
   and
   a set of shared nodes, each shared node configured to switch:
      data originating from local data sources coupled to said each shared node;
      data directed to local data sinks coupled to said each shared node; and
      transit data originating from any integrated node of said plurality of integrated nodes other than said each shared node.

17. The network of claim 14 wherein said plurality of integrated nodes comprises:
   a set of shared nodes, each shared node configured to switch:
      data originating from local data sources coupled to said each shared node;
      data directed to local data sinks coupled to said each shared node; and
      transit data originating from any other shared node;
   and
   a set of transit nodes each transit node configured to switch only data originating from any shared node and directed to any other shared node.

18. The network of claim 15 wherein data is transferred from a first integrated node to a second integrated node through one of:
   a direct path; and
   a single-hop path through any integrated node other than the first integrated node and the second integrated node.

19. The network of claim 15 wherein a path from a first integrated node to a second integrated node is established through one of:
   direct exchange of control signals between the first integrated node and the second integrated node; and
   exchange of control signals between the first integrated node and the global controller.

* * * * *